US007870369B1

(12) United States Patent
Nelson et al.

(10) Patent No.: US 7,870,369 B1
(45) Date of Patent: Jan. 11, 2011

(54) ABORT PRIORITIZATION IN A TRACE-BASED PROCESSOR

(75) Inventors: Christopher Patrick Nelson, Santa Clara, CA (US); John Gregory Favor, Scotts Valley, CA (US); Richard Win Thaik, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 370 days.

(21) Appl. No.: 11/923,640

(22) Filed: Oct. 24, 2007

Related U.S. Application Data

(63) Continuation-in-part of application No. 11/781,937, filed on Jul. 23, 2007, which is a continuation-in-part of application No. 11/535,971, filed on Sep. 27, 2006, now Pat. No. 7,546,420, application No. 11/923,640, and a continuation-in-part of application No. 11/535,972, filed on Sep. 27, 2006, and a continuation-in-part of application No. 11/535,977, filed on Sep. 27, 2006, now Pat. No. 7,606,975, and a continuation-in-part of application No. 11/553,453, filed on Oct. 26, 2006, now Pat. No. 7,587,585, and a continuation-in-part of application No. 11/553,455, filed on Oct. 26, 2006, now Pat. No. 7,568,088, and a continuation-in-part of application No. 11/553,458, filed on Oct. 26, 2006, now Pat. No. 7,568,089, and a continuation-in-part of application No. 11/591,024, filed on Oct. 31, 2006.

(60) Provisional application No. 60/889,547, filed on Feb. 13, 2007, provisional application No. 60/862,609, filed on Oct. 24, 2006, provisional application No. 60/721,385, filed on Sep. 28, 2005, provisional application No. 60/730,550, filed on Oct. 26, 2005, provisional application No. 60/730,810, filed on Oct. 27, 2005, provisional application No. 60/731,962, filed on Oct. 31, 2005, provisional application No. 60/732,438, filed on Nov. 1, 2005, provisional application No. 60/832,848, filed on Jul. 23, 2006, provisional application No. 60/832,822, filed on Jul. 23, 2006, provisional application No. 60/731,785, filed on Oct. 31, 2005, provisional application No. 60/866,205, filed on Nov. 16, 2006, provisional application No. 60/866,203, filed on Nov. 16, 2006.

(51) Int. Cl.
*G06F 9/00* (2006.01)
(52) U.S. Cl. .................. 712/220; 712/207; 712/216
(58) Field of Classification Search .................. 712/207, 712/216, 220
See application file for complete search history.

(56) References Cited

U.S. PATENT DOCUMENTS 4,912,707 A    3/1990   Kogge et al.

(Continued)

OTHER PUBLICATIONS

Quinn Jacobson, Eric Rotenberg, James E. Smith, Path-based next trace prediction, Proceedings of the 30th annual ACM/IEEE international symposium on Microarchitecture, p. 14-23, Dec. 1-3, 1997, Research Triangle Park, North Carolina, United States.*

(Continued)

*Primary Examiner*—Eddie P Chan
*Assistant Examiner*—Idriss N Alrobaye
(74) *Attorney, Agent, or Firm*—Osha • Liang LLP

(57) ABSTRACT

A method of determining a reason for a trace to be aborted includes receiving at least two incoming indications of occurrences of abort triggers stemming from the execution of at least two of the operations that are different from each other, where each of the abort triggers has an associated abort priority level, and where the trace represents multiple instructions. The method further includes prioritizing among the abort triggers for the trace based on the abort priority level of each abort trigger, where the prioritizing does not take into account a correspondence between operations and instructions and where the prioritizing selects as a pending abort reason one or more of the abort triggers that have the same abort priority level, and where that abort priority level is the highest among the abort priority levels of the abort triggers for the trace.

9 Claims, 28 Drawing Sheets

U.S. PATENT DOCUMENTS

| | | | |
|---|---|---|---|
| 5,369,757 A | 11/1994 | Spiro et al. | |
| 5,381,533 A | 1/1995 | Peleg et al. | |
| 5,428,786 A | 6/1995 | Sites | |
| 5,432,918 A | 7/1995 | Stamm | |
| 5,491,793 A * | 2/1996 | Somasundaram et al. | 714/45 |
| 5,568,380 A | 10/1996 | Brodnax et al. | |
| 5,632,023 A | 5/1997 | White et al. | |
| 5,644,742 A | 7/1997 | Shen et al. | |
| 5,649,136 A | 7/1997 | Shen et al. | |
| 5,673,408 A | 9/1997 | Shebanow et al. | |
| 5,838,943 A | 11/1998 | Ramagopal et al. | |
| 5,860,104 A | 1/1999 | Witt et al. | |
| 5,913,925 A | 6/1999 | Kahle et al. | |
| 5,944,841 A | 8/1999 | Christie | |
| 6,014,742 A | 1/2000 | Krick et al. | |
| 6,018,786 A | 1/2000 | Krick et al. | |
| 6,031,992 A | 2/2000 | Cmelik et al. | |
| 6,052,769 A | 4/2000 | Huff et al. | |
| 6,055,630 A | 4/2000 | D'Sa et al. | |
| 6,073,213 A * | 6/2000 | Peled et al. | 711/125 |
| 6,076,144 A | 6/2000 | Peled et al. | |
| 6,115,809 A | 9/2000 | Mattson, Jr. et al. | |
| 6,170,038 B1 | 1/2001 | Krick et al. | |
| 6,170,040 B1 | 1/2001 | Lee et al. | |
| 6,185,660 B1 | 2/2001 | Mulla et al. | |
| 6,185,675 B1 | 2/2001 | Kranich et al. | |
| 6,189,141 B1 * | 2/2001 | Benitez et al. | 717/153 |
| 6,205,545 B1 * | 3/2001 | Shah et al. | 712/237 |
| 6,216,206 B1 | 4/2001 | Peled et al. | |
| 6,339,822 B1 | 1/2002 | Miller | |
| 6,351,844 B1 | 2/2002 | Bala | |
| 6,389,446 B1 | 5/2002 | Torii | |
| 6,442,674 B1 | 8/2002 | Lee et al. | |
| 6,449,714 B1 | 9/2002 | Sinharoy | |
| 6,493,837 B1 | 12/2002 | Pang et al. | |
| 6,538,997 B1 * | 3/2003 | Wang et al. | 370/241 |
| 6,557,095 B1 | 4/2003 | Henstrom | |
| 6,604,060 B1 | 8/2003 | Ryan et al. | |
| 6,609,189 B1 * | 8/2003 | Kuszmaul et al. | 712/23 |
| 6,671,766 B1 | 12/2003 | Vandenbergh et al. | |
| 6,675,376 B2 | 1/2004 | Ronen et al. | |
| 6,694,427 B1 | 2/2004 | Mericas et al. | |
| 6,694,457 B2 | 2/2004 | McKee | |
| 6,738,926 B2 | 5/2004 | Mathiske et al. | |
| 6,779,087 B2 | 8/2004 | Saulsbury et al. | |
| 6,785,890 B2 | 8/2004 | Kalafatis et al. | |
| 6,799,263 B1 | 9/2004 | Morris et al. | |
| 6,826,182 B1 | 11/2004 | Parthasarathy | |
| 6,857,060 B2 | 2/2005 | Elias et al. | |
| 6,874,138 B1 | 3/2005 | Ziegler et al. | |
| 6,889,318 B1 | 5/2005 | Wichman | |
| 6,895,460 B2 | 5/2005 | Desoli et al. | |
| 6,950,924 B2 | 9/2005 | Miller et al. | |
| 6,968,476 B2 | 11/2005 | Barowski et al. | |
| 6,981,104 B2 | 12/2005 | Prabhu | |
| 6,988,190 B1 * | 1/2006 | Park | 712/241 |
| 7,003,629 B1 * | 2/2006 | Alsup | 711/118 |
| 7,010,648 B2 | 3/2006 | Kadambi et al. | |
| 7,062,631 B1 | 6/2006 | Klaiber et al. | |
| 7,085,955 B2 | 8/2006 | Prabhu | |
| 7,133,969 B2 | 11/2006 | Alsup et al. | |
| 7,136,992 B2 | 11/2006 | Maiyuran et al. | |
| 7,139,902 B2 | 11/2006 | Lee | |
| 7,188,368 B2 | 3/2007 | Swimmer et al. | |
| 7,213,126 B1 | 5/2007 | Smaus et al. | |
| 7,269,706 B2 | 9/2007 | Agarwal et al. | |
| 7,360,024 B2 | 4/2008 | Hironaka et al. | |
| 7,366,875 B2 * | 4/2008 | Rasche et al. | 712/205 |
| 7,415,598 B2 | 8/2008 | Dos Remedios | |
| 7,487,341 B2 | 2/2009 | Wang et al. | |
| 7,496,735 B2 | 2/2009 | Yourst et al. | |
| 7,516,366 B2 | 4/2009 | Lev et al. | |
| 7,536,591 B2 | 5/2009 | Varadarajan et al. | |
| 7,546,420 B1 | 6/2009 | Shar et al. | |
| 7,568,089 B1 | 7/2009 | Favor et al. | |
| 7,571,304 B2 | 8/2009 | Chaudhry et al. | |
| 7,577,690 B2 | 8/2009 | Chandrasekaran et al. | |
| 7,594,111 B2 | 9/2009 | Kiriansky et al. | |
| 7,606,975 B1 | 10/2009 | Shar et al. | |
| 2001/0032307 A1 | 10/2001 | Rohlman et al. | |
| 2002/0013938 A1 | 1/2002 | Duesterwald et al. | |
| 2002/0095553 A1 * | 7/2002 | Mendelson et al. | 711/118 |
| 2002/0144101 A1 * | 10/2002 | Wang et al. | 712/240 |
| 2002/0147890 A1 | 10/2002 | Saulsbury et al. | |
| 2003/0005271 A1 * | 1/2003 | Hsu et al. | 712/237 |
| 2003/0009620 A1 | 1/2003 | Solomon et al. | |
| 2003/0084375 A1 * | 5/2003 | Moore et al. | 714/34 |
| 2004/0015627 A1 | 1/2004 | Desoli et al. | |
| 2004/0034757 A1 | 2/2004 | Gochman et al. | |
| 2004/0083352 A1 | 4/2004 | Lee | |
| 2004/0107336 A1 | 6/2004 | Douglas et al. | |
| 2004/0154011 A1 | 8/2004 | Wang et al. | |
| 2004/0193857 A1 | 9/2004 | Miller et al. | |
| 2004/0230778 A1 | 11/2004 | Chou et al. | |
| 2005/0012079 A1 | 1/2005 | Roberts et al. | |
| 2005/0097110 A1 | 5/2005 | Nishanov et al. | |
| 2005/0108719 A1 * | 5/2005 | Need et al. | 718/104 |
| 2005/0120179 A1 | 6/2005 | Akkary et al. | |
| 2005/0125632 A1 | 6/2005 | Alsup et al. | |
| 2005/0289324 A1 | 12/2005 | Miller et al. | |
| 2005/0289529 A1 | 12/2005 | Almog et al. | |
| 2006/0053245 A1 | 3/2006 | Solomon et al. | |
| 2006/0053347 A1 | 3/2006 | van Ingen et al. | |
| 2006/0080190 A1 | 4/2006 | Furukawa et al. | |
| 2006/0179346 A1 | 8/2006 | Bishop et al. | |
| 2006/0184771 A1 | 8/2006 | Floyd et al. | |
| 2007/0038844 A1 | 2/2007 | Valentine et al. | |
| 2007/0157007 A1 | 7/2007 | Jourdan et al. | |
| 2008/0034350 A1 | 2/2008 | Conti | |
| 2009/0222596 A1 | 9/2009 | Flynn et al. | |
| 2010/0031000 A1 | 2/2010 | Flynn et al. | |

OTHER PUBLICATIONS

Eric Rotenberg, Quinn Jacobson, Yiannakis Sazeides, Jim Smith, Trace processors, Proceedings of the 30th annual ACM/IEEE international symposium on Microarchitecture, p. 138-148, Dec. 1-3, 1997, Research Triangle Park, North Carolina, United States.*

Eric Rotenberg, Jim Smith, Control independence in trace processors, Proceedings of the 32nd annual ACM/IEEE international symposium on Microarchitecture, p. 4-15, Nov. 16-18, 1999, Haifa, Israel.*

Almog, Y. et al., Specialized Dynamic Optimizations for High-Performance Energy-Efficient Microarchitecture, Proceedings of the International Symposium on Code Generation and Optimization, 2004 (12 pages).

Chaparro, P. et al., Distributing the Fronted for Temperature Reduction, Proceedings of the 11th Symposium on High-Performance Computer Architecture, Feb. 12-16, 2005 (10 pages).

Colwell, R. P. et al., A VLIW Architecture for a Trace Scheduling Compiler, 1987, pp. 180-192 (13 pages).

Fisher, J. A., Trace Scheduling: A Technique for Global Microcode Compaction, IEEE Transactions on Computers, vol. C-30, No. 7, Jul. 1981, pp. 478-490 (13 pages).

Friendly, D. et al, Putting the Fill Unit to Work: Dynamic Optimizations for Trace Cache Microprocessors, Proceedings of the 31st Annual ACM/IEEE International Symposium on Microarchitecture, Nov. 30 - Dec. 2, 1998, pp. 173-181 (9 pages).

Grunwald, D. and Ghiasi, S., Microarchitectural Denial of Service: Insuring Microarchitectural Fairness, Proceedings of the 35th Annual IEEE/ACM International Symposium on Microarchitecture, Nov. 18-22, 2002 (10 pages).

Hinton, G. et al., the Microarchitecture of the Pentium 4 Processor, Intel Technology Journal Q1, 2001 (12 pages).

IBM Technical Disclosure Bulletin, Grouping of Instructions, v. 38, n. 8, Aug. 1, 1995, pp. 531-534 (4 pages).

Katevenis, E. G., Reduced Instruction Set Computer Architectures for VLSI, Berkley, California 1983, pp. 67-68 and 190 (7 pages).

Rotenberg, E., Bennett, S., and Smith, J. E., Trace Cache: a Low Latency Approach to High Bandwidth Instruction Fetching, In Proceedings of the 29th Annual International Symposium on Microarchitecture, Dec. 2-4, 1996, Paris, France (11 pages).

Slechta, B. et al, Dynamic Optimization of Micro-Operations, Proceedings of the 9th International Symposium on High-Performance Computer Architecture, Feb. 8-12, 2003 (12 pages).

Smith, J. E. And Pleszkun, a. R., Implementation of Precise Interrupts in Pipelined Processors, Proc. Computer Architecture, 1985 (15 pp.).

Tremblay, M., High-Performance Fault-Tolerant VLSI Systems Using Micro Rollback, Los Angeles, California, Sep. 1991, pp. 72-74, 81, 89-90, 102-104 and 246 (14 pages).

Vijaykumar, T. N., et al., Speculative Versioning Cache, IEEE Transaction on Parallel and Distributed Systems, vol. 12, No. 12, Dec. 2001, pp. 1305-1317 (13 pages).

Patel, S., Lumetta, S., "rePlay: A Hardware Framework for Dynamic Optimization", IEEE Transactions on Computers, vol. 50, No. 6, Jun. 2001 (26 pages).

Tanenbaum, A. S., Structured Computer Organization, Fourth Edition, Prentcie Hall, Inc. 1984 (21 pages).

Patel S. J. et al., Improving Trace Cache Effectiveness with Branch Promotion and Trace Packing, IEEE, 1998, pp. 262-271.

Tanenbaum, A. S., Structured Computer Organization, Second Edition, Prentice Hall, Inc. 1984, pp. 10-12.

Notice of Allowance for U.S. Appl. No. 12/030,857, mailed on Apr. 23, 2010 (12 pages).

U.S. Notice of Allowance for U.S. Appl. No. 11/923,638, mailed on May 12, 2010 (28 pages).

Office Action in U.S. Appl. No. 11/880,864 issued Oct. 4, 2010.

* cited by examiner

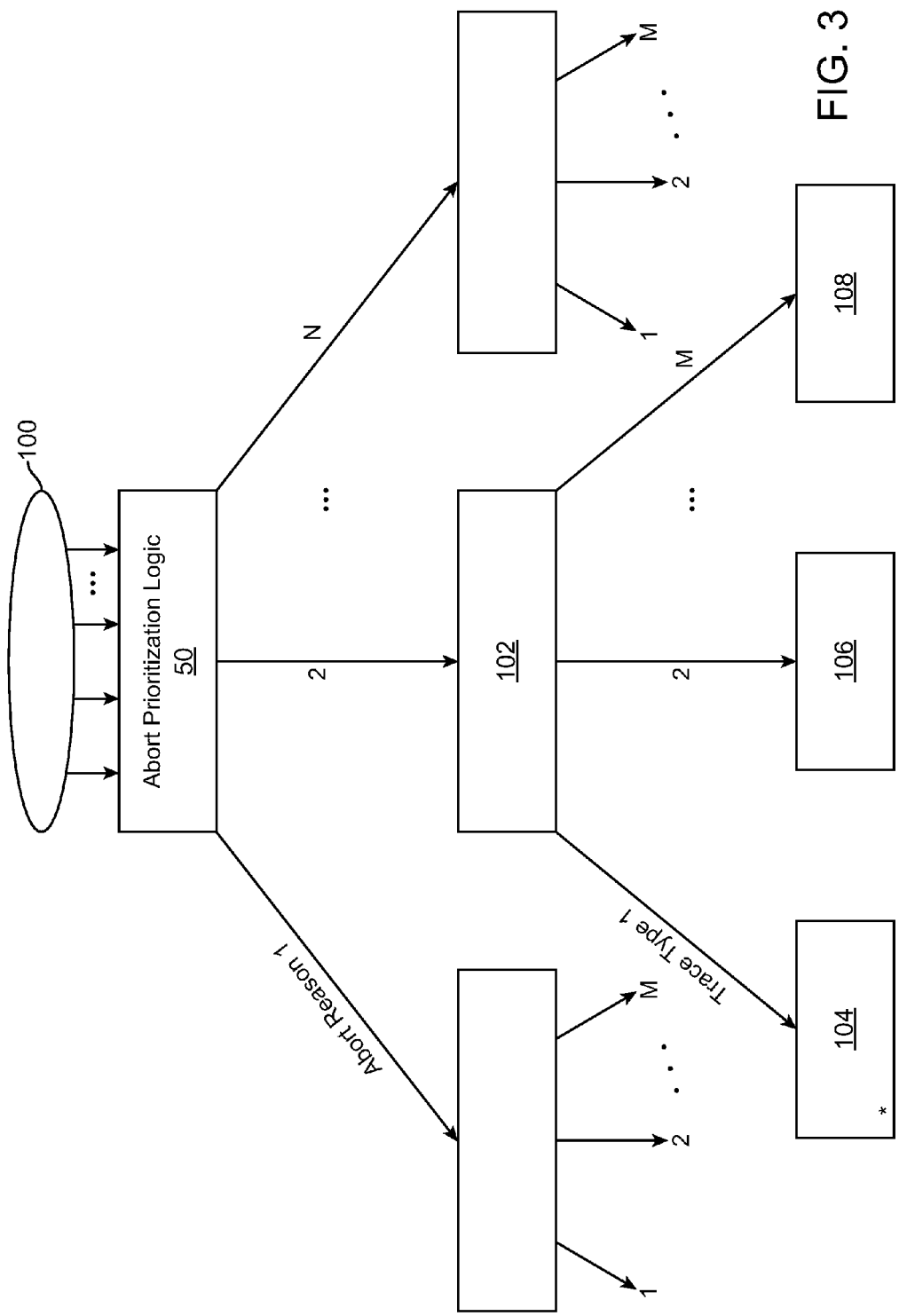

ABORT PRIORITIZATION IN A TRACE-BASED PROCESSOR

CROSS REFERENCE TO RELATED APPLICATIONS

This application claims the benefit of priority document U.S. Provisional Application No. 60/889,547, entitled "Instruction Sub-Type Tracking Unit", filed on Feb. 13, 2007 and further claims the benefit of priority document U.S. Provisional Application No. 60/862,609, entitled "Exception Handling for Atomic Traces", filed on Oct. 24, 2006, and further claims the benefit of priority document U.S. Provisional Application No. 60/721,385, filed on Sep. 28, 2005, entitled "Efficient Trace Cache Management During Self-Modifying Code Processing," by Leonard Shar et al., and further claims the benefit of priority document U.S. Provisional Application No. 60/730,550, filed on Oct. 26, 2005, entitled "Checkpointing Status Flags for Atomic Traces," by John Gregory Favor et al., and further claims the benefit of priority document U.S. Provisional Application No. 60/730,810, filed on Oct. 27, 2005, entitled "Allocation and Deallocation of Shadow Registers used by Atomic Traces," by John Gregory Favor et al., and further claims the benefit of priority document U.S. Provisional Application No. 60/731,962, filed on Oct. 31, 2005, entitled "Determining the Highest Priority Abort Trigger in an Atomic Trace," by John Gregory Favor et al., and further claims the benefit of priority document U.S. Provisional Application No. 60/731,785, filed on Oct. 31, 2005, entitled "Maintaining Memory Coherency within a Trace Cache," by Richard W. Thaik, and further claims the benefit of priority document U.S. Provisional Application No. 60/732,438, filed Nov. 1, 2005, entitled "Zero-Cycle Execution of Clear Operation and Automatic Register Free," by John Gregory Favor et al., and further claims the benefit of priority document U.S. Provisional Application No. 60/832,848, filed on Jul. 23, 2006, entitled "Microprocessor with Caches for Instructions, Basic Blocks, and Traces," by Don Alpert et al., and further claims the benefit of priority document U.S. Provisional Application No. 60/832,822, filed on Jul. 23, 2006, entitled "Microprocessor with Coherent Caches for Basic Blocks and Traces," by Don Alpert et al., and further claims the benefit of priority document U.S. Provisional Application No. 60/862,609, filed Oct. 24, 2006, entitled "Exception Handling for Atomic Traces," by Christopher P. Nelson, and further claims the benefit of priority document U.S. Provisional Application No. 60/866,205, filed Nov. 16, 2006, entitled "Processor with Optimized Operation Sequences for Basic Block and Multi-Block Trace Caches," by John Gregory Favor, and further claims the benefit of priority document U.S. Provisional Application No. 60/866,203, filed Nov. 16, 2006, entitled "Processor with Basic Block and Multi-Block Trace Caches," by Matt Ashcraft et al. John Gregory Favor is also known as John Favor or as Greg Favor. Each of the above named priority documents is hereby incorporated by reference.

This application is a continuation-in-part of U.S. patent application Ser. No. 11/781,937, filed on Jul. 23, 2007 and entitled "A Trace Unit with a Decoder, A Basic Block Builder, and A Multi-Block Builder", which is a continuation-in-part of U.S. patent application Ser. No. 11/535,971, filed Sep. 27, 2006, entitled "Efficient Trace Cache Management During Self-Modifying Code Processing," by Leonard Eric Shar et al., and is a continuation-in-part of U.S. patent application Ser. No. 11/535,972, filed Sep. 27, 2006, entitled "Selective Trace Cache Invalidation for Self-Modifying Code Via Memory Aging," by Leonard Eric Shar et al., is a continuation-in-part of U.S. patent application Ser. No. 11/535,977, filed Sep. 27, 2006, entitled "Trace Cache for Efficient Self-Modifying Code Processing," by Leonard Eric Shar, is a continuation-in-part of U.S. patent application Ser. No. 11/553,453, filed Oct. 26, 2006, entitled "Checkpointing Statrace unit 12s Flags for Atomic Traces," by Greg Favor et al., and is a continuation-in-part of U.S. patent application Ser. No. 11/553,455, filed Oct. 26, 2006, entitled "Checkpointing Flags On-Demand for Atomic Traces," by John Gregory et al., and is a continuation-in-part of U.S. patent application Ser. No. 11/553,458, filed Oct. 26, 2006, entitled "Flag Restoration from Checkpoints for Aborts of Atomic Traces," by John Gregory Favor et al., and is a continuation-in-part of U.S. patent application Ser. No. 11/591,024, filed Oct. 31, 2006, entitled "Maintaining Memory Coherency within a Trace Cache," by John Gregory Favor. John Gregory Favor is also known as John Greg Favor. Each of the above named applications for which this application is a continuation in part is hereby incorporated by reference.

BACKGROUND OF THE INVENTION

Processors have evolved throughout recent decades by becoming smaller in size, more sophisticated in design and exhibiting faster performance. Such an evolution has resulted for various reasons, one of which is portability of systems incorporating processors. Portability introduces demands on processors such as smaller size, reduced power and efficient performance.

A processor (such as a microprocessor) processes instructions according to an instruction set architecture. The processing comprises fetching, decoding, and executing the instructions. Some instruction set architectures define a programming model where fetching, decoding, executing, and any other functions for processing an instruction are apparently performed in strict order, beginning after the functions for all prior instructions have completed, and completing before any functions of a successor instruction has begun. Such an instruction set architecture provides a programming model where instructions are executed in program order.

Some processors process instructions in various combinations of overlapped (or non-overlapped), parallel (or serial), and speculative (or non-speculative) manners, for example using pipelined functional units, superscalar issue, and out-of-order execution. Thus, some processors are enabled to execute instructions and access memory in an order that differs from the program order of the programming model. Nevertheless, the processors are constrained to produce results consistent with results that would be produced by processing instructions entirely in program order.

In some instruction set architectures, instructions are characterized as being either sequential or non-sequential, i.e. specifying a change in control flow (such as a branch). Processing after a sequential instruction implicitly continues with a next instruction that is contiguous with the sequential instruction, while processing after a change in control flow instruction optionally occurs with either the contiguous next instruction or with another next instruction (frequently non-contiguous) as specified by the control flow instruction.

Applications of processors are, for example, in personal computers (PCs), workstations, networking equipment and portable devices. Examples of portable devices include laptops, which are portable PCs, and hand-held devices.

Due to the wide use of code based on the x87 instruction set, particularly by software programmers who have become well accustomed to this code and are not likely to readily adapt to another code, backward compatibility of code is key in the architecture of a new processor. That is, the user of a newly-designed processor must enjoy the ability to use the same code utilized in a previous processor design without experiencing any problems.

In trace-based processor architectures, different trace types are used to significantly optimize execution by the back end, or execution unit, of the processor. Traces are generally built by the front end or trace unit (or instruction processing unit) of a processor.

Different types of traces might include a basic block trace, a multi-block trace or a microcode trace. A multi-block trace is made of one or more basic block traces, one or more multi-block traces or a combination thereof A microcode trace is used when, for example, a sequence of instructions is either complex or rare. U.S. patent application Ser. No. 11/781,937, entitled "A Trace Unit with a Decoder, A Basic Block Builder, and A Multi-Block Builder" and filed on Jul. 23, 2007, the disclosure of which is incorporated by reference as though set forth in full, presents further details of such traces.

A trace, in some trace-based architectures, includes operations that do not correspond to instructions in the instructions' original program order. That is, knowledge of the original program order of the instructions is lost in a trace. Moreover, an instruction may result in multiple operations. Additionally, there is no instruction boundary and the operations of a trace do not have clear relative age or order between each other (corresponding to the original instruction program order).

In prior art techniques, when a problem with a trace is detected, because there is a correspondence between instructions and operations, the relative age of the operation with the problem is used to roll back the architectural state of the processor to that which it was prior to the abort. However, in a trace-based architecture, where there is no correspondence between the instructions and corresponding operations and there is no clear instruction boundary, the problem cannot be resolved using the age of the operation because the order of the operations do not represent the original program order.

In prior art processors, when an abort is encountered, only the relative age of the pending abort is considered, however, where traces include operations that do not represent the original program order, simply considering the relative age of the pending abort falls short of resolving aborts effectively. In trace-based architectures, if an abort, or a problem, applies to more than one operation representing two or more instructions in the same trace, currently, the abort is not handled efficiently, as there is no clear operation-to-instruction or instruction order correspondences or instruction boundary.

In the foregoing trace-based architectures, a trace can experience multiple abort triggers (due to problems with different instructions contained within the trace) while traditional non-traced based processors will only recognize a single abort trigger for a single instruction.

In light of the foregoing, there is a need for a trace-based processor having a trace unit (or front end) and an execution unit (or back end) for efficiently managing problems (or aborts) related to one or more traces while minimizing performance impact.

SUMMARY OF THE INVENTION

To overcome the limitations in the prior art described above, and to overcome other limitations that will become apparent upon reading and understanding the present specification, the present invention discloses a method and corresponding structures for a graceful degradation protocol.

Briefly, in accordance with a method of the present invention, a method of determining a reason for a trace to be aborted includes receiving at least two incoming indications of occurrences of abort triggers stemming from the execution of at least two of the operations that are different from each other, where each operation has a trace associated therewith and each of the operations is associated with the same trace, where each of the abort triggers has an associated abort priority level, and where the trace represents multiple instructions. The method further includes prioritizing among the abort triggers for the trace based on the abort priority level of each abort trigger, where the prioritizing does not take into account a correspondence between the at least two operations and at least two of the instructions that the at least two operations at least in part represent, where the prioritizing selects as a pending abort reason one or more of the abort triggers that have the same abort priority level, and where that abort priority level is the highest among the abort priority levels of the abort triggers for the trace.

These and other objects and advantages of the present invention will no doubt become apparent to those skilled in the art after having read the following detailed description of the preferred embodiments illustrated in the several figures of the drawing.

IN THE DRAWINGS

FIG. 3 shows a flow chart abstractly depicting various abort triggers and each of their respective resulting action.

DETAILED DESCRIPTION OF THE PREFERRED EMBODIMENT

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention.

Figure 1:
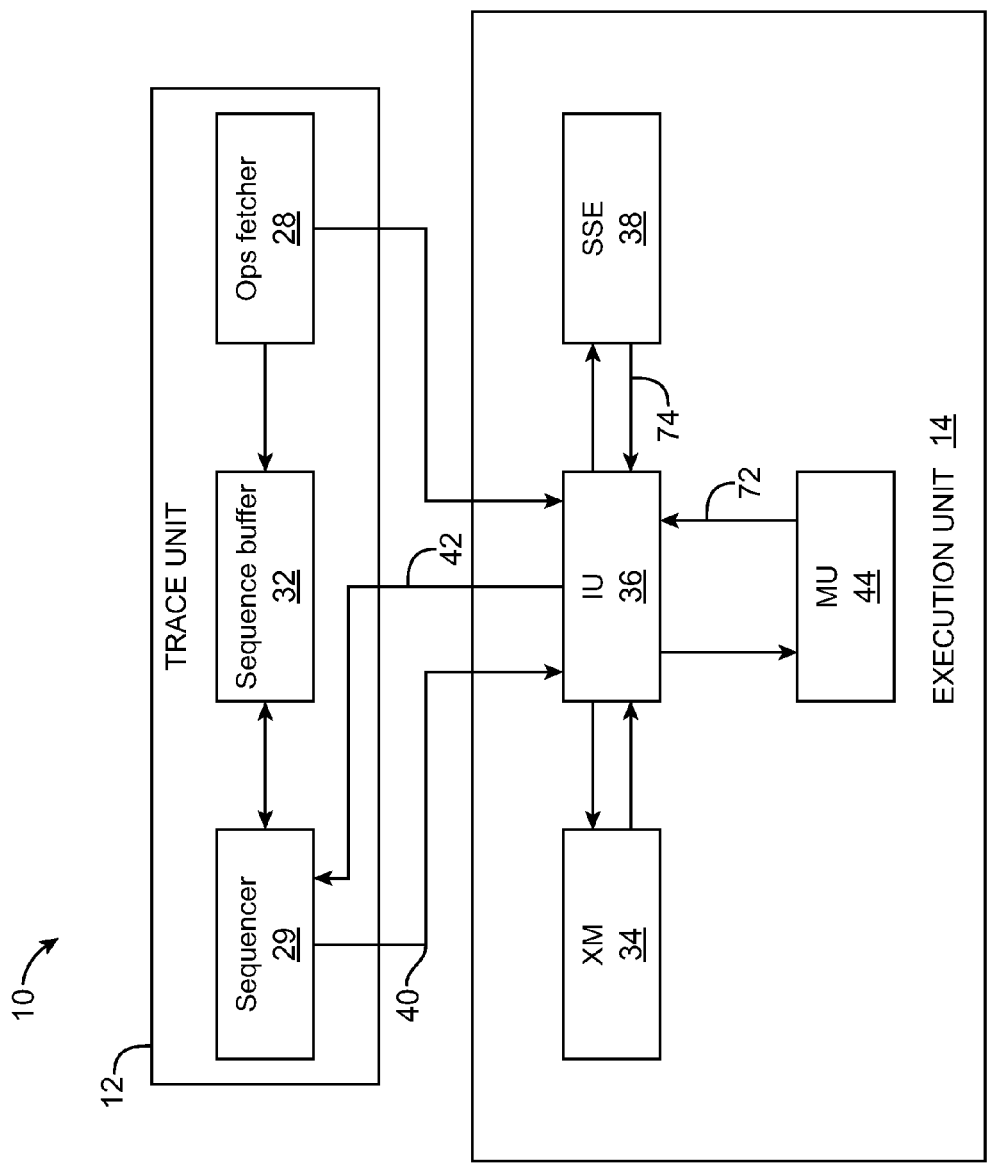
FIG. 1 shows a processor to include a trace unit and an execution unit, in accordance with an embodiment of the present invention.

Referring now to FIG. 1, a processor core 10 is shown to include a trace unit 12 and an execution unit 14, in accordance with an embodiment of the present invention. A "trace unit", as used herein, is synonymously referred to as an "instruction processing circuit" or a "front end". An "execution unit", as used herein, is synonymously referred to as a "back end". A "sequence of operations", as used herein, is synonymously referred to as a "trace". In some embodiments of the present invention, the processor core 10 is a part of a processor that includes multiple processor cores and in other embodiments, the processor core 10 is itself a processor. To this end, the term "processor" is used synonymously with the terms "processor core".

The trace unit 12 and the execution unit 14 exchange abort information through the trace unit-provided abort link 40 and the execution unit-provided abort link 42. More specifically, the trace unit 12, upon detecting an abort trigger, sends a trace unit abort trigger to the execution unit 14, through the link 40, and the execution unit 14, upon detecting an abort trigger, sends abort information to the trace unit 12, through the link 42. Abort trigger, as used herein, refers to an occurrence of an abort for a specific reason relating to the problem. Multiple abort triggers correspond to different abort reasons. Abort trigger includes an indication of the trace that has the problem (or the trace that is to be aborted).

The ops fetcher 28 of the trace unit 12 provides traces to the execution unit. More specifically, traces are provided by the ops fetcher 28 to the IU 36. The source of traces may be one or more sources. In one embodiment, the sources are basic block cache, multi-block cache and microcode cache. It is understood however, that traces can be generated from any source.

Traces and their related abort information are correlated using trace identification (trace ID). Further discussion of trace ID is presented later.

The trace unit 12, upon receiving abort information (which may include abort status) from the execution unit 14, through the link 42, uses the received information to commit or abort the triggering trace. A triggering trace is a trace to which one or more aborts apply.

If committed, a trace is sure to be executed, however, if aborted, none of the operations (or memory operations) within the trace have any effect on the architectural state of the processor core 10. In one embodiment, trace execution is atomic in that the trace's effects are either committed in their entirety to the architectural state, or prevented in their entirety from having any impact on the architectural state.

If a trace is aborted, the architectural state of the various components of the trace unit 12 and the execution unit 14 are returned to their states as they were prior to the start of the trace. Architectural state is commonly understood as the part of the processor core which holds the state of a process, such as the state of control registers or general purpose registers.

An atomic trace is generally a trace that may be treated, in its entirety, as a single sequence of instructions, or as having a single entry and a single exit. In some scenarios, atomic traces are produced by hardware translation of sequences of instructions used by software according to a reference architecture. In some usage scenarios, an atomic trace may include more than one basic block, i.e. include one or more interior conditional branches. As a degenerate case, atomic trace may be a single instruction. To this end, a trace may also be a single instruction.

In some embodiments, an atomic trace combines effects of multiple instructions from an original sequential program or sequence of instructions. In some embodiments, operations within an atomic trace are optimized (such as by splitting, combining, reorganizing, and so forth) in such a way that it may be difficult to map each operation in the trace to an instruction in the original program. Operations may also appear in a different order in the trace than their corresponding instructions in the original program, and operations may execute in the processor in a different order than they appear in the trace. The foregoing holds true for traces.

In some embodiments, operations in a trace are tentatively (or speculatively) executed based on one or more assumptions. If one or more of the assumptions are incorrect, then the trace is aborted, i.e. the effects of the operations in the trace are undone. There are a number of events that may trigger the need for a trace to be aborted. Depending on the event, the trace may be re-executed with different execution constraints/assumption (or attribute), or a different trace may be executed. In order to resolve the event requiring the abort, a correct abort trigger needs to be detected.

While reference is made to traces, all discussions, examples and figures provided herein equally apply to atomic traces.

The operations in the trace may be re-ordered so that they are no longer in their original program order. Additionally, an instruction can become multiple operations. Thus, in the event of an abort, the order of the operations, within the same trace, cannot be used as a basis for prioritizing aborts.

Referring still to FIG. 1, the trace unit 12 is shown to include a sequencer 29, an operations (or ops) fetcher 28 and a sequence buffer 32. The sequencer 29 is shown coupled to the sequence buffer 32. The sequence buffer 32 is shown responsive to the ops fetcher 28. U.S. patent application Ser. No. 11/781,937, entitled "A Trace Unit with a Decoder, A Basic Block Builder, and A Multi-Block Builder" and filed on Jul. 23, 2007, provides further details of the sequencer 29, the ops fetcher 28 and the sequence buffer 32.

The sequence buffer 32 stores traces that have been sequenced by the sequencer 29, but not committed by the execution unit 14. A trace that is committed is one whose operations (ops) have all been successfully executed by the execution unit 14, and the ops of all of the older (or earlier) traces have also been successfully executed. An older (or earlier) trace, as used herein, refers to a trace that is older in program order and younger refers to a trace that is later in program order.

The execution unit 14 is shown to include an x87 and multi media extensions (MMX) (XM) (a combination of x87 and MMX) unit 34, an integer unit (IU) 36, a streaming single-instruction, multiple-data (SIMD) extensions (SSE) unit 38 and a memory unit (MU) 44. SIMD is a technique employed to achieve data-level parallelism, as in a vector or an array processor. The XM 34 is shown coupled to the IU 36, which is shown coupled to the SSE 38 and the MU 44.

The XM 34, SSE 38 and the MU 44 send and receive abort information to and from the IU 36. The XM 34 is generally a floating point unit for executing certain floating point instructions. The MU 44 generally maintains cache and/or other memory used by the execution unit 14. Functions of the IU 36 include storing and prioritizing abort triggers and generating one or more aborts/abort reasons.

The SSE 38 is generally a set of SIMD instructions to maximize floating point instruction execution. SSE and XM are known and used in various processor architectures.

The IU 36 executes integer registration operations and the SSE 38 executes a set of SIMD register operations. SSE 38 generates one or more abort triggers, such as the SSE abort trigger 74. The MU 44 executes memory operations and generates MU abort trigger, such as the MU abort trigger 72.

Figure 2:
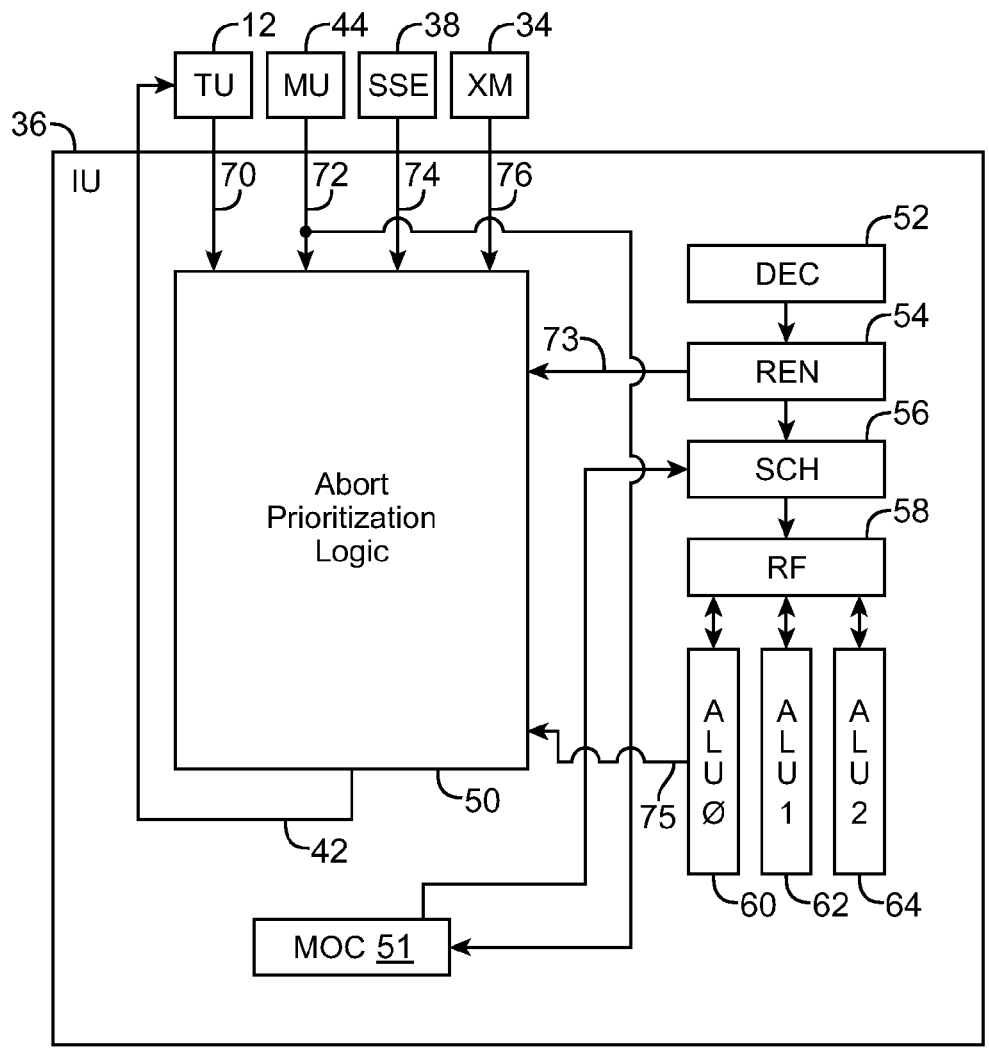
FIG. 2 shows relevant details of the IU 36 of the execution unit in accordance with an embodiment of the present invention.

FIG. 2 shows relevant details of the IU 36 of the execution unit, in accordance with an embodiment of the present invention. The IU 36 is shown to include an abort prioritization logic 50, a decode block 52, a renaming block 54, a scheduling block 56, a register file block 58, and arithmetic logic unit (ALU) 0 60, ALU 1 62 and ALU 2 64. Each of the ALU 0, 1 and 2 execute operations in parallel and offer three parallel execution stages for a corresponding superscalar architecture.

The scheduling block 56 does not take into account aborts when scheduling, which serves to reduce the complexity of the scheduling block's design.

In an exemplary embodiment, the MU abort trigger 72 is generated from any one of the following six abort triggers: 3 CannotComplete triggers in stage data format and return (DFR) and 3 OrderViolation triggers in the stage of memory order violation (MOV). Similarly, the SSE abort trigger 74 is generated from any of two triggers, and the XM abort trigger 76 is generated from any of four triggers.

The IU 36 is further shown to include a memory order constraint (MOC) block 51 responsive to the abort trigger 72 from the MU 44 and operative to generate a constraint to the scheduling block 56. The block 51 generally stores memory order constraints. It is understood however, that memory order constraints may be maintained in other locations within the IU 36 or outside thereof.

The abort prioritization logic 50 is shown coupled to receive abort triggers from the trace unit 12, the MU 44, the SSE 38 and the XM 34. The abort prioritization logic 50 is also shown to generate abort information to the trace unit 12 through the link 42.

The renaming block 54 is shown to generate a renaming abort trigger to the abort prioritization logic 50, which is referred to as internal type of abort trigger because it is generated internally to the IU 36.

The decoder block 52 generally decodes data, the renaming block 54 generally renames a trace (or maps the architectural registers to physical registers), the scheduling block 56 schedules operations for execution, and the register file block 58 maintains register files.

The trace unit 12 generates and provides, to the abort prioritization logic 50, trace unit abort trigger 70. The abort trigger 70, in some embodiments, includes a self modifying code (SMC), parity, invalid and stall abort triggers. The trace unit 12 sends the abort trigger 70, via the link 40, to the IU 36 (namely the abort prioritization logic 50) and the IU 36 prioritizes the aborts and sends back to the trace unit 12, via the link 42, a selected abort reason corresponding to a corrective action to be performed. The abort reason results from choosing the abort trigger to handle next and the corresponding corrective action.

The MU 44 generates and provides, to the abort prioritization logic 50, memory unit abort trigger 72. The SSE 38 generates and provides, to the abort prioritization logic 50, SSE abort trigger 74 and the XM 34 generates and provides, to the abort prioritization logic 50, XM abort trigger 76. The triggers 70, 72, 74 and 76 are collectively referred to herein as external abort triggers because they are generated externally to the IU 36.

The renaming block 54 generates the renaming abort trigger 73 and the combination of the ALU 0, 2 and 3 generates the execution abort trigger 75, which serves as one of the inputs of the abort prioritization logic 50. The abort triggers 73 and 75 are each internal abort triggers.

The abort prioritization logic 50 is responsive to abort triggers generated internally or externally to the IU 36 and upon receipt of an abort trigger, arbitrates and prioritizes the same.

In one embodiment of the present invention, there are four different abort priority levels, i.e. priority levels 0-3, although in other embodiments of the present invention, any number of priority levels may be employed. In the embodiment where four abort priority levels are employed, the highest abort priority level is assigned to priority level 0. When an abort trigger of the highest abort priority level, or priority level 0, is detected by the IU 36, it is processed regardless of any other abort triggers for that trace. If abort priority levels are the same, the existing (or pending) is maintained. Alternatively, the non-pending abort is maintained (or taken).

Priority can be preferentially based on the relative age of traces. For example, an older trace with a lower abort priority level than a younger trace, will ultimately get priority over the younger trace's abort priority level. In the case where aborts occur on the same age, priority level determines which takes the abort. If the priority level and age are the same, the existing (pending) abort is maintained. Alternatively, the non-pending abort is taken.

The abort prioritization logic 50, advantageously determines a reason for a trace to be aborted, i.e. the abort reason, after receiving at least two incoming indications of occurrences of abort triggers stemming from (or based on) the execution of different operations of a same trace, where each abort trigger has an associated abort priority level, and where the trace represents multiple instructions. An indication of a pending abort is held, as a pending abort. The held indication is of the abort trigger with the highest abort priority level among the abort triggers that are associated with the trace. An outgoing indication of the pending abort (or abort reason) is provided by the abort prioritization logic 50. The outgoing indication of the pending abort is the abort reason that was selected among competing abort reasons causing the received occurrences and is provided to the trace unit 12 through the link 42.

Examples of abort reasons include but are not limited to at least one of: a memory ordering constraint violation, a inter-processor loss of a cache line, a uni-processor loss of a cache line; a self-modifying code event; a trace cache parity error; a segmentation fault; a memory fault; a cannot complete fault; a floating point operation fault; a breakpoint fault; a branch misprediction fault, an interior branch misprediction fault, or a final branch misprediction fault.

In some cases of the embodiments of the present invention, a particular operation can cause multiple abort triggers. In various embodiments, each abort trigger has a static priority whereas, in prior art techniques, the priorities are only dynamic, relative to age. In other cases of the embodiment of the present invention, each occurrence of the same abort trigger has the same abort priority level regardless of the program order of the instructions that correspond to the operations. Prior art techniques, however, use instruction (or program) order.

In some embodiments and methods of the present invention, priority is given to an abort known to be earlier in program order (based on trace order corresponding to the original program order), while giving priority within a trace according to the abort priority scheme. Where atomic traces are used, the program order would be based on atomic trace order).

In some cases, a corrective action is identified based, at least in part, on the type of the trace to be aborted and on the abort reason, where the identification of the corrective action does not take into account a correspondence between the operation(s) that caused the execution to be aborted and the instruction(s) that the operation at least in part, represents. In other cases, the corrective action does take into account a correspondence between the operation(s) that caused the execution to be aborted and the instruction(s) that the operation at least in part, represents because some traces do include such correspondence information.

There are several different aborts with a given abort priority level, such as priority level 0. All cause the trace from which the abort was detected to be refetched and re-executed.

If an abort of priority 0 is recorded, and another priority 0 abort is found in the same trace, then the desired action of the second abort is recorded in addition to the desired action already recorded for the first abort. For example, if a load value misprediction is found during execution of a trace, then the desired (or corrective) action is to re-execute the trace with load value prediction disabled. If an intra-processor (or multi processor) order violation is subsequently found during execution of the (same) trace, then the desired memory constraint is recorded, and the pending abort accumulation logic continues to remember that load value prediction should also be disabled when the trace is re-executed.

In exemplary embodiments of the present invention, the indications received, the indications held, and the indications sent may or may not use the same encodings and they are all stored in the abort prioritization logic 50. Alternatively, they are stored elsewhere in the execution unit 14 or even externally to the execution unit 14.

In an embodiment of the present invention, the pending abort is maintained (or held) when it has the same abort priority level as the abort trigger. Alternatively, other than the pending abort is maintained. The pending abort is cleared when the trace it is associated with is ready to commit. At this time, no higher abort priorities exist, either by way of age or priority level, and the abort is committed.

Some aborts shut down activity upon occurrence, others allow the trace to complete so as to look for the actual cause of the problem yet others effect a combination of the foregoing.

In one embodiment of the present invention, there are more than one processor cores 10, in yet another embodiment, an execution unit includes more than one IU and all IUs are coupled to the trace unit 12. In some embodiments, only a portion of the IU is coupled to the XM. In some embodiments, all of the IUs are coupled to the XM (not illustrated by the figure). In some embodiments the execution units are identical, while in other embodiments some of the execution unit may be of a one type (having, for example, relatively high instruction processing bandwidth and capable of operating at a relatively high frequency) and some of the execution units may be of another type (having relatively low processing bandwidth and frequency). In some embodiments all or portions of the abort priority unit is embodied in the IU, the MU, or both. In various embodiments the number and processing capabilities of the execution unit are varied without restriction.

The processor employs techniques of speculative execution, predicting, for example, branch directions, lack of exceptions, load values, and so forth. The processor manages speculation according to groups of operations organized with respect to atomic traces. Management of speculative execution of operations in traces comprises detecting incorrect speculation abort triggers, prioritizing the detected abort triggers, and responding by prescribing an appropriate corrective action to correct execution according to the prioritization. Prioritizing the abort triggers comprises prioritizing the abort triggers with respect to each other according to pipeline embodiment dependent processing constraints and relative event architectural priority or a combination of any of the latter and original program order.

Figure 2A:
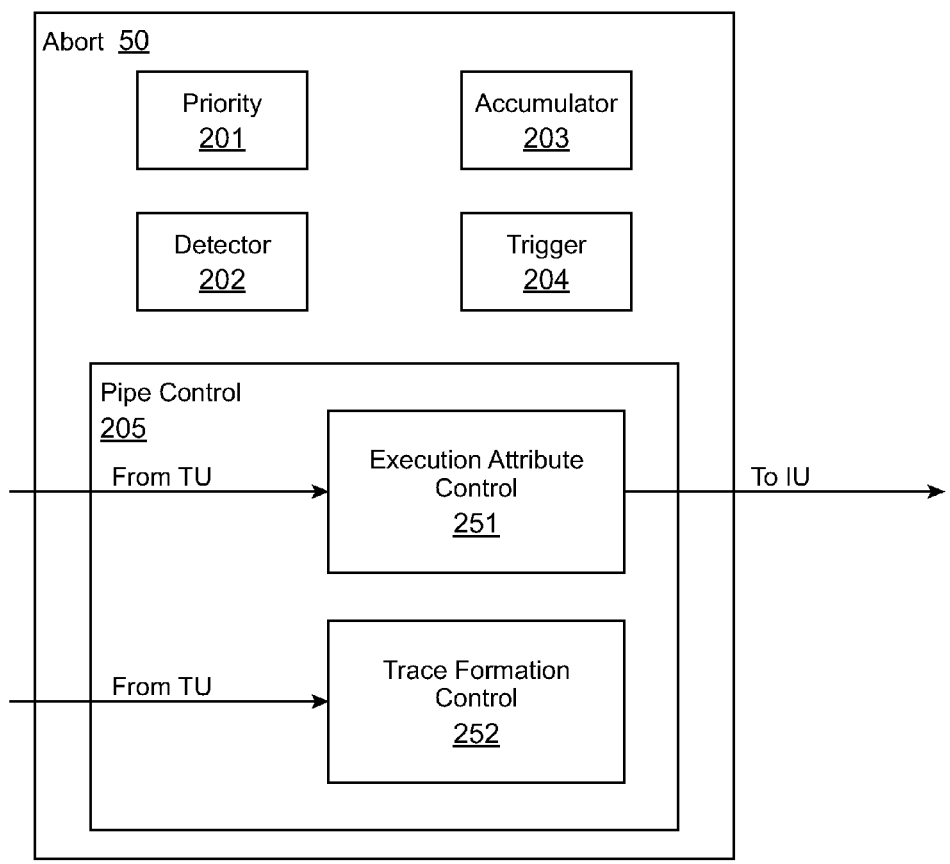
FIG. 2(a) illustrates selected aspects of an embodiment of abort prioritization unit 50 that embody various abort processing functions.

FIG. 2(a) illustrates selected aspects of an embodiment of abort prioritization logic unit 50 that embody various abort processing functions. The abort prioritization logic unit 50 is shown to comprise several elements, illustrated for clarity without interconnections. Relative importance (i.e. abort priority level) of abort triggers is determined by circuitry of (abort) priority unit (or circuit) 201, based on information determined during instruction and trace processing. Individual abort triggers are recognized for processing by priority unit 201 by the circuitry of (abort) detector (circuit) 202. Determining and retaining the highest abort priority level detected for a current execution flow is performed by circuitry of (pending abort) accumulator (circuit) 203. The "held" or pending abort and its associated abort priority level are kept in the accumulator 203.

For some abort priority levels, where there are multiple abort triggers on the same trace, all of the aborts are maintained.

A highest-priority abort event (or trigger) is recognized (or chosen) by circuitry of trigger unit (or circuit) 204. Activities of processor pipelines (such as pipelines embodied in the IU, MU, floating point (FP), and trace unit 12) and abort units (such as the priority unit 201, the detector (circuit) 202, the accumulator 203, and the trigger unit (or circuit) 204) are coordinated by pipe control unit 205. Pipe control unit 205 comprises execution attribute control logic (or circuit) 251 to direct the IU 36 to execute according to various attributes as a function of recognized abort triggers. Pipe control unit (or circuit) 205 further comprises trace formation control logic (or circuit) 252 to determine and direct formation of traces in accordance with recognized abort triggers.

Figure 2B:
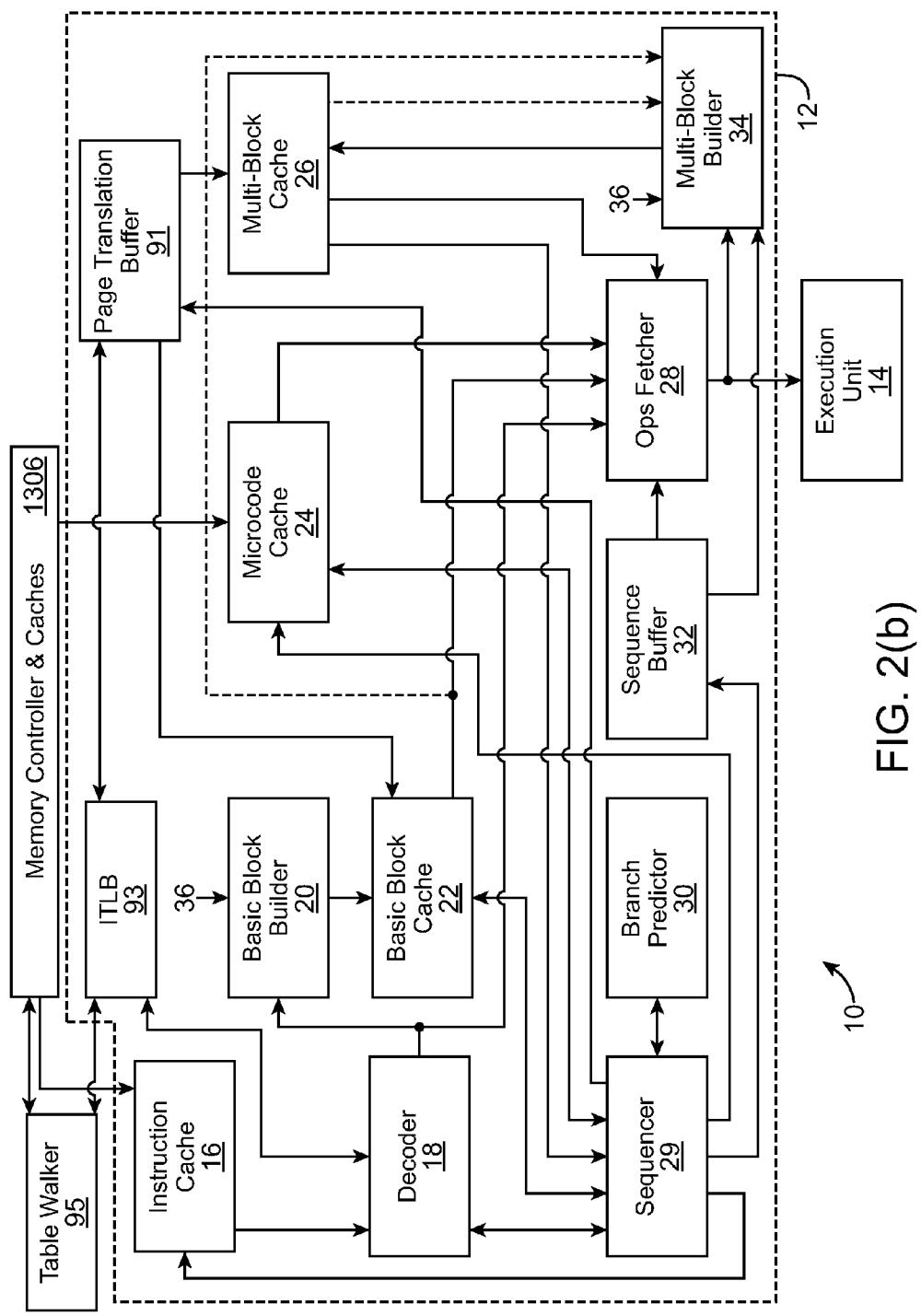
FIG. 2(b) shows further details of the trace unit 12.

FIG. 2(b) shows further details of the trace unit 12. In FIG. 2(b), a processor core 10 is shown to include a trace unit 12 coupled to an execution unit 14 and to a table walker (TW) 95, in accordance with an embodiment of the present invention. "Processor" and "microprocessor", as used herein are synonymous. "Execution unit" and "back end", as used herein, are synonymous.

The execution unit 14 generally executes a sequence of operations (also known as "sequence of code" or "trace") provided by the trace unit 12. The trace unit 12 generally builds sequences of operations for use by the execution unit 14. In so doing, the trace unit 12 operates to reduce the workload of the execution unit 14 by optimizing the sequence of operations in, for example, a basic block and/or multi-block trace.

In accordance with an embodiment of the present invention, the trace unit 12 is shown to include an instruction cache circuit 16, a decoder circuit 18, a basic block builder circuit 20, a basic block cache circuit 22, a microcode cache circuit 24, a multi-block cache circuit 26, an operations fetcher circuit 28, a sequencer circuit 29, a branch predictor circuit 30, a sequence buffer circuit 32, a multi-block builder circuit 34, a page translation buffer (PTB) (also known as "page translation cache (PTC)") 91 and an instruction translation lookaside buffer (ITLB) 93. The ITLB 93 of the trace unit 12 is shown coupled to the table walker 95.

In an alternative embodiment, the basic block cache circuit 22 and the multi-block cache circuit 26 collectively comprise a trace cache circuit.

The basic block builder circuit 20 and the multi-block builder circuit 34 are collectively referred to as a trace builder circuit 36. While the trace builder circuit 36 is a single circuit in one embodiment of the present invention, in an alternative embodiment, the trace builder circuit 36 is physically more than one circuit. For example, the basic block builder circuit 20 of the trace builder circuit 36 is a physically-separate circuit than the multi-block builder circuit 34 of the trace builder circuit 36.

While in the embodiment of FIG. 2(b), the basic block and multi-block cache circuits 22 and 26 are shown to be physically separate circuits, alternatively, they may physically be the same circuit.

In FIG. 2(b), the instruction cache circuit 16 is shown coupled to the decoder circuit 18 and, through the decoder circuit 18, instruction cache circuit 16 receives requests from the sequencer circuit 29. The decoder circuit 18 is shown coupled to the basic block builder circuit 20 and to the operations fetcher circuit 28. The basic block builder 20 is shown coupled to the basic block cache circuit 22. The basic block cache circuit 22 is shown coupled to the operations fetcher circuit 28 and to the sequencer circuit 29. The PTB 91 is shown coupled to the sequencer circuit 29 and is further shown to provide information to the basic block cache circuit 22 and the multi-block cache circuit 26. The PTB 91 is further shown coupled to the ITLB 93, which is shown coupled to the table walker 95 and the decoder circuit 18.

The multi-block builder circuit 34 is shown coupled to the operations fetcher circuit 28 for receiving traces used to build a multi-block trace. Optionally, the multi-block builder circuit 34 is coupled to the basic block cache circuit 22 and the multi-block cache circuit 26 for receiving traces used to build a multi-block trace.

The operations fetcher circuit 28 is shown coupled to the microcode cache circuit 24, the basic block cache circuit 22, the multi-block cache circuit 26, the sequence buffer circuit 32 and the decoder circuit 18. The sequencer circuit 29 is shown coupled to the branch predictor circuit 30, the multi-block cache circuit 26, the microcode cache circuit 24 and the basic block cache circuit 22. The operations fetcher circuit 28 is shown coupled to the execution unit 14.

The instruction cache circuit 16 is a cache, which is a known form of memory, and is generally used to store instructions for optimization by the trace unit 12 before execution thereof by the execution unit 14. The instruction cache circuit 16 provides the stored sequence of instructions to the decoder circuit 18. Instructions, as are referred to herein, are any Reduced Instruction Set Computer (RISC)- or Complex Instruction Set Computer (CISC)-based instruction code, such as but not limited to the x87 instruction code.

The decoder circuit 18 receives the sequence of instructions from the instruction cache circuit 16 and decodes the received sequence of instructions into a sequence of operations.

In one embodiment of the present invention, the decoder circuit 18 is operable to detect a decode time instruction mode that is one of a plurality of instruction modes, and based, in part, on the decode time instruction mode, the decoder circuit 18 decodes the sequence of instructions into a decoder trace.

A decoder trace is based on the sequence of instructions from the instruction cache circuit 16. During decoding, the instruction mode is detected and embedded into the decoder trace. An instruction mode includes information such as the number of parallel bits used in the architecture of the processor core, such as 16 parallel bits vs. 32 parallel data bits vs. 64 parallel bits, which are referred to as 16-bit mode, 32-bit mode, or 64-bit mode, respectively. Alternatively, any other parallel number of bits may be used by the processor core.

Information, in an instruction mode, other than the number of parallel bits used by a processor core, includes default data size, default stack size, relative addressing modes, whether a data segment is good or bad, whether or not data is used, and any other information relevant to the decoding of instructions.

Optimization generally causes operations within the sequence of operations to be re-ordered and serves to reduce the workload of the execution unit 14. Basic block traces, which are at least, in part, based on the sequence of instructions generated by the instruction cache circuit 16, are further optimized. Multi-block traces, which are based on basic block traces or multi-block traces or any combination thereof are still further optimized. One reason for further optimization of a multi-block trace relative to a basic block trace is its size. Multi-block traces are typically longer sequences of operations than basic block traces and in this respect, there are more ways of re-arranging operations to cause further optimization thereof.

Exemplary optimization techniques used by the embodiment of FIG. 2(b) include elimination or removal of certain operations, which essentially serves to reduce the execution unit 14's workload, removal of dependencies between operations, which also essentially serves to reduce the execution unit 14's workload; and more efficient grouping or packing of operations, which essentially benefits the efficiency of the trace unit 12, by causing more compact or denser traces to be built.

In an exemplary embodiment, all traces are executed atomically, i.e. completely executed or completely aborted. When a trace is aborted, none of the operations within the trace have any effect on the architectural state. In other words, trace execution is atomic in that the trace's effects are either committed in their entirety to the architectural state, or prevented in their entirety from having any impact on the architectural state.

If a trace is aborted, the architectural state of the various components of the trace unit 12 and the execution unit 14 are returned to their states as they were prior to the start of the trace. Architectural state is commonly understood as the part of the processor core which holds the state of a process, such as the state of control registers or general purpose registers.

In one embodiment of the present invention, the sequencer circuit 29 operates to select a next sequence of operations from among the decoder sequence of operations (or traces), the basic block sequence of operations (or traces), and the multi-block sequence of operations (or traces). In an alternative embodiment of the present invention, the sequencer circuit 29 sequences the next microcode trace, to be executed by the execution unit 14, by addressing the next microcode trace in the microcode cache 24. Upon identifying the next microcode trace, the microcode cache circuit 24 provides the next microcode trace to be executed to the execution unit 14 for execution thereof.

In operation, the sequencer circuit 29 determines the order in which traces are sent to the execution unit 14 and which traces to promote, which traces to combine. The ops fetcher 28 sends fetched operations to the execution unit 14. At the same time, the sequencer circuit 29 is sending the fetched operations to the execution unit 14, sequencer circuit 29 also sends the fetched operations to the one or both of the builder circuits 20 and 34.

A microcode trace is used when, for example, instructions are either complex or rare. The execution of rare instructions need not be efficient. Certain complex instructions, such as "string manipulation" need to be optimized, and are done so manually into microcode traces. During manual optimization, the objective is to try to make the operations compact or create traces that include the least number of operations possible.

An example of a microcode trace is based on segmentation changing code known to be used by x87 code programmers. In the case of segmentation changing code, microcode traces, rather than decoder traces (basic block or multi-block) are used, and no additional optimization thereof is performed.

A microcode trace is generally represented by a sequencing action. That is, the decoder circuit 18 determines that a sequencing action is microcode and terminates a current basic block trace. Upon termination of the current basic block trace, by the decoder circuit 18, a sequencing action results in a 'call' to a microcode trace identified at a particular address in the microcode cache circuit 24. The microcode trace is retrieved, from the microcode cache circuit 24, by the operations fetcher circuit 28 and is provided, by the operations fetcher circuit 28, to the execution unit 14 for execution thereof.

Thereafter, either the sequencer circuit 29 sequences the next basic block trace, another trace, or additional microcode traces are sequenced and executed. A microcode trace includes a control transfer and sequencing action.

The sequencer circuit 29 performs various critical functions. Among which is identifying the next trace to be executed by the execution unit 14, and in doing so the trace unit 12 decouples the sequencing time from the execution time. The sequencing rate refers to the number of clock cycles used for sequencing a next trace. A typical sequencing rate is once every four clock cycles although in other embodiments other sequencing rates are employed. A "cycle", as used herein, refers to a clock cycle.

In one method and embodiment of the present invention, the sequencer circuit 29 sequences ahead of the execution unit 14 and instructs the branch predictor circuit 30 to predict all predictions associated with a sequencing action. The next address resulting from a sequencing action is predicted by the branch predictor circuit 30. A predicted result is also known as a "projected result".

For example, a sequencing action that might result in three possible target addresses will have three possible target addresses associated with it. The different target addresses are generated by the branch predictor circuit 30 and stored in a target address predictions storage location. The foregoing results in higher power consumption and higher performance by the trace unit 12.

The hardware described above, including any logic or transistor circuit, may be generated automatically by computer based on a description of the hardware expressed in the syntax and the semantics of a hardware description language, as known by those skilled in the art.

Applicable hardware description languages include those provided at the layout, circuit netlist, register transfer, and schematic capture levels. Examples of hardware description languages include GDS II and OASIS (layout level), various SPICE languages and IBIS (circuit netlist level), Verilog and VHDL (register transfer level) and Virtuoso custom design language and Design Architecture-IC custom design language (schematic capture level). The hardware description may also be used, for example, in various behavior, logic and circuit modeling and simulation purposes.

FIG. 3 shows a flow chart abstractly depicting various abort triggers and each of their respective corrective action. In FIG. 3, abort triggers 100 are shown to serve as input to the abort prioritization logic 50. The abort triggers 100 include the triggers 70-76. The abort prioritization logic 50 is shown to generate any one of N number of abort reasons, N being an integer number, for any given abort trigger. Abort triggers may be external or internal, as earlier noted.

An abort reason identifies the reason for the problem detected within a trace that has been sequenced by the trace unit 12. Identification of an abort reason and the type of trace are used to determine a corresponding corrective action that is to be taken to correct or mitigate the problem with the trace.

A trace type is a combination of the trace's property and the trace's attribute. Examples of attributes are non-speculative and single instruction. Trace property identifies if, for example, a trace is a basic block trace, a multi-block trace, or a microcode trace in the case where such traces are employed.

It is understood that trace property can include additional traces or any one of the foregoing or any other combination. In the case where there is only a basic block trace employed or only a multi-block trace employed or any other traces, no trace property is used.

Each abort reason is identified with one of the three possible trace properties in the case where basic block, multi-block and microcode traces are used. In FIG. 3, the number of trace types is M, M being an integer value. Thus, each abort reason is associated with one of M different trace types.

As an example, in FIG. 3, the abort trigger 100 identifies abort reason 2 102 as the reason for the problem associated with a trace. Furthermore, the abort reason 102 is applied to trace type 1 104. In this manner, a trace that is identified as having a problem is identified and appropriate (corrective) action is performed based on the trace type and the abort reason, thereby advantageously allowing for a trace that can be any of M types to be gracefully degraded.

As previously noted, a trace includes operations that represent instructions. A sequence of instructions is decoded to generate a sequence of operations by the trace unit 12. An instruction may result in multiple operations.

In accordance with a method of the present invention, a method of handling a trace to be aborted (or a method of graceful degradation) uses a protocol to handle the abort. The method includes the step of receiving an indication of a trace to be aborted, i.e. abort trigger, where the trace is of a trace type, where the trace type includes a set of attributes. A set of attributes is zero or more attributes.

The method further includes the steps of receiving an indication of an abort reason, i.e. abort trigger, corresponding to the execution of the trace to be aborted, identifying a corrective action based, at least in part, on the type of the trace to be aborted and on the abort reason, without taking into account a correspondence between the operation that caused the execution of the trace to be aborted and the instruction that the operation at least in part represents. The method further includes the step of determining a next trace (or a version of the current trace to be aborted) for execution and the type of the next trace, based on the trace to be aborted and on the corrective action. It is understood that multiple operations may correspond to a single instruction. Additionally, a trace may have operations representing one or more instructions.

A next trace may be sequenced and/or executed immediately after the trace to be aborted. In some embodiments however, that would always happen. In other embodiments it would never happen. In yet other embodiments it might or might not happen, depending on what else was going on in parallel or concurrently with the trace to be aborted.

The foregoing next trace is not necessarily sequenced and/or executed immediately after the trace to be aborted. In some embodiments, the next trace is sequenced and/or executed immediately after the trace to be aborted. In other embodiments, the next trace is never sequenced and/or executed immediately after the trace to be aborted. In yet other embodiments, the next trace might or might not be sequenced and/or executed immediately after the trace to be aborted, depending on what else was going on in parallel or concurrently with the trace to be aborted.

In some cases, the next trace represents a sequence of instructions that is a subset of the sequence of instructions represented by the trace to be aborted.

The foregoing steps are repeated until the execution of the current version of the trace that was to be abort does not generate any abort reason. The current version of the trace may be the same trace, In some instances, an operation represents a part of an instruction.

In some instances, a trace may include correspondence between the operation that caused the execution of the trace to be aborted and the instruction that the operation represents. That is, some traces might have some operations that have some correspondence information. Other traces do not have operations that have correspondence information. In yet other traces, a subset of the operations of a trace are known to correspond to a subset of the instructions that the trace as a whole represents.

An exemplary corrective action is invalidating a cached version of the trace to be aborted.

Others are 1) determining that the next trace to be successfully executed is the same as the trace to be aborted and keeping all of the attributes of the next trace to be the same as the attributes of the trace to be aborted; 2) determining that the next trace to be successfully executed is the same as the trace to be aborted and altering at least one of the attributes of the next trace to be successfully executed to be different from the attributes of the trace to be aborted; 3) determining that the next trace to be successfully executed is a degraded version of the trace to be aborted and keeping all of the attributes of the next trace to be the same as the attributes of the trace to be aborted; or 4) determining that the next trace to be successfully executed is degraded version of the trace to be aborted as the next trace and altering at least one of the attributes of the next trace (to be successfully executed) to differ from the attributes of the trace to be aborted.

Graceful degradation is a process for determining the trace to be sequenced next by the sequencer 29 and in so doing uses a protocol to determine the corrective action to be taken in the presence of an abort trigger. A trace that results in an abort, may be refetched and sequenced accordingly for execution or it may result in a different trace being fetched and sequenced accordingly for execution or it may be degraded and sequenced accordingly for execution. For example, a multi-block trace may be degraded to multiple basic block traces. In an exemplary embodiment, a multi-block trace represents a sequence of instructions that includes a control transfer instruction internal to the sequence of instructions and a basic block trace represents a sequence of instructions that includes no control transfer instructions internal to the sequence of instructions.

In a trace-based processor architecture using basic block, multi-block and microcode traces, when the trace to be aborted is a multi-block trace, the degraded version of the trace to be aborted is one of: 1) a single instruction trace representing an initial instruction of the sequence of instructions; 2) a basic block trace representing a subset of the sequence of instructions where the subset begins with an initial instruction of the sequence of instructions; or 3) a multi-block trace representing a subset of the sequence of instructions where the subset begins with an initial instruction of the sequence of instructions.

When the trace to be aborted is a basic block trace, the degraded version of the trace to be aborted is one of: 1) a single instruction trace representing an initial instruction of the sequence of instructions; 2) a basic block trace representing a subset of the sequence of instructions where the subset begins with an initial instruction of the sequence of instructions.

When the trace to be aborted is a speculative single instruction trace (or a trace having speculative and single instruction attributes), then the degraded version of the trace to be aborted is one that has non-speculative single instruction attributes and represents the same instruction.

In the graceful degradation protocol (or process) of the various methods and embodiments of the present invention, if the same problem previously encountered with the trace is again encountered, then an alternative corrective action may be performed. The alternative corrective action is selected based on a criterion known to cause minimal performance impact.

In one exemplary method, the process of graceful degradation is stateless in that the history of a problem (or abort) is not maintained and therefore cannot be relied upon, in resolving the abort. However, in certain exceptional cases, history is maintained and used in the corrective action so as to, for example, avoid the situation of entering into an endless loop. Alternatively, the process of graceful degradation is not stateless and history of the problem is maintained.

Graceful degradation advantageously guarantees forward progress in attempting to correct a problem with a trace and it does so in a manner causing minimal performance impact. Accordingly, it provides an optimal approach in resolving or attempting to resolve a problem with modest performance impact.

As previously noted, graceful degradation, in accordance with various methods and embodiments of the present invention, attempts to correct problems associated with a trace based on the type of abort trigger encountered and reason therefor, which advantageously improves performance over generic graceful degradation because the latter attempts to correct problems with a trace regardless of the abort reason.

As previously noted, the corrective action might require the same trace to be refetched or it might require a different trace to be fetched or it might require more severe action. If the attempt to correct the problem with the trace (or corrective action) fails, again, either the same trace or a different trace (the next trace) is identified (or determined). This process is repeated until the execution of the current version of the trace does not generate any abort reason.

In an exemplary method of handling aborts, identifying of the corrective action is based exclusively on the type of the trace to be aborted and on the abort reason.

Where the next trace is a different trace than the trace that was to be aborted, the latter might have resulted because of a more severe action relative to the previous trace and this process is repeated until the trace is corrected or the trace is ultimately broken down into one or more traces with single instruction attributes, or even one or more traces with single instruction and non-speculative attributes, which is the most severe and undesirable action that can be taken as a corrective action. The process of handling the abort ends when there are no more abort reasons when executing the current version of the trace. A trace may have zero or more (or a set of) attributes. That is, some traces have no attributes.

Accordingly, gracefully degrading a trace includes the steps of detecting a problem associated with a trace, based upon the detected problem, identifying a corrective action and resolving the detected problem associated with the trace using the identified corrective problem. The corrective actions are defined by a multi-step graceful degradation protocol, an example of which is provided in Table 1 and its related discussion; and a more detailed example of the protocol is provided in Table 3 and its related discussion.

Examples of various reasons/ways in which abort triggers are caused are discussed herein. In some cases specific examples are provided, however, it is understood that these are merely examples provided to help in an understanding of graceful degradation and are not in any manner used to limit the scope of the present inventions.

One of the reasons for the occurrence of an abort is that the execution unit 14 may abort the execution of a particular trace because of the behavior of one the x87 instructions from which the trace unit 12 built that trace. As one example, a particular x87 instruction that attempts to accesses a restricted or invalid memory address will cause an exception, which is variously named a segmentation fault, protection violation, address error, or trace unit 12 access violation. This exception will be thrown regardless of how the trace unit 12 builds traces that contain that instruction and regardless of how the execution unit 14 executes those traces. When this exception occurs, the execution unit 14 signals the trace unit 12, which in turn schedules the execution of a microcoded operation (op) that handles all occurrences of such exceptions. The terms "op", "operation", "memory operation" and "memory op" are used synonymously herein.

The sequencer 29 of the trace unit 12 chooses which trace(s) goes to the IU 36 next. The traces that are sent to the IU 36 by the ops fetcher 28 are referred to herein as sequence of traces.

The next trace that the IU 36 of the execution unit 14 receives from the trace unit 12 is the outcome of the graceful degradation process. When a trace aborts, any effects on architectural state from operations in the aborted trace are rolled back. Also when a trace aborts, the sequence of traces, as sent, to the IU 36 of the execution unit 14 is disrupted.

The execution unit 14 typically executes operations from several traces substantially concurrently and/or in parallel. Execution is aborted of any operations from any trace that is later in the sequence of traces than the aborted trace. Such operations are discarded, and any effects of operations from such traces are rolled back.

The execution unit 14 may also abort the execution of a particular trace, and signal the trace unit 12 accordingly, because that trace did not execute as expected. As a first example, the execution unit 14 may speculatively predict the value of a load operation, and subsequently that value is found to be wrong. When a load value exception occurs, the trace unit 12 may respond to the abort signal from the execution unit 14 by rescheduling execution of the same trace that aborted, but in a different mode—for example, a mode that disables load value prediction during that execution of that trace. As a second example, the execution unit 14 may detect that an interior branch went opposite to the branch direction that was used to build that trace. In this case, the trace unit 12 may respond to the abort signal (coupled onto the link 42) from the execution unit 14 by scheduling a different trace, perhaps one of the basic block traces from which the trace unit 12 built the aborted trace, or perhaps a multi-block trace built using the opposite direction. Generally, when an abort trigger is received by the execution unit 14, the corrective action generated as a result thereof may require the same trace to be refetched, a different trace to be refetched, or a more severe action to be taken—all of which are done in an effort to make forward progress.

In one embodiment of the present invention, the abort triggers 100 are generated by the execution unit 14 while the abort reasons, in association with the trace types, causing a corrective action to be taken, are performed by the trace unit 12.

In Table 1, each column represents an abort reason of which there are N, N being an integer value and each row represents a trace type. Identifying the abort reason and the trace type results in a corrective action that is taken by the trace unit 12, execution unit 14 or both.

As an example, in Table 1, the corrective action #1A is taken when an abort reason #1 is detected in association with trace type #A. Because there are N abort reasons and M trace types, there are N times M corrective actions. Examples of corrective actions corresponding to abort reasons and trace types are presented in Table 3.

TABLE 1

|  | Abort Reason #1 | Abort Reason #2 | ... | Abort Reason #N |
|---|---|---|---|---|
| Trace Type #A | Corrective Action #1A | Corrective Action #2A | ... | Corrective Action #NA |
| Trace Type #B | Corrective Action #1B | Corrective Action #2B | ... | Corrective Action #NB |
| . | . | . | . | . |
| . | . | . | . | . |
| . | . | . | . | . |
| Trace Type #M | Corrective Action #1M | Corrective Action #2M | ... | Corrective Action #NM |

Figure 4:
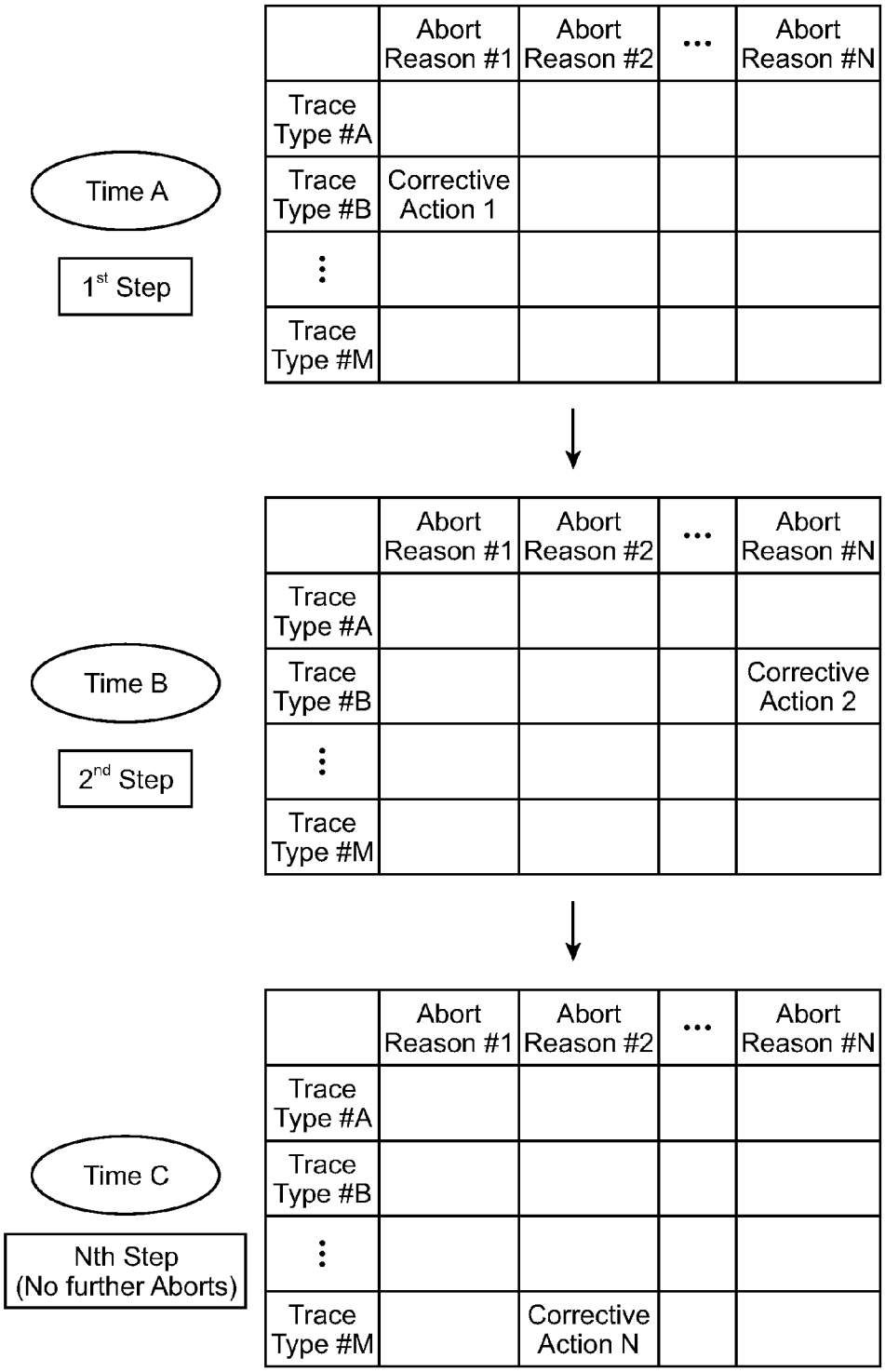
FIG. 4 shows an abstract view of the different states of Table 1 as time elapses from Time A to Time B to Time C.

FIG. 4 shows an abstract view of the different states of Table 1 as time progresses from Time A to Time B to Time C. At Time A, as a first step, an abort reason #1 and trace type #B are detected resulting in the corrective action 1 being taken. If yet another abort occurs, at Time B, as a result of a problem with the trace that caused the abort at Time A, abort reason #N and trace type B are detected resulting in corrective action 2, performed as a second step. Finally, upon the occurrence of yet another abort of the same trace as that of Time A and Time B, at Time C, at an Nth step, abort reason #2 and trace type #M are detected and result in the corrective action N, which corrects the problem of the initial trace and no further abort is taken.

Figure 5:
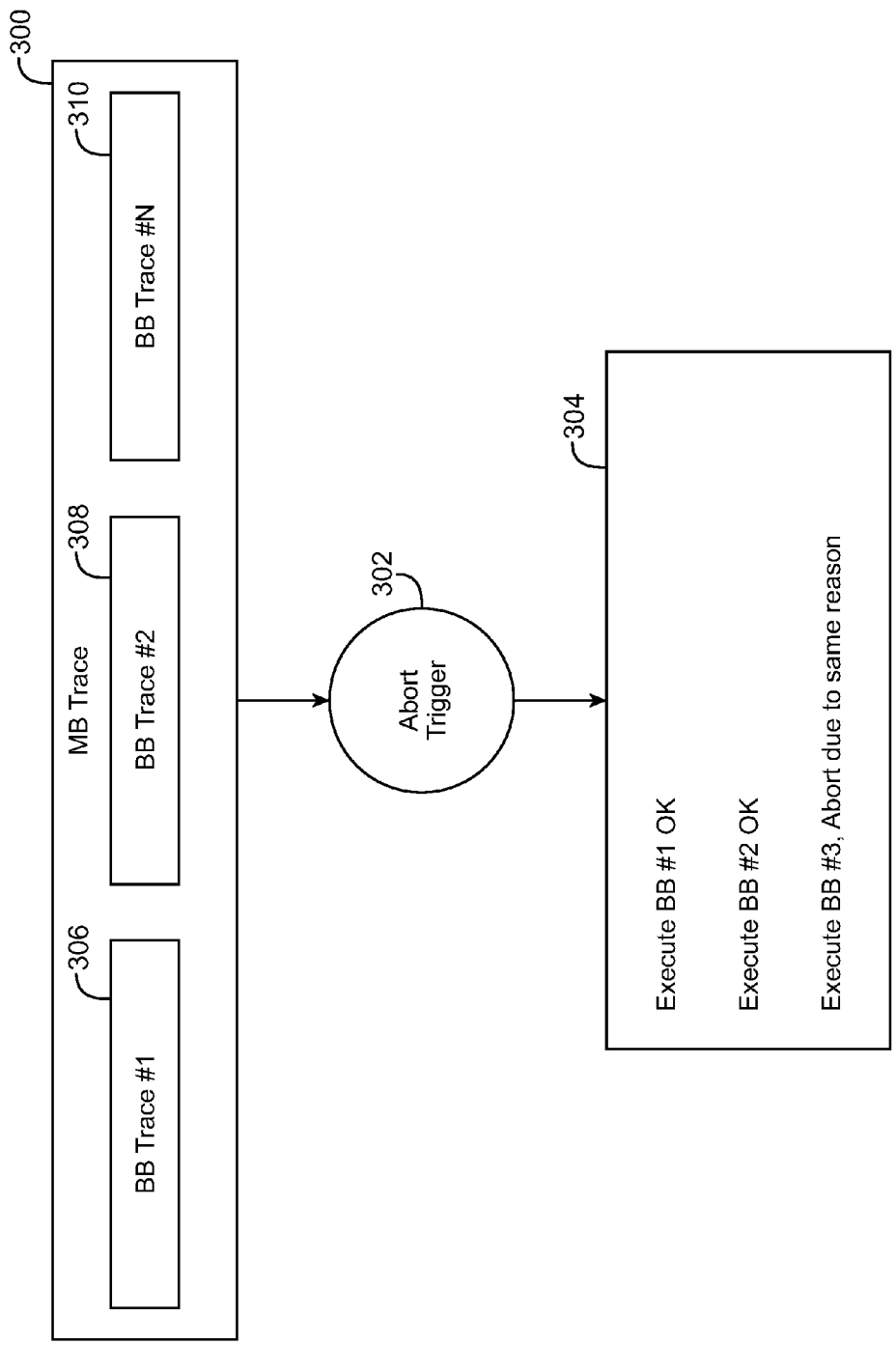
FIG. 5 shows an exemplary flow of the effect of graceful degradation on a multi-block trace, in accordance with an embodiment of the present invention.

FIG. 5 shows an exemplary flow of the effect of graceful degradation on a multi-block trace, in accordance with an embodiment of the present invention. The multi-block trace 300 is shown to cause reporting of an abort trigger 302 due to a problem associated with the trace 300. The abort trigger 302 may be any one of the abort triggers 70-76 of FIG. 2. The priority of the abort is determined by the abort prioritization logic 50. The abort trigger 302, upon being arbitrated and prioritized by the abort prioritization logic 50 results in a corrective action that ultimately results in the breakdown of the trace 300 to multiple basic block traces 304. In this example, the trace 300 is broken down to three basic block traces: #1, #2 and #3. The basic block trace #1 executes successfully, as does the basic block trace #2, in the example of FIG. 5, but the basic block #3 results in an abort due to the same abort reason as that detected for the trace 300.

In an embodiment of the present invention, a trace spans several basic blocks across branch points. Branch points occur as a result of an instruction that requires the program counter to continue out of its sequential program order. This type of trace is created because the branches are highly biased, or frequently encountered, at the time. If a branch misprediction is detected, i.e. the address predicted to be jumped to is erroneously predicted, this may signify that the trace is no longer useful and it is accordingly invalidated or removed from its respective trace cache. In one method of so doing, the trace is immediately invalidated because once the trace starts going wrong, it is no longer a valid trace. In another method, the trace is maintained and not invalidated. This is particularly done when the trace's interior branch misprediction, such as in the case of a multi-block trace, occurs frequently. In this case, the trace still has a high bias and one method of effectuating the foregoing is by monitoring the number of mispredictions that occur. For example, if two mispredictions occur consecutively, then the trace is invalidated.

Yet another method is to invalidate the trace if the misprediction rate increases to a value that is too large. That is, if the time since the last misprediction is less than a predetermined number, the trace is invalidated. In this manner, a trace with mispredictions occurring less than once in a predetermined period of time is allowed to remain valid. Maintaining a trace valid advantageously obviously avoids building the same trace over again. There are several options that can be used to determine the rate of mispredictions, one is to have the rate be programmable, another is to dynamically change the rate based on performance metrics, and others are contemplated. An initial value for the rate may use the number of iterations employed when building the trace.

The foregoing attempts at maintaining traces as valid traces and others that are contemplated attempt to prevent unnecessary invalidation of traces. Unnecessary invalidation results in adversely affecting system performance. There is a tradeoff however, between attempting to maintain traces valid and maintaining too many traces that result in too many mispredictions thereby occupying valuable cache space. This tradeoff is at least one of the basis for determining the scheme used in declaring traces invalid, some of which are discussed above.

Abort triggers and processing of them is influenced by the type of the trace that is executed. In response to an abort trigger, the IU 36 may direct the trace unit 12 to fetch a modified or different type of trace as described below and in the Table 2 as follows:

TABLE 2

| Trace Formation | Description |
| --- | --- |
| Re-fetch | Re-fetch the trace without modification. |
| Fetch Basic Block | Invalidate the trace and fetch as basic blocks. |
| Fetch Instructions | Fetch the indicated trace by decoding single instructions per trace. |
| Single-Instruction Fault | Begin fetching the exception handler indicated by the IU. |
| Single-Instruction Trap | Begin fetching the exception handler indicated by the IU. |
| Interior Branch Mispredict | Fetch the trace is basic blocks until the mispredicted branch is reached, then fetch the remainder of the trace. |
| Final Branch Mispredict | Fetch the trace corresponding to the correct branch destination. |

If a multi-block trace was fetched, and the IU 36 requests that it be re-fetched as basic block traces, the trace unit 12 is not aware of the number of basic block traces comprising the original trace. Therefore, the trace unit 12 can fetch the first basic block trace from a corresponding trace cache and fetch subsequent basic block traces from any source. Thus, the trace unit 12 commonly fetches those traces from, for example, the basic block cache or the decoder block, but the trace unit 12 might instead fetch a trace from the multi-block cache, which the IU 36 might also request to be re-fetched as basic block trace(s). In the event of such an uncommon occurrence, IU 36 continues to make forward progress toward handling the abort trigger.

Similarly, if a basic-block trace was fetched, and the IU 36 requests that it be re-fetched as single instructions, the trace unit 12 is not aware of the number of instructions comprising the original trace. Therefore, the trace unit 12 can fetch single instructions until the first branch instruction that would have terminated a basic block. Alternatively, if the number of instructions fetched by trace unit 12 has reached a predefined threshold, trace unit 12 can begin fetching from any source.

The threshold can be set so that the singly decoded instructions would rarely or never fit within a single basic block cache entry. If trace unit 12 fetches subsequent instructions from basic block cache or multi-block cache, IU 36 might also request that this trace be re-fetched as single instructions. In the event of such an uncommon occurrence, IU 36 continues to make forward progress toward handling the abort event precisely (or by single instruction or single instruction, non-speculative execution).

Trace Execution Attributes

A variety of one or more attributes may be applied to a trace during its execution to enable forward progress or precise exception handling. Examples of trace attributes comprise:
  disable all speculation
  disable value prediction
  perform memory accesses in order
  Cache line loss (MP)
  handle cache misses in order The meaning and use of the attributes is described below in descriptions of the various abort triggers.

An abort priority scheme provides that each event (or abort) that could cause a trace to be aborted is assigned a priority. Some embodiments recognize the highest priority event as an "official" abort trigger, and proper action (or corrective action) is taken to control speculation and processing in accordance with the event.

A variety of abort triggers (or types of abort triggers) are detected according to various embodiments, by logic such as (abort) detector 202, and subsequently prioritized, by logic such as (abort) priority unit 201. Each event is assigned a numerical priority, i.e. abort priority level, wherein a relatively lower number corresponds to a relatively higher priority. Each event also has an associated (corrective) action to be taken if the event is recognized (or chosen) as the abort trigger, such as by (abort) trigger unit 204. The corrective actions are performed under direction of control logic, such as pipe control unit 205.

Pending Abort Accumulation

Pending abort accumulation, such as performed by (pending abort) accumulator 203, comprises tracking the highest abort priority level found so far for a current flow of execution. If no abort is pending, and then an abort occurs, the abort is recorded. If an abort is recorded, and another abort trigger is found in the same trace, the new abort (which is the pending abort) is recorded only if it is of higher abort priority level than the previously recorded abort trigger. If the new abort trigger is recorded, then the old abort trigger is discarded. If an abort trigger is recorded, and then another abort is found in an earlier trace (in program order), the new abort trigger is always recorded, regardless of its relative priority. If an abort is recorded, and then another abort is found in a later trace (in program order), the new abort is never recorded, regardless of relative priority. Thus priority is given to abort known to be earlier in program order (based on atomic trace order corresponding to the original program order), while giving priority within a trace according to the abort priority scheme.

There may be several different aborts associated with a abort priority level, such as priority 0, causing the trace from which the abort was detected to be refetched and re-executed. If an abort of priority 0 is recorded, and another priority 0 abort is found in the same trace, then the desired action of the second abort is recorded in addition to the desired action already recorded for the first abort. For example, if a load value misprediction is found during execution of a trace, then the desired (or corrective) action is to re-execute the trace with load value prediction disabled. If an intra-processor order violation is subsequently found during execution of the (same) trace, then the desired memory constraint is recorded, and the pending abort accumulation logic continues to remember that load value prediction should also be disabled when the trace is re-executed.

As soon as a new abort is recorded in the pending abort accumulation logic, the trace unit 12 is directed to begin fetching/composing the desired trace to replace the aborted one (but see the Exception and Special cases, following). If multiple aborts are recorded for a single executing trace, then each sends a new direction to the trace unit; however, the final effect is as if only the last direction were sent.

Exception case: An abort may be detected for an early part of a trace while the remainder of the trace is still being fetched. A recorded single-instruction trap or final branch misprediction doesn't result in a new direction being sent to the trace unit 12 until fetch of the current trace is complete. This avoids corrupting the current trace when correcting the subsequent trace.

Special case: If a single-instruction trap and a final branch misprediction both occur, then the correct result (assuming no higher priority abort trigger) is to record the next Program Counter (PC) for the corrected branch target, but to fetch the trap exception handler as the next trace to be executed. Both require an appropriate directive to be sent to the trace unit 12. If the final branch misprediction is recorded first, and the single-instruction trap is recorded later, then the two directives are naturally sent to the trace unit 12, and it responds accordingly. If the two abort triggers occur in the opposite order, then without special processing the single-instruction trap would be recorded and the final branch misprediction would be ignored. To rectify this, the logic sends the original directive for the single-instruction trap, then sends an extra directive for the final branch misprediction, and then finally re-sends the single-instruction trap directive to ensure that the correct trace is fetched. Similar special handling is invoked if both abort triggers are found while the current trace is being fetched (meaning that no directive could be sent until fetch is complete).

In some embodiments, the current stream of execution is not ended until it commits to an abort trigger. Because an abort with a higher priority level may yet be found in an earlier trace, execution never ends until the pending abort is on the earliest (i.e. oldest according to program order) trace that is not yet committed. Once a trace is "oldest" in flight (oldest not yet committed), execution is ended at an appropriate time based on the pending abort.

For a priority 0 abort trigger, execution may be ended as soon as the abort was detected in the oldest trace. Some embodiments record additional actions (constraints) to take when the trace is re-executed (even though no higher priority abort trigger will be found). Some embodiments immediately end execution of the trace (with the possibility of needing to abort again with additional constraints a next time). Some embodiments delay ending execution of the trace until it is known that all desired constraints have been found. Some embodiments continue execution until a re-fetched trace (from the direction sent to the trace unit 12) is ready to execute (in the meantime gathering additional constraints that may be found). Then execution of the trace is ended (with respect to the current fetch stream) and then execution of the re-fetched trace begins.

For an abort priority level that is at least a level lower in priority than the highest priority level, a higher priority abort event may remain undiscovered in the trace. The trace must be allowed to continue to execute to determine if a higher priority abort event occurs. Some abort events (i.e. a fault or a disallowed non-cacheable access) prevent an operation from completing. Special measures are taken to continue the trace. These measures are described elsewhere herein (See the Deleterious Event section). When the trace is complete (ready to commit except for the pending abort), execution ends, and the final recorded abort reason applies.

For still lower priority levels, execution is ended as soon as the trace that caused the abort commits. The trace is committed because the operations in the trace have computed the correct results (although the next trace (or the current version of the trace) needs to execute differently). After committing the current trace, execution is ended immediately before the next trace is allowed to commit.

In all cases, at the time that execution ends, the aborted traces and later traces (in program order) may have executed one, many, or all operations. The results of these operations are discarded, and execution state is rolled back to the checkpoint architectural state for the oldest trace that was aborted.

Deleterious Event

Alternatively, for graceful degradation and abort priority schemes, when a bogus operation is detected, following operations are ensure to not have a bogus problem. Deleterious event processing, such as performed by all or portions of pipe control unit 205, controls pipeline actions to eliminate results of incorrect operations and to provide for execution of correct operations. An operation that triggers a fault is considered to be incorrect (or "bogus"), as is an operation in a speculative trace that attempts to access non-cacheable memory. In either case, the trace must be aborted. However, the trace is allowed to continue executing as long as possible to provide an opportunity to discover any possible higher priority abort triggers. Continuing to allow processing after discovering a faulting operation requires a mechanism to allow the faulting operation to complete, as well as to allow completion of some or all dependent operations. At the same time, the faulting and subsequent operations may not be allowed to actually execute (i.e. to complete or to irrevocably alter architectural state).

A first mechanism to enable collecting additional abort triggers without altering architectural state is in accordance with a concept of bogus operations (or simply bogus "ops"). A bogus op issues, wakes up dependent operations, and is removed from a scheduler as usual, but its execution is suppressed. When a memory operation fails to complete, it and all dependent operations are cancelled as usual. If the reason for the completion failure is temporary, then no special abort processing is employed, as usual execution mechanisms suffice. If the failure reason causes an abort trigger, then subsequently (such as in a next cycle) the operation is allowed to execute again. In some embodiments a bogus-flag is asserted to indicate an op is bogus (and deasserted otherwise). The operation is thus allowed to re-issue, but it is marked as bogus by the bogus-flag.

Whenever an op issues, the corresponding bogus-flag is checked. If the op is bogus, then the op is converted to a no-operation, or NOP (as far as execution of the op is concerned). The op is thus prevented from causing any additional abort triggers, and is also prevented from modifying architectural state. However, a bogus op wakes up dependent operations at the same time and in the same manner as the same op without an asserted bogus-flag. When subsequent ops are issued that are dependent upon a bogus op, the dependent ops are also marked bogus. When an op issues, it compares its dependency vector against a vector of bogus-flags. If the issued op depends on a bogus op, then the bogus-flag is set for the issued operation, and the issued op is converted to a NOP.

Meanwhile, independent ops are allowed to execute as usual. If one of the independent ops causes a lower priority abort event, the op is marked as bogus, but the abort itself is discarded. If an independent operation causes a higher priority abort event, then the higher priority abort event is recorded and delaying was beneficial, as an additional trigger was successfully collected.

Bogus-flags are propagated from an op even after the op has been removed from a scheduler. Thus the bogus-flag is left unchanged when the op is removed from the scheduler. All bogus-flags are cleared at the time that execution is ended due to the abort.

New operations are kept from entering the scheduler after bogus operations have been removed from the scheduler until execution ends on the current fetch stream. In some embodiments a trigger for the first bogus-flag always causes a directive to be sent to the TU to fetch a different trace. After the directive is sent, new ops/traces from the TU are held prior to entering the scheduler. These ops remain on hold until execution ends on the old fetch stream. Hence following the first abort, no new ops enter the scheduler until after execution ends for the current fetch stream. Thus, there are no new ops to be confused with respect to asserted bogus-flags.

An abort trigger that uses the bogus-flags also immediately triggers a directive to stop the flow of incoming ops, disabling trace op fetching. However, the trace with the abort trigger may still have ops being fetched/renamed. In other circumstances, the fact that the end of the trace is not reached would imply that the trace is not allowed to commit. The bogus-flags would otherwise be used to allow the end of execution to be delayed until the time at which the trace would otherwise be committed, but this time never occurs if the trace never fetches its last op(s). A trace that is committed has executed all of its operations and has changed the architectural state of the processor. During execution of the trace, resources were allocated to keep track of the execution history and to allow the trace actions to be rolled back in case of an abort. When the trace commits, these resources are freed.

Thus at the time that the stop directive is sent to the trace unit 12, the trace being fetched is artificially marked as having fetched all ops. If this is the trace with the pending abort, then the pending abort only needs to wait for the ops received so far to complete. This is correct since using the bogus-flags serves to complete all ops previous to the one that triggered the abort. As a side effect, using the bogus-flags also serves to complete ops that are fetched and after the offending op in program order.

A second mechanism to enable collecting additional abort triggers without altering architectural state comprises processing ops that are in the scheduler and independent of a failing op when the failing op does not finish. When a memory operation fails to complete, it and all dependent ops are cancelled. If the reason for the completion failure is temporary, then the cancellation is processed as usual. If the failure reason causes an abort event, then the op is not permitted to issue again.

A directive is sent to the trace unit 12 based on the pending abort, but operations already in the scheduler are allowed to continue being issued as their dependencies are satisfied. Eventually, either the trace becomes committable or the entire pipeline empties. If no op is being issued and no ops are currently executing that might wake up another op, then it is guaranteed that all ops that are independent of the offending op have completed. The highest priority pending abort is then processed.

In some embodiments, if any op issues for a trace that is later (in program order) than the one with the pending abort, then the op is squashed, as there may be little benefit in allowing it to execute. In some scenarios the squashed op may have had a chance to wake up dependent ops before it is squashed. In any case, there is little or no value in executing ops from later traces, and little or no value in waiting for any long execution (such as a cache miss) that the later ops might require. In some scenarios the squashing is most beneficial when it squashes a load or store.

Since a directive has been sent to the trace unit 12, there are no new ops that need to be fetched into scheduler entries. Therefore, leaving unprocessed ops in the scheduler until execution ends on the current fetch stream never causes a deadlock or performance problem.

Determining when the pipeline is empty comprises examining the state of MU 44 processing as well as IU 36 processing. To ensure that no op may be woken up in the current trace, not only must the IU 36 functional unit pipelines (such as an ALU pipeline) be empty, but the MU 44 must not have any cache or translation look-aside buffer (TLB) misses outstanding that would have the potential to wake up a dependent op. The MU 44 sends a signal to the pending abort logic describing whether there are any operations queued and waiting for memory data. In some embodiments the state of floating point processing is also examined when determining the pipeline is empty, to ascertain if there are any ops remaining in the floating point that are associated with the core sourcing the offending op.

A third mechanism to enable collecting additional abort triggers without altering architectural state comprises allowing ops in an abort-sourcing trace to execute. Faulting memory ops are allowed to complete normally, although the fault is recorded as a pending abort. Meanwhile, the trace is allowed to complete as usual, and then the pending abort is processed.

If a faulting op result is used by a dependent op to trigger a higher priority abort, an incorrect abort type may result. However, eventually the correct result will be produced. The spurious abort type occurs in limited circumstances, such as on a fault or on a speculative non-cacheable access (i.e. rare events). A microcode interior branch is coded such that it is independent of potentially faulting non-memory operations, or an alternate microcode handler for a mispredicted interior branch retests the condition. Microcode conforms to a constraint that a microcode interior branch must appear ahead of all memory ops for correct non-speculative behavior.

Table 3 presents more specific abort triggers and trace types that result in corrective actions, as employed in an exemplary graceful degradation protocol. The first column of Table 3 lists various abort triggers. The second through the fourth columns of represent corrective actions to be taken for each abort trigger and trace type. Table 3 provides a specific example of Table 1 and the tables of FIG. 4 except that the rows and columns are reversed.

TABLE 3

| | Abort trigger | MB Trace | BB Trace | SI Trace | Emcode Trace |
|---|---|---|---|---|---|
| 1 | MOC order violation | Refetch and record constraint | Refetch and record constraint | NA | Refetch and record constraint |
| 2 | MP loss w/o MpLoss Attr* | Refetch w/ MpLoss Attr. | Refetch w/ MpLoss Attr. | Fetch as SI w/ NonSpec Attr. | Refetch w/ NonSpec Attr. |
| 3 | MP Loss with MpLoss attr* | Fetch as BB w/ MpLoss attr.** | Fetch as SI w/ NonSpec attr. | Fetch as SI w/ NonSpec Attr. | Refetch w/ NonSpec Attr. |
| 4 | UP loss: older evicts younger | Refetch | Refetch | Fetch as SI w/ NonSpec Attr. | Refetch |
| 5 | UP loss: younger evicts older | Refetch w/ MissInOrder attr. | Refetch w/ MissInOrder Attr. | Fetch as SI w/ MissInOrder attr. | Refetch w/MissInOrder attr. |
| 6 | UP loss: same trace evicted w/o MissInOrder attr. | Fetch as BB w/ MissInOrder attr. | Refetch w/ MissInOrder Attr. | Fetch as SI w/ MissInOrder attr. | Refetch w/MissInOrder attr. |
| 7 | UP loss: same trace evicted with MissInOrder attr. | NA | Fetch SI w/ NonSpec Attr. | Fetch as SI w/ NonSpec Attr. | Refetch w/ NonSpec Attr. |
| 8 | TU abort request: SMC applied to non-live trace | Refetch | Refetch | Refetch | Refetch |
| 9 | TU abort request: SMC applied to live trace | Fetch as BB | Fetch as SI | Fetch as SI w/ NonSpec Attr. | Refetch w/ NonSpec Attr. |
| 10 | TU abort request: Invalid | Refetch | Refetch | Refetch | Refetch |
| 11 | TU abort request: Stall | Refetch | Refetch | Refetch | Refetch |
| 12 | TU abort request: Parity | Invalidate MB/BB and refetch | Invalidate MB/BB and refetch | Invalidate MB/BB and refetch | Invalidate MB/BB and refetch |
| 13 | $2^{nd}$ abort | Refetch | Refetch | Refetch | Refetch |
| 14 | Interior Branch misprediction | Send IBM to TU; mark if first interior branch in trace | Send IBM to TU; mark as bad CS case | Send IBM to TU; mark as bad CS case | Send IBM to TU |
| 15 | Segment fault or Cannot complete: MU fault | Fetch as BB | Fetch as SI | Spec: fetch as SI w/ NonSpec attr.; NonSpec: send MU fault to TU | Spec: refetch w/ NonSpec attr.; NonSpec: send MU fault to TU |
| 16 | Cannot complete: Temp. NonSpec | Fetch as BB | Fetch as SI | Fetch as SI w/ NonSpec Attr. | Refetch w/ NonSpec Attr. |
| 17 | Cannot Complete: Perm. NonSpec | Invalidate MB and fetch as BB | Rebuild BB while isolating the memop into a non-spec trace; fetched as SI w/ NonSpec attr. | Fetch as SI w/ NonSpec Attr. | Rebuild BB while isolating memop (actually marks the calling trace for NonSpec Execution; refetched w/ NonSpec Attr. |
| 18 | Cannot Complete: NRQ overflow | Invalidate MB and fetch as BB; mark BB to prevent rebuild as MB | Rebuild BB with fewer memops; fetched as SI | Fetch as SI w/ NonSpec attr. | Refetch w/ NonSpec Attr. |
| 19 | XM fault | Fetch as BB | Fetch as SI | SSE decode enabled: send XM fault to TU; SSE decode disabled: fetch as SI w/ NonSpec attr. | Send XM fault to TU |
| 20 | XM fault in non-spec 1dx | NA | NA | Send XM fault to TU | NA (ignored in emcode) |
| 21 | SSE fault | Fetch as BB | Fetch as SI | Send SSE fault to TU | Send SSE fault to TU |
| 22 | XM/SSE decode fault | Fetch as BB | Fetch as SI | Send decode fault to TU | Send decode fault to TU |
| 23 | newip fault | Fetch as BB | Fetch as SI | Send IP fault to TU | Send IP fault to TU |
| 24 | XM error or data breakpoint (no OptRepString) | Fetch as BB | Fetch as SI | Trap | Exit: Trap; Non-exit: defer to next trace |
| 25 | Data breakpoint w/ OptRepString | NA | NA | NA | Send MU fault to TU |
| 26 | OptRepString in non-spec trace | NA | NA | NA | Send MU fault to TU |

TABLE 3-continued

| Abort trigger | MB Trace | BB Trace | SI Trace | Emcode Trace |
| --- | --- | --- | --- | --- |
| 27 Final branch misprediction | Send FBM to TU | Send FBM to TU | Send FBM to TU | Send FBM to TU |

*A CAB control causes the IU to behave as if MpLoss is always already asserted. I.e. On MP loss, the IU Breaks down immediately rather than refetching the trace and applying the MpLoss attribute.
**A CAB control causes the IU to also invalidate an multi-block trace if MP loss causes it to break down to basic block traces.

FIGS. 6-19 show the steps performed for some of the corrective actions of Table 3.

Figure 6:
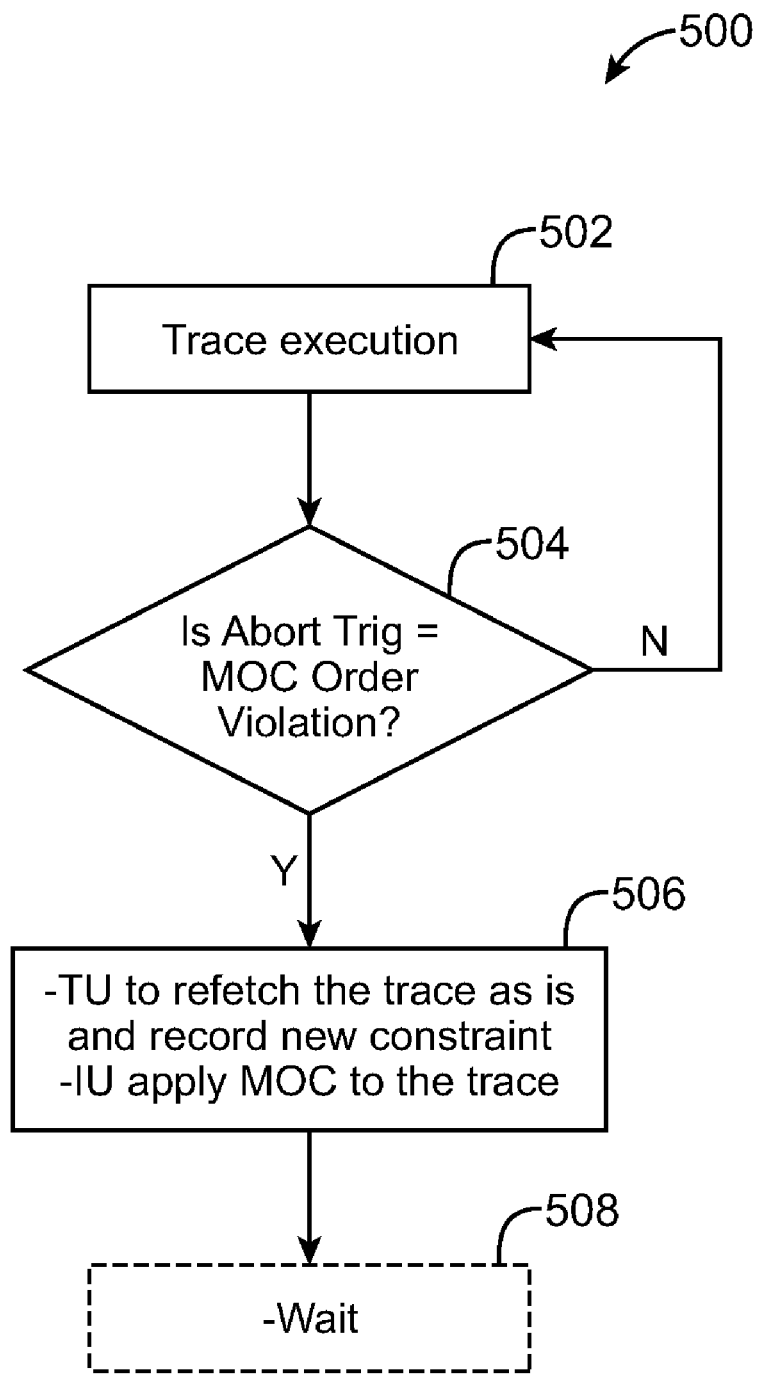
FIGS. 6-19 show the steps performed for some of the corrective actions of Table 3.

Memory Order Constraint Violation Abort:

FIG. 6 shows the corrective action 500 taken when memory order constraint violation is detected as an occurrence of an abort trigger. This abort trigger is detected by the abort prioritization logic 50 of the IU 36. The steps 506 through 508 are performed when the memory order constraint (MOC) violation abort trigger is received. MOC violation occurs when two or more operations executed within a processor are reported by the MU 44 as having been performed in the wrong program order. MOC violation results in a MOC abort trigger from the MU 44 to the IU 36.

At step 502, while a trace is being executed, an abort trigger is detected. Next at 504, a determination is made as to whether or not the detected abort trigger is MOC violation abort trigger. If there is no MOC order violation abort trigger detected at 504, the process goes back to step 502. However, if a MOC order violation abort trigger is detected at 504, the process proceeds to step 506.

At step 506, the trace unit 12 refetches the trace as is and records a new constraint. A constraint, as used herein refers to restrictions placed on certain memory operations (or ops) within a trace that are used during execution of the trace. In one embodiment of the present invention, constraints are stored in the MOC 51 of the IU 36.

An attribute, as used herein, refers to restrictions placed on the entire trace that is used during execution of the trace. An example of an attribute is MissInOrder where memory operations are not executed in the order in which they are required. Another example of an attribute is a non-speculative associated with a non-speculative trace. A non-speculative trace, as used herein, is a trace that cannot be speculatively executed in which case all older traces must be committed.

Attributes can be temporary or permanent. Temporary attributes are typically generated by the IU 36 while permanent attributes are typically generated by the trace unit 12. An example of a permanent attribute is where the abort is caused due to the inability to complete successful execution of the operations within the trace due to, for example, executing to non-cacheable location, in which case, the trace is regarded as a non-speculative trace.

In one embodiment of the present invention, an attribute is stored in a trace cache corresponding to the trace type of the trace with the problem, within the trace unit 12. For example, the attribute associated with a trace is stored in the execution history component of the corresponding trace cache.

The IU 36 applies MOC violation abort trigger to the trace so that the next time the trace is executed, the new constraints apply. In one embodiment of the present invention, the corrective action 500 ends at the completion of step 506 and the execution unit 14 stops executing immediately.

At step 506, the trace unit 12 records the new constraint and the IU 36 applies it to the trace. Alternatively, the IU 36 records and applies the new constraint. Recording a constraint results in recording (or storing) the need for a constraint between two memory operations. IU 36 applies the new constraint when executing the trace to ensure that the trace's memory operations are executed in order.

Optionally, at step 508, the process 'waits' for the trace unit 12 to send a new trace hoping to find additional constraints, in the meanwhile, and the IU 36 (or execution unit 14) continues executing other traces.

'Wait', as used herein with reference to the flow charts of FIGS. 6 through 19 and FIGS. 20-23, refers to the process of the IU 36 sending an abort to the trace unit 12 along with an abort reason and a trace identification (ID) while continuing execution of the same trace to find additional constraints until the trace unit 12 refetches the trace and sends it to the IU 36. If additional constraints are detected, they may be addressed thereby advantageously continuing the processing performed by the execution unit 14.

A trace ID is a number identifying a trace to the trace unit 12 and the execution unit 14.

In an embodiment of the present invention, the trace ID is generated by the trace unit 12 for its, and the trace ID is also generated by the execution unit 14 for its use.

The foregoing steps relating to the corrective action 500 are performed in sequential order in one embodiment of the present invention and performed in parallel in an alternative embodiment of the present invention.

'Continue', as used herein with reference to the flow charts of FIGS. 6 through 19 and FIGS. 20-23, refers to the process of the IU 36 sending an abort to the trace unit 12 and continuing to wait for executing a trace to find higher priority aborts and additional constraints or until the trace is ready to commit.

'Stop', as used herein with reference to the flow charts of FIGS. 6 through 19 and FIGS. 20-23, refers to the process of the IU 36 sending an abort to the trace unit 12 along with abort reason and trace ID, i.e. abort information, and stopping execution immediately, which causes halting of the renaming process and removes all pending data in a skid buffer.

A skid buffer is a buffer located generally in the execution unit 14 and serves to store information passed between the execution unit 14 and the trace unit 12. The skid buffer is always emptied as soon as the IU 36 sends an abort to the trace unit 12.

Figure 7:
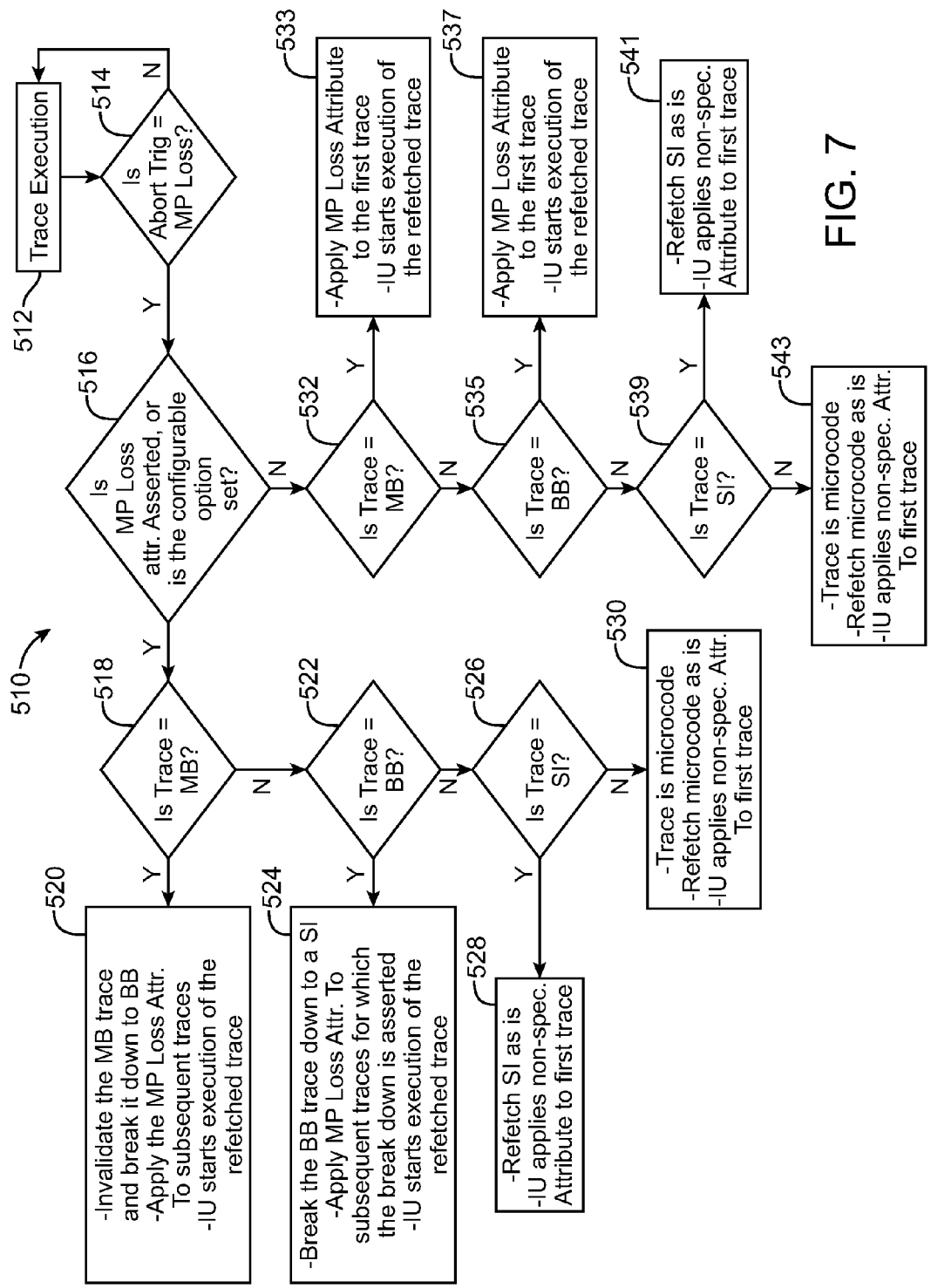

Multiprocessor Cache (MP Loss) Abort:

FIG. 7 shows the corrective action 510 taken when an occurrence of a multi-processor cache line loss (MP Loss) abort trigger is received as an occurrence of an abort trigger. The MP Loss abort trigger is received by the abort prioritization logic 50 of the IU 36. The steps 514 through 532 are performed when the MP Loss abort trigger is detected. MP Loss abort trigger occurs when at least two processors attempt to access the same location in the MU 44 cache at the same time, whereby the MU 44 reports the conflict to the IU 36.

At step 512, while a trace is being executed, an MP Loss abort trigger is received. Next at 514, a determination is made as to whether or not the MP Loss abort trigger is detected. If there is no MP Loss abort trigger detected at 514, the process proceeds to step 512.

However, if a MP Loss abort trigger is detected at 514, the process proceeds to 516. At 516, a determination is made at as to whether or not the MP Loss attribute is received in the corresponding trace cache of the trace unit 12. In some embodiments, a configurable option, when enabled, forces the trace into generic degradation regardless of whether or not the MP Loss attribute is received.

If the MP Loss attribute is received or the configurable option is not disabled at 516, at 518 a determination is made as to whether or not the trace is a multi-block trace. If it is determined that the trace is a multi-block trace at 518, the process proceeds to step 520. At step 520, the IU 36 signals the trace unit 12 through the link 42 to invalidate the trace and break it down into at least one basic block trace. In the event the multi-block trace consists of more than one basic block trace, it is broken down into several basic block traces.

At step 518, the IU 36 then applies the MP Loss attribute to all subsequent traces so that the next time the trace is executed, the new attributes apply. Additionally, the IU 36 starts execution of the refetched trace(s). In this situation, the corrective action 510 ends at the completion of step 520.

If at 518 it is determined that the trace is not a multi-block trace, at 522 a determination must be made as to whether or not the trace is a basic block trace. If at 522 the trace is a basic block trace, the process proceeds to step 524. At 524, the IU 36 signals the trace unit 12 through link 42 to break the trace down into at least one single instruction trace. A "single instruction trace", as used herein, refers to a trace having a single instruction attribute. In an exemplary embodiment, a trace in the basic block cache may be regarded as a single instruction trace and not as a basic block trace if it has this attribute.

In the case where the basic block trace being broken down includes more than one single instruction trace, it is broken down into multiple single instruction traces. At 524, the IU 36 then applies the MP Loss attribute to all subsequent traces for which the break down is asserted so that the next time the trace is executed, the new attributes apply. Additionally, the IU 36 starts execution of the refetched trace. In this situation, the corrective action 510 ends at the completion of step 524.

If it is determined at 522 that the trace is not a basic block trace, at 526 a determination is made at as to whether or not the trace is a single instruction trace. If the trace is determined to be a single instruction trace at 526, the process proceeds to step 528. At step 528, the trace unit 12 refetches the single instruction trace as is and records a new attribute associated therewith. More specifically, the new attribute is temporary, and it is retained in the IU 36. The IU 36 applies the non-speculative attribute to the single instruction trace so that the next time the trace is executed, the new attributes apply. In this situation, the corrective action 510 ends at the completion of step 528.

If at 526 the trace is determined not to be a single instruction trace, the trace must be a microcode trace, and the process proceeds to step 530. At step 530, the trace unit 12 refetches the microcode trace as is and records a new attribute to the first trace. At step 530, the IU 36 applies the non-speculative attribute to the first microcode trace so that the next time the micro code trace is executed, the new attributes apply. More specifically, the new attribute is temporary, and it is retained by the IU 36 for application to the first trace. In this situation, the corrective action 510 ends at the completion of step 530.

If at 516 the MP Loss attribute is not asserted or the configurable option is disabled, at 532 a determination is made as to whether or not the trace is a multi-block trace. If it is determined that the trace is a multi-block trace at 532, the process proceeds to step 533. At step 533, the IU 36 applies the MP Loss attribute to the first trace so that the next time the trace is executed, the new attributes apply. More specifically, the new attribute is temporary, and the attribute is retained in the IU 36 to be applied by the IU 36 to the next trace that it receives. Additionally, the IU 36 starts execution of the refetched trace. In this situation, the corrective action 510 ends at the completion of step 533.

If at 532 it is determined that the trace is not a multi-block trace, at 535 a determination must be made as to whether or not the trace is a basic block trace. If at 535 the trace is a basic block trace, the process proceeds to step 537. At step 537, the IU 36 applies the MP Loss attribute to the first trace so that the next time the trace is executed, the new attributes apply. More specifically, the new attribute is temporary, and the attributed is retained in the IU 36 to be applied by the IU 36 to the next trace that it receives. Additionally, the IU 36 starts execution of the refetched trace. In this situation, the corrective action 510 ends at the completion of step 537.

If it is determined at 535 that the trace is not a basic block trace, at 539 a determination is made at as to whether or not the trace is a single instruction trace. If the trace is determined to be a single instruction trace at 539, the process proceeds to step 541. At step 541, the trace unit 12 refetches the single instruction trace as is and records a new attribute associated therewith. More specifically, the new attribute is temporary, and the attribute is retained in the IU 36 to be applied by the IU 36 to the next trace that it receives. The IU 36 applies the non-speculative attribute to the single instruction trace so that the next time the trace is executed, the new attributes apply. In this situation, the corrective action 510 ends at the completion of step 541.

If at 539 the trace is determined not to be a single instruction trace, the trace must be a microcode trace, and the process proceeds to step 543. At step 543, the trace unit 12 refetches the microcode trace as is and records a new attribute to the first trace. At step 543, the IU 36 applies the non-speculative attribute to the first microcode trace so that the next time the micro code trace is executed, the new attributes apply. More specifically, the new attribute is temporary, and the attribute is retained in the IU 36 to be applied by the IU 36 to the next trace that it receives. In this situation, the corrective action 510 ends at the completion of step 543.

While the steps performed in the corrective action 510 are shown in FIG. 7 and the foregoing discussion to be in sequential order, alternatively, they may be performed substantially in parallel.

Figure 8:
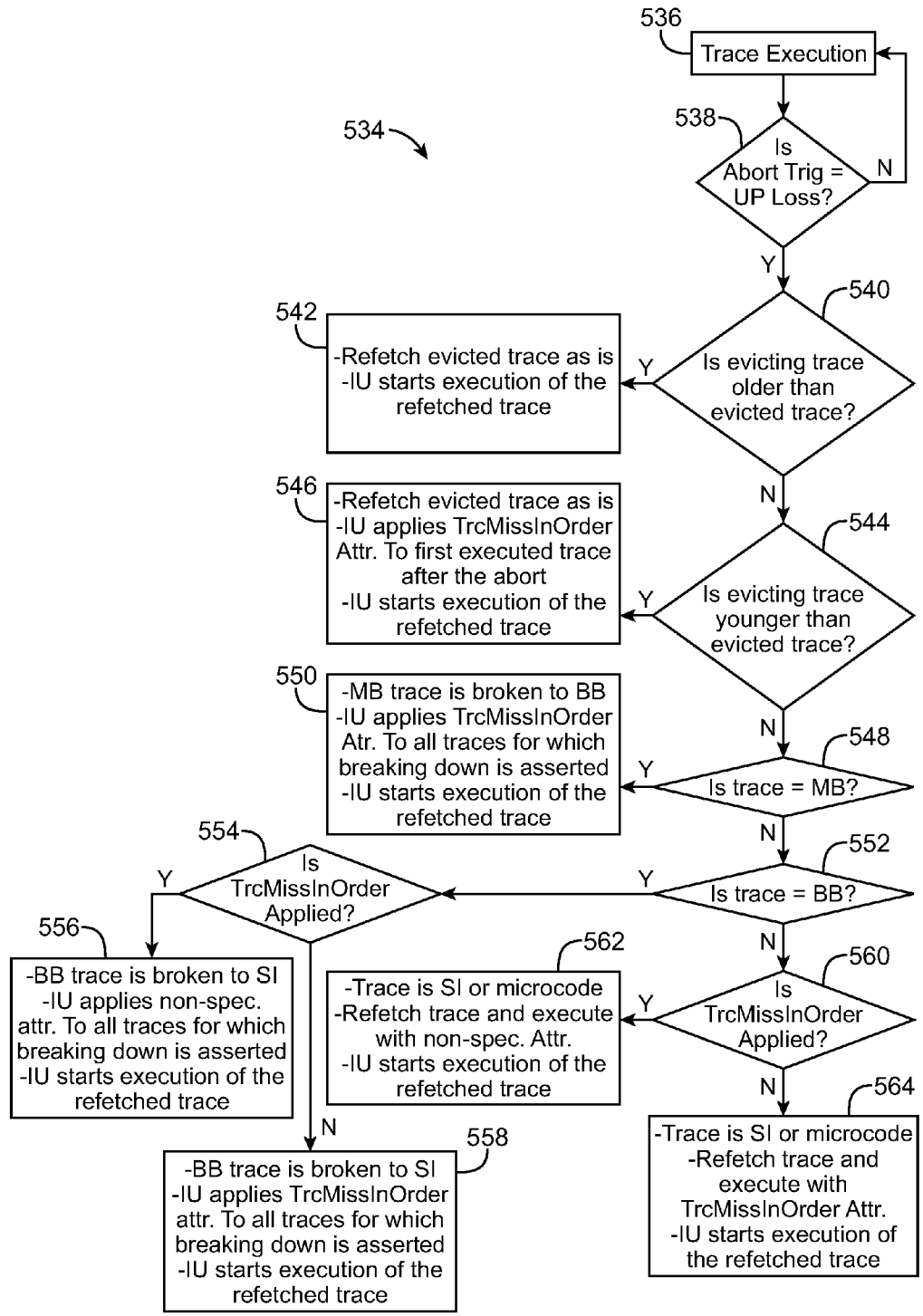

Uniprocessor (or Interprocessor) (UP Loss) Cache Abort:

FIG. 8 shows the corrective action 534 taken when an occurrence of a single-processor cache line loss (UP Loss) abort trigger is received by the abort prioritization logic 50 of the IU 36. The steps 538 through 562 are performed when the UP Loss abort trigger is received. UP Loss abort triggers occur when there is a conflict due to, for example, one trace (evicting trace) replaces a data cache line used by another trace (evicted trace) in the MU 44 cache, whereby the MU 44 reports the conflict to the IU 36.

At step 536, a trace is executed and at 538, a determination is made as to whether or not an occurrence of the UP Loss abort trigger is received. At 538, if there is no UP Loss abort priority received, the process returns back to step 536.

However, if it is determined that a UP Loss abort trigger is received at 538, at 540 a determination is made at as to whether or not the evicting trace is older than the evicted trace. If the evicting trace is older than the evicted trace at 540, the process proceeds to step 542. At step 542, the trace unit 12 refetches the evicted trace as is. At step 542, the IU 36 starts execution of the refetched trace. In this situation, the corrective action 534 ends at the completion of step 542.

If it is determined at 540 that the evicting trace is not older than the evicted trace, at 544 a determination is made at as to whether or not the evicting trace is younger than the evicted trace. If the evicting trace is younger, as determined at 544, the process proceeds to step 546. At step 546, the trace unit 12 refetches the evicted trace as is and records a new attribute. When recording a new attribute, the IU 36 applies the trace miss in order (TrcMissInorder) attribute to the first trace executed after the abort so that the next time the refetched trace is executed, the new attributes apply. More specifically, the new attribute is temporary, and the attribute is retained in the IU 36 to be applied by the IU 36 to the next trace that it receives. The IU 36 then starts execution of the refetched trace. In this situation, the corrective action 534 ends at the completion of step 546.

If it is determined at 544 that the evicting trace is not younger than the evicted trace, at 548 a determination is made at as to whether or not the evicting trace is a multi-block trace. If it is determined that the evicting trace is a multi-block trace at 548, the process proceeds to step 550. At step 550, the IU 36 signals the trace unit 12 through the link 42 to break the multi-block trace down into at least one basic block trace. In the case where the multi-block trace being broken down includes more than one basic block trace, it is broken down into multiple basic block traces. The IU 36 then applies the trace miss in order attribute to all subsequent traces for which the break down is asserted so that the next time the traces are executed, the new attributes apply. At step 550, the IU 36 starts execution of the refetched trace(s). In this situation, the corrective action 534 ends at the completion of step 550.

If it is determined at 548 that the evicting trace is not a multi-block trace, at 552 a determination is made as to whether or not the evicting trace is a basic block trace. If the evicting trace is determined to be a basic block trace at 552, at 554 a determination is made as to whether or not the trace miss in order attribute is received in the IU 36. If it is determined at 554 that the evicting trace has the trace miss in order attribute, the process proceeds to step 556. At step 556, the IU 36 signals the trace unit 12 through the link 42 to break the trace down into at least one single instruction trace. In the case where the basic block trace being broken down includes more than one single instruction trace, it is broken down into multiple single instruction traces. The IU 36 then applies the non-speculative attribute to all single instruction traces for which the break down is asserted so that the next time the traces are executed, the new attributes apply. At 556, the IU 36 starts execution of the refetched trace(s). In this situation, the corrective action 534 ends at the completion of step 556.

If it is determined at 554 that the evicting trace does not have the trace miss in order attribute, the process proceeds to step 558. At step 558, the IU 36 signals the trace unit 12 through link 42 to break the trace down into at least one single instruction trace. The IU 36 then applies the trace miss in order to all single instruction traces for which the break down is asserted so that the next time the traces are executed, the new attributes apply. At 558, the IU 36 starts execution of the refetched trace(s). In this situation, the corrective action 534 ends at the completion of step 558.

If, however, at 552 it is determined that the evicting trace is not a basic block trace, at 560 a determination is made as to whether or not the trace miss in order attribute is received in the corresponding trace cache of the trace unit 12. If at 560 it is determined that the evicting trace has the trace miss in order attribute, the process proceeds to step 562. At step 562, the trace unit 12 refetches the evicting trace as is, and the IU 36 starts execution of the refetched trace, applying the non-speculative attribute at the time of execution of the refetched trace. In this situation, the corrective action 534 ends at the completion of step 562.

If at 560 it is determined that the evicting trace does not have the trace miss in order attribute, the process proceeds to step 564. At step 564, the trace unit 12 refetches the evicting trace as is, and the IU 36 starts execution of the refetched trace applying the trace miss in order attribute at the time of execution. In this situation, the corrective action 534 ends at the completion of step 564.

While the steps performed in the corrective action 534 are shown in FIG. 8 and the foregoing discussion to be in sequential order, alternatively, they may be performed substantially in parallel.

Figure 9:
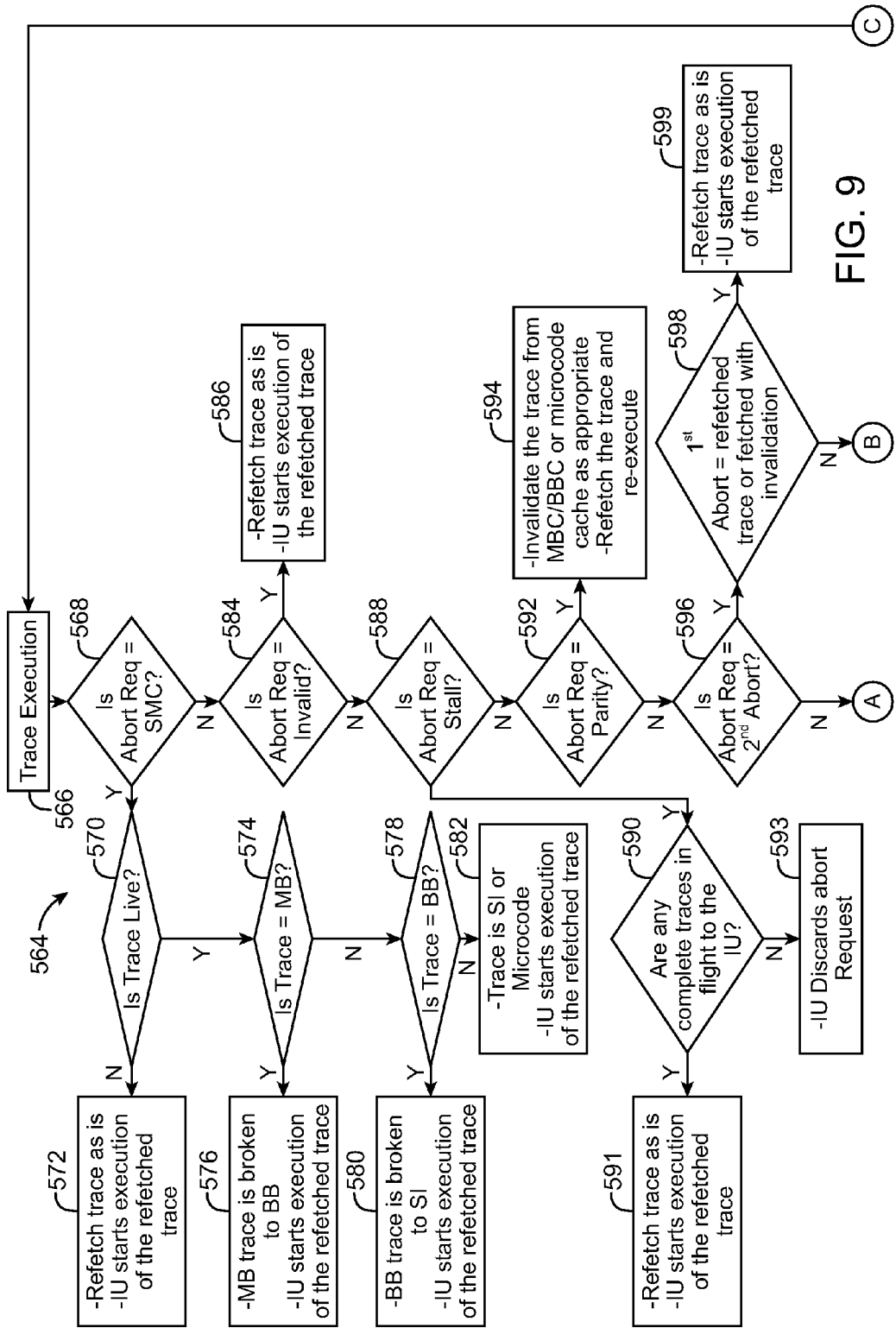
Figure 9:
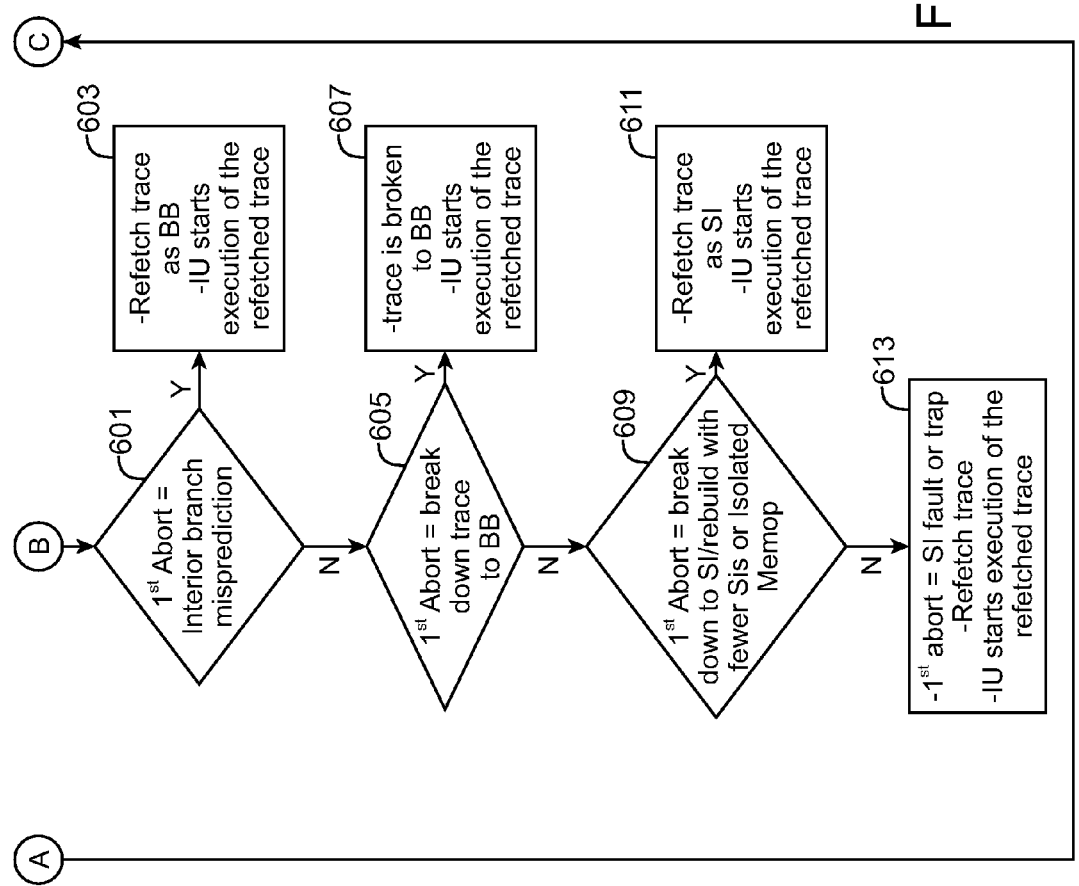

FIG. 9 shows the corrective action 564 taken when a trace unit 12 requests an abort from the IU 36 as a result of a fetched trace being no longer valid. The abort sent by the trace unit 12 is associated with at least one of several types of abort requests, with one embodiment of a set of abort request types illustrated in FIG. 9. The triggering trace may be different from the trace that is aborted or refetched in the corrective action 564. Therefore, the IU 36 determines which trace to abort based on the request received from the trace unit 12. The abort trigger is sent by the trace unit 12 and received by the abort prioritization logic 50 of the IU 36.

At step 566, while a trace is being executed, a "trace unit request" abort is received, i.e. abort trigger. At 568, a determination is made as to whether or not the trace unit 12 sent an abort trigger associated with a SMC-type abort request due to the presence of self modifying code (SMC). If it is determined at 568 that the SMC-type abort request was transmitted by the trace unit 12 to the IU 36, a determination is made at 570 as to whether or not the trace is a "live trace." A "live trace" is a one for which the IU 36 has begun processing, but has not yet completed processing. If it is determined at 570 that the trace is not live, the process proceeds to step 572. At step 572, the trace unit 12 refetches the non-live trace as is. Additionally, the IU 36 starts execution of the refetched trace at 572. In this situation, the corrective action 564 ends at the completion of step 572.

However, if at 570 it is determined that the trace is live, at 574 a determination is made as to whether or not the live trace is a multi-block trace. If it is determined at 574 that the live trace is a multi-block trace, the process proceeds to step 576. At step 576, the IU 36 signals the trace unit 12 through link 42 to break the trace down into at least one basic block trace. In the case where the multi-block trace being broken down includes more than one basic block trace, it is broken down into multiple basic block traces. At 576, the IU 36 starts execution of the refetched trace(s). In this situation, the corrective action 564 ends at the completion of step 576.

If, however, at 574 it is determined that the live trace is not a multi-block trace, at 578 a determination is made as to whether or not the live trace is a basic block trace. If it is determined at 578 that the evicting trace is a basic block trace, the process proceeds to step 580. At step 580, the IU 36 signals the trace unit 12 through link 42 to break the trace down into at least one single instruction trace. In the case where the basic block trace being broken down includes more than one single instruction trace, it is broken down into multiple single instruction traces. At 580, the IU 36 then starts execution of the single instruction trace. In this situation, the corrective action 564 ends at the completion of step 580.

In the event it is determined that the live trace at 578 is not a basic block trace, the process proceeds to step 582. At step 582, the IU 36 re-executes the live trace, which is either in the form of a single instruction trace or a microcode trace, applying the non-speculative attribute at the time of the execution of the live trace. In this situation, the corrective action 564 ends at the completion of step 582.

If it is determined that the trace unit 12 did not send an abort trigger associated with a SMC-type abort request at 568, at 584 a determination is made as to whether or not the trace unit 12 sent an abort trigger associated with an invalid-type abort request. An invalid-type abort request indicates that the IU 36 should not execute the trace that resulted in the abort trigger's generation (the "triggering trace"). In some embodiments, the trace unit 12 is guaranteed to send the abort trigger before the triggering trace is sent from the trace unit 12. If it is determined at 584 that the invalid-type abort request was transmitted by the trace unit 12 to the IU 36, the process proceeds to step 586. At step 586, the trace unit 12 refetches the triggering trace, and then the IU 36 re-executes the refetched trace. In this situation, the corrective action 564 ends at the completion of step 586.

If it is determined that the trace unit 12 did not send an abort trigger associated with a invalid-type abort request at 584, at 588 a determination is made as to whether or not the trace unit 12 sent an abort trigger associated with a stall-type abort request.

A stall-type abort request indicates that the IU 36 has stalled, preventing trace unit resources from being used for other purposes. In some embodiments of the invention, this abort trigger serves to enhance processor performance.

If it is determined at 588 that the stall-type abort request was transmitted by the trace unit 12 to the IU 36, at 590 a determination is made as to whether or not there are any complete traces "in flight" to the IU 36. A trace is "in flight" if it is transferred from the trace unit 12 to the execution unit 14 but not yet committed. At 590, if it is determined that there is at least one complete trace "in flight" to the IU 36, the process proceeds to step 591. At step 591, the trace unit 12 refetches the triggering trace, and then the IU 36 re-executes the refetched trace. In this situation, the corrective action 564 ends at the completion of step 591.

However, if it is determined at 590 that there are no complete traces "in flight" to the trace unit 12, the process proceeds to step 593. At 593, the IU 36 discards the abort request. In this situation, the corrective action 564 ends at the completion of step 593.

If it is determined that the trace unit 12 did not send a stall-type abort request at 588, at 592 a determination is made as to whether or not the trace unit 12 sent an abort trigger associated with a parity-type abort request. A parity-type abort request indicates that a parity error was received in the triggering trace data. In some embodiments of the invention, the parity error is received from the trace unit 12 by the IU 36 before the trace data transmitted by the trace unit 12 arrives at the IU 36. Alternatively, in some embodiments the parity error is received from the trace unit 12 by the IU 36 at the same time as some, but not necessarily all, operations within the triggering trace arrive at the IU 36. If it is determined at 592 that a parity-type abort request was sent by the trace unit 12 to the IU 36, the process proceeds to step 594. At step 594, the IU 36 instructs the trace unit 12 via the link 42 to invalidate the trace from the basic block cache and/or the multi-block cache and/or microcode cache. At 594, the trace unit 12 refetches the triggering trace, and then the IU 36 re-executes the refetched trace. In this situation, the corrective action 564 ends at the completion of step 594.

If it is determined that the trace unit 12 did not send an abort trigger associated with a parity-type abort request at 592, at 596 a determination is made as to whether or not the trace unit 12 sent an abort trigger associated with a "Second Abort" ("$2^{nd}$ Abort")-type abort request.

A "$2^{nd}$ Abort"-type abort request indicates that the trace unit 12 sent an abort trigger (through the abort trigger 70) associated with at least one of several types of abort requests, with one embodiment of a set of abort request types illustrated in figure X3, to the IU 36 during the execution of the previous trace (the "$1^{st}$ abort"). Upon the complete execution of the pending trace by the IU 36, the IU 36 applies the "$2^{nd}$ abort" bit to the subsequent trace received from the trace unit 12. If it is determined that the "$2^{nd}$ abort" bit is not received at 596, the process proceeds to step 566.

However, if at 596 it is determined that the "$2^{nd}$ abort" bit is received by the IU 36 in the triggering trace, at 598 it is determined whether or not the $1^{st}$ abort resulted in the refetching of the trace or the fetching of the trace with invalidation. If it is determined that the $1^{st}$ abort was resulted in the trace being refetched, the process proceeds to step 599. At step 599, the trace unit 12 refetches the triggering trace, and then the IU 36 re-executes the refetched trace. In this situation, the corrective action 564 ends at the completion of step 599.

If at 598 it is determined that the $1^{st}$ abort did not result in a refetching of the trace or the fetching of the trace with invalidation, at 601 it is determined whether or no the $1^{st}$ abort sent an interior branch misprediction to the trace unit 12. If it is determined that the $1^{st}$ abort sent an interior branch misprediction to the trace unit 12, the process proceeds to step 603. At step 603, the trace unit 12 refetches the trace as a basic block trace, and the IU 36 re-executes the refetched trace. In this situation, the corrective action 564 ends at the completion of step 603.

If at 601 it is determined that the $1^{st}$ abort did not send an interior branch misprediction to the trace unit 12, at 605 it is determined whether or not the $1^{st}$ abort requested the trace unit 12 to break the previously executed trace into a basic block trace. If it is determined that the $1^{st}$ abort sent a request to the trace unit 12 to break the trace down into a basic block trace, the process proceeds to step 607. At step 607, the IU 36 signals the trace unit 12 through link 42 to break the trace down into a basic block trace. At 607, the IU 36 re-executes the refetched trace. In this situation, the corrective action 564 ends at the completion of step 607.

If at 605 it is determined that the $1^{st}$ abort did not request the trace unit 12 to break the previously executed trace into a basic block trace, at 609 it is determined whether or not the $1^{st}$ abort requested the trace unit 12 to break the previously executed trace into a single instruction trace, or to rebuild the trace with fewer single instructions or with an isolated memop. If it is determined that the $1^{st}$ abort sent a request to the trace unit 12 to break the trace down or rebuild the trace into a single instruction trace, the process proceeds to step 611. At step 611, the IU 36 signals the trace unit 12 through link 42 to refetch the trace as a single instruction trace. At 611, the IU 36 re-executes the refetched trace. In this situation, the corrective action 564 ends at the completion of step 611.

If at 605 it is determined that the $1^{st}$ abort did not request the trace unit 12 to break the previously executed trace into a basic block trace, the $1^{st}$ abort was either a SI fault or trap, and the process proceeds to step 613. At 613, the IU 36 signals the trace unit 12 through link 42 to refetch the trace as a single instruction trace. At 611, the trace unit 12 refetches the triggering trace, and then the IU 36 re-executes the refetched trace. In this situation, the corrective action 564 ends at the completion of step 613.

While the steps performed in the corrective action 564 are shown in FIG. 9 and the foregoing discussion to be in sequential order, alternatively, they may be performed substantially in parallel.

Figure 10:
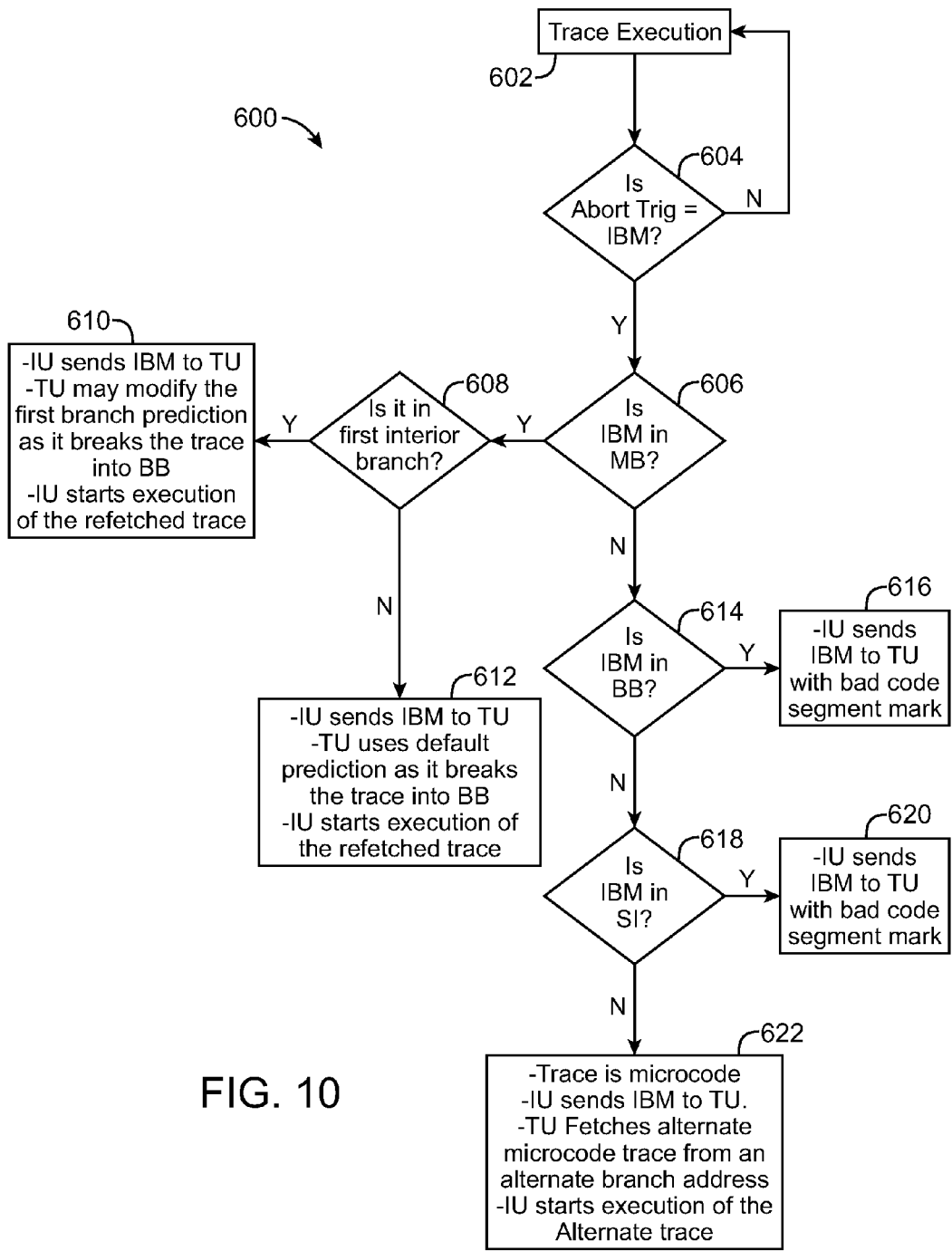

Interior Branch Misprediction Abort:

FIG. 10 shows the corrective action 600 taken when an occurrence of an interior branch misprediction abort trigger is received as an abort. The interior branch mispredict abort trigger is received by the abort prioritization logic 50 of the IU 36. The steps 604 through 622 are performed when the interior branch mispredict abort trigger is received. An interior branch assertion checks that the current processor state matches the state required for correct execution of any trace. An interior branch misprediction abort trigger is received by the IU 36 during execution when the prediction included in the interior branch assertion is found to mismatch the current machine state.

At step 602, while a trace is being executed, an occurrence of an interior branch misprediction abort trigger is received. Next at 604, a determination is made as to whether or not the interior branch misprediction abort trigger is received. If there is no interior branch misprediction abort received at 604, the process proceeds to step 602.

However, if an interior branch misprediction abort trigger is received at 604, at 606 a determination is made at as to whether or not the interior branch misprediction abort trigger is in a multi-block trace. In an exemplary embodiment, an interior branch assertion, in a multi-block trace, checks the accuracy of the speculative branch predictions that were used to join multiple basic block traces into a multi-block trace. If it is determined that the interior branch misprediction is in a multi-block trace in 606, at 608 a determination is made as to whether or not the interior branch misprediction is in the first interior branch of the multi-block trace. If it is determined that the first interior branch was mispredicted in the multi-block trace in 608, the process proceeds to step 610. At step 610, the IU 36 sends the interior branch mispredict to the trace unit 12. The trace unit 12 may modify the first branch prediction in the multi-block trace as it breaks the trace down into at least one basic block trace. Additionally, the IU 36 starts execution of the refetched trace(s). In this situation, the corrective action 600 ends at the completion of step 610.

If it is determined that the interior branch mispredict abort was not within the first interior branch of the multi-block trace at 608, the process proceeds to step 612. At 612, the IU 36 sends the interior branch mispredict abort trigger to the trace unit 12. The trace unit 12 breaks down the trace into at least one basic block trace. At 612, the IU 36 then starts executing the refetched basic block trace(s). In this situation, the corrective action 600 ends at the completion of step 612.

If it is determined that the interior branch mispredict abort was not in a multi-block trace at 606, a determination is made at 614 as to whether or not the interior branch mispredict is in a basic block trace. In an exemplary embodiment, an interior branch assertion in a basic block trace or single instruction trace checks that the code segment parameters have not changed since the trace was built. If the interior branch mispredict is in a basic block trace, the process proceeds to step 616. At 616, the IU 36 sends the interior branch misprediction abort trigger to the trace unit 12 with a "changed" or "bad" code segment mark, marking the trace so as to alert the trace unit 12 to the faulty code or operations resulting from the misprediction. In this situation, the corrective action 600 ends at the completion of step 616.

If it is determined that the interior branch mispredict abort trigger was not in a basic block trace at 614, a determination is made at 618 as to whether or not the interior branch mispredict abort trigger is in a single instruction trace. If the interior branch mispredict is in a single instruction trace, the process proceeds to step 620. At 620, the IU 36 sends the interior branch mispredict abort trigger to the trace unit 12 with a "changed" or "bad" code segment mark. In this situation, the corrective action 600 ends at the completion of step 620.

If it is determined that the interior branch mispredict abort was not in a single instruction trace at 618, the triggering trace is a microcode trace, and the process proceeds to step 622. In an exemplary embodiment, an interior branch assertion in a microcode trace checks that a mode flag or register value matches the prediction embedded in the microcode. At 622, the IU 36 sends the interior branch mispredict abort trigger to the trace unit 12. The trace unit 12 must then jump to an alternate branch address and fetch an alternate microcode trace for execution. At 622, the IU 36 starts execution of the alternate trace. In this situation, the corrective action 600 ends at the completion of step 622.

While the steps performed in the corrective action 600 are shown in FIG. 10 and the foregoing discussion to be in sequential order, alternatively, they may be performed substantially in parallel.

Figure 11:
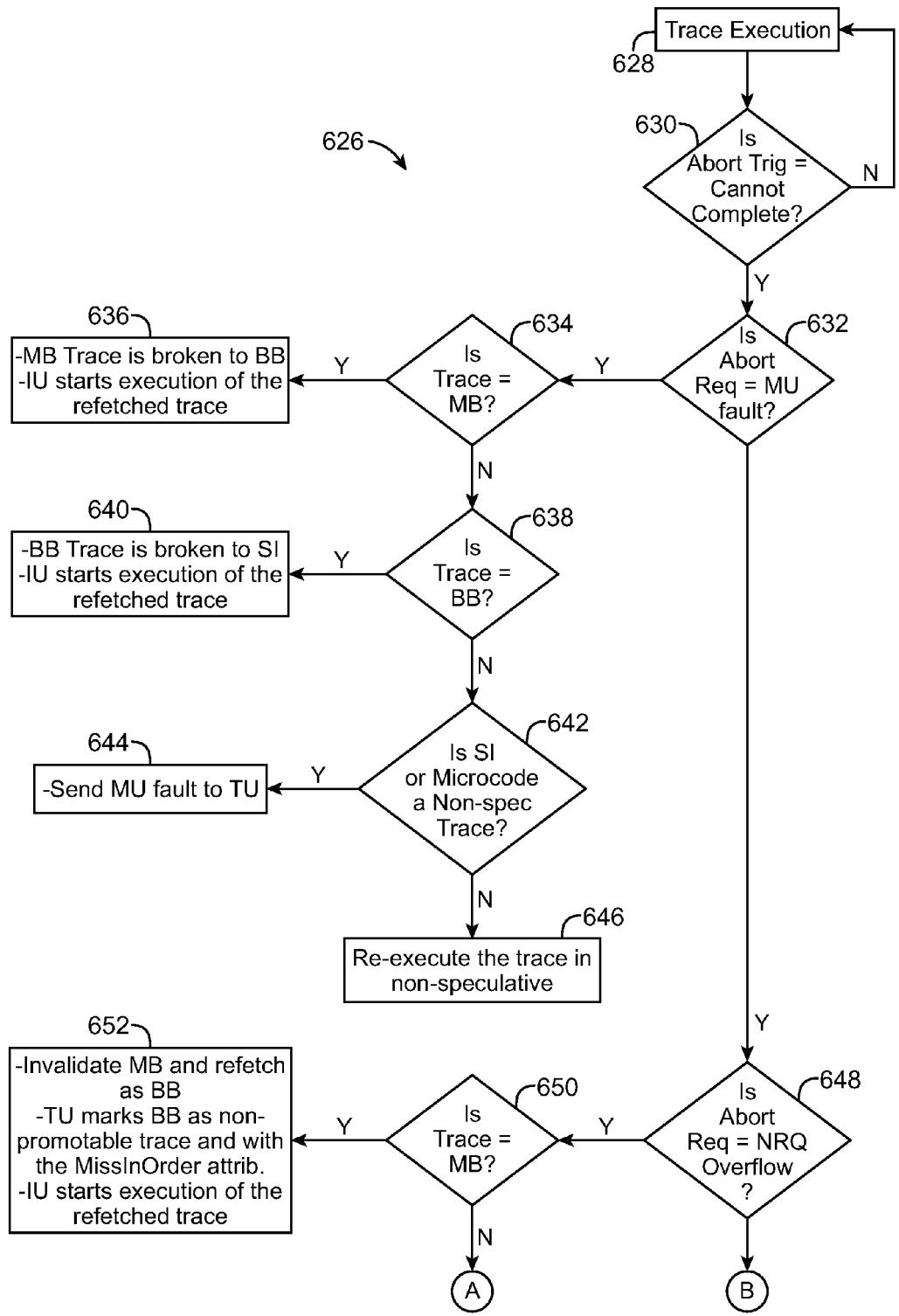
Figure 11:
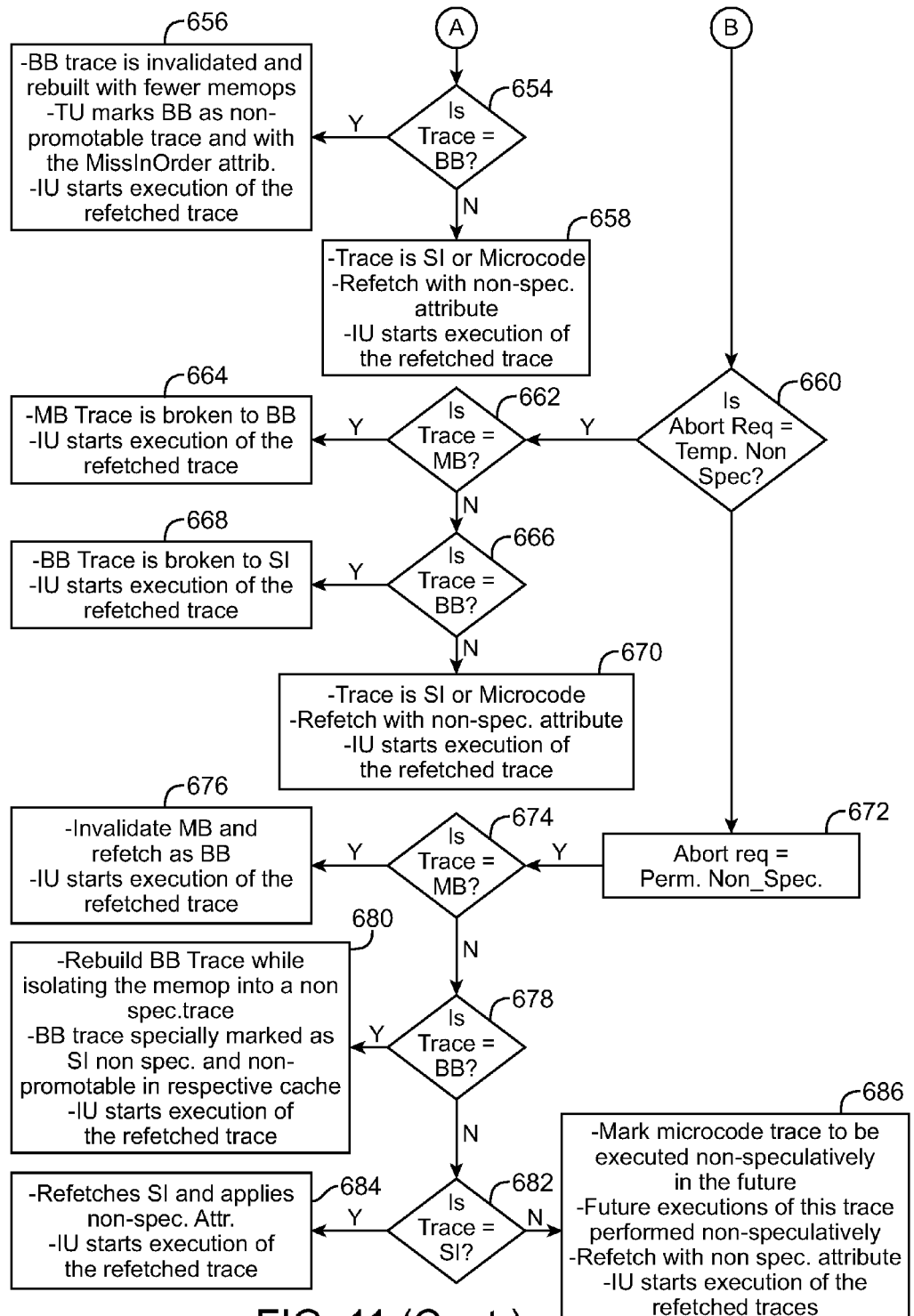

Single-instruction fault abort is described relative to FIGS. 11-18 and Cacheable Store or Combining Write Overflow abort and Speculative non-cacheable access abort are described relative to FIG. 11:

FIG. 11 shows the corrective action 626 taken when an occurrence of "cannot complete" fault or fault-like condition ("CannotComplete") is received as an abort. The Cannot-Complete abort sent by the trace unit 12 is associated with at least one of several "CannotCompleteReason encodings" ("encoding"), with one embodiment of a set of encodings illustrated in FIG. 11. The CannotComplete abort trigger sent by the MU 44 is received by the abort prioritization logic 50 of the IU 36 and the trace unit 12

At step 628, while a trace is being executed, a CannotComplete abort is received, i.e. abort trigger. At 630, a determination is made as to whether or not the MU 44 sent a Cannot-Complete abort trigger to the IU 36. If the CannotComplete abort trigger was not received at 630, the process proceeds to step 628.

However, if it is determined that the MU 44 sent a Cannot-Complete abort trigger to the IU 36 at 630, at 632 a determination is made at as to whether or not the MU 44 sent a CannotComplete abort trigger associated with a MU Fault-type encoding to the IU 36 due to a fault that might have occurred in the MU 44 or a segmentation fault. If it is determined that the MU fault-type encoding was transmitted by the MU 44 to the IU 36, at 634 a determination as to whether or not the triggering trace is a multi-block trace must be made. If it is determined that the triggering trace is a multi-block trace at 634, the process proceeds to step 636. In 636, the IU 36 signals the trace unit 12 through link 42 to break the multi-block trace down into at least one basic block trace. In the case where the multi-block trace being broken down includes more than one basic block trace, it is broken down into multiple basic block traces. At 636, the IU 36 then starts execution of the refetched basic block trace(s). In this situation, the corrective action 626 ends at step 636

If it is instead determined that the triggering trace at 634 is not a multi-block trace, a determination must be made at 638 as to whether or not the triggering trace is a basic block trace. If it is determined that the triggering trace is a basic block trace at 638, the process proceeds to step 640. At 640, the IU 36 signals the trace unit 12 through link 42 to break the trace down into at least one single instruction trace. In the case where the basic block trace being broken down includes more than one single instruction trace, it is broken down into multiple single instruction traces. At 640, the IU 36 then starts execution of the refetched basic block trace(s). In this situation, the corrective action 626 ends at step 640.

If it is determined that the triggering trace is not a basic block trace at 638, a determination must be made at 642 as to whether or not the triggering trace has a non-speculative attribute. If it is determined at 642 that the trace is non-speculative, the process proceeds to step 644. At 644, the MU fault is sent to the trace unit 12, causing the trace unit 12 to fetch the microcode fault handler. In this situation, the corrective action 626 ends at step 644.

If it is instead determined at 642 that the triggering trace is not a non-speculative trace, the process proceeds to step 646. At 646, the IU 36 re-executes the triggering trace as a non-speculative trace. In this situation, the corrective action 626 ends at step 644.

However, if it is determined at 632 that the MU 44 did not send a CannotComplete abort trigger associated with a "MU fault"-type encoding to the IU 36, at 648 a determination is made as to whether or not the MU 44 sent a CannotComplete abort trigger associated with a "Noncacheable Request Queue" (NRQ) overflow"-type encoding to the IU 36. The MU 44 will send this abort trigger to the IU 36 when a speculative trace contains many write combining loads that cannot be flushed from the NRQ until the trace is committed. If it is determined that the MU 44 sent the CannotComplete abort trigger associated with a "NRQ overflow"-type encoding to the IU 36, at 650 a determination as to whether or not the triggering trace is a multi-block trace must be made. If it is determined at 650 that the triggering trace is a multi-block trace, the process proceeds to step 652. In 652, the IU 36 signals the trace unit 12 through link 42 to break the multi-block trace down into at least one basic block trace. In the case where the multi-block trace being broken down includes more than one basic block trace, it is broken down into multiple basic block traces. The trace unit 12 marks the basic block trace as non-promotable and with the MissInOrder attribute in the multi-block trace cache to prevent promotion of the trace to a multi-block trace in future executions of the trace. At 652, the marking of the trace also indicates that all memops in the multi-block trace must be completed before any other trace may place "write-combining stores" in the NRQ. "Write combining stores" go to the NRQ, and when they commit, they get shifted to the write combining buffer and out to the bus. At 652, the IU 36 then starts execution of the refetched basic block trace(s). In this situation, the corrective action 626 ends at step 652.

If it is instead determined that the triggering trace at 650 is not a multi-block trace, a determination must be made at 654 as to whether or not the triggering trace is a basic block trace. If it is determined at 654 that the triggering trace is a basic block trace, the process proceeds to step 656. At 656, the IU 36 signals the trace unit 12 through link 42 to invalidate the basic block trace and to rebuild the basic block trace with fewer memory operations (memops). The trace unit 12 marks the first basic block trace specially as a non-promotable trace and with the MissInOrder attribute in the basic block cache. At 656, the IU 36 then starts execution of the refetched and rebuilt basic block trace. In this situation, the corrective action 626 ends at step 656.

If it is instead determined at 654 that the triggering trace is not a basic block trace, the process proceeds to step 658. At 658, if the triggering trace is a single instruction trace, the single instruction trace is refetched from the basic block cache within the trace unit 12. However if the triggering trace is a microcode trace, the microcode trace is refetched from the microcode cache of the trace unit 12. At step 658, the IU 36 applies the non-speculative attribute to the refetched trace so that the next time the trace is executed, the new attributes apply. More specifically, the new attribute is temporary, and it is retained by the IU 36 for application to the refetched trace during execution. Additionally, the IU 36 starts execution of the refetched trace. In this situation, the corrective action 626 ends at the completion of step 658.

However, if it is determined at 648 that the MU 44 did not send a CannotComplete abort trigger associated with a "NRQ overflow"-type encoding to the IU 36, at 660 a determination is made as to whether or not the MU 44 sent a CannotComplete abort trigger associated with a "temporary non-speculative requirement"-type encoding to the IU 36. In some embodiments of the invention, the MU 44 will send the CannotComplete associated with a "temporary non-speculative requirement"-type encoding to the IU 36 when the MU 44 needs to update the "accessed" or "modified" bits of an accessed page. If it is determined at 660 that the MU 44 sent the CannotComplete abort trigger associated with a "temporary non-speculative requirement"-type encoding to the IU 36, at 662 a determination as to whether or not the triggering trace is a multi-block trace must be made. If it is determined at 662 that the triggering trace is a multi-block trace, the process proceeds to step 664. In 664, the IU 36 signals the trace unit 12 through link 42 to break the multi-block trace down into at least one basic block trace. In the case where the multi-block trace being broken down includes more than one basic block trace, it is broken down into multiple basic block traces. At 664, the IU 36 then starts execution of the refetched basic block trace(s). In this situation, the corrective action 626 ends at step 664.

If it is instead determined that the triggering trace at 662 is not a multi-block trace, a determination must be made at 666 as to whether or not the triggering trace is a basic block trace. If it is determined at 666 that the triggering trace is a basic block trace, the process proceeds to step 668. At 668, the IU 36 signals the trace unit 12 through link 42 to break the basic-block trace down into at least one single instruction trace. In the case where the basic block trace being broken down includes more than one single instruction trace, it is broken down into multiple single instruction traces. At 664, the IU 36 then starts execution of the refetched single instruction trace(s). In this situation, the corrective action 626 ends at step 668.

If it is instead determined at 666 that the triggering trace is not a basic block trace, the process proceeds to step 670. At 670, if the triggering trace is a single instruction trace, the single instruction trace is refetched from the basic block cache within the trace unit 12. However if the triggering trace is a microcode trace, the microcode trace is refetched from the microcode cache of the trace unit 12. At step 670, the IU 36 applies the non-speculative attribute to the refetched trace so that the next time the trace is executed, the new attributes apply. More specifically, the new attribute is temporary, and it is retained by the IU 36 for application to the refetched trace during execution. Additionally, the IU 36 starts execution of the refetched trace. In this situation, the corrective action 626 ends at the completion of step 670.

However, if it is determined at 660 that the MU 44 did not send a CannotComplete abort trigger associated with a "temporary non-speculative requirement"-type encoding to the IU 36, the process proceeds to step 672. At 672, the MU 44 sent a CannotComplete abort trigger associated with a "permanent non-speculative requirement"-type encoding to the IU 36. In some embodiments of the invention, the MU 44 will send the CannotComplete abort trigger associated with a "permanent non-speculative requirement"-type encoding to the IU 36 when a memory operation accesses uncacheable memory space. The process proceeds to 674, where a determination as to whether or not the triggering trace is a multi-block trace must be made. If it is determined at 674 that the triggering trace is a multi-block trace, the process proceeds to step 676. In 676, the IU 36 signals the trace unit 12 through link 42 to both invalidate and break the multi-block trace down into at least one basic block trace. In the case where the multi-block trace being broken down includes more than one basic block trace, it is broken down into multiple basic block traces. At 676, the IU 36 then starts execution of the refetched basic block trace. In this situation, the corrective action 626 ends at step 676.

If it is instead determined that the triggering trace at 674 is not a multi-block trace, a determination must be made at 678 as to whether or not the triggering trace is a basic block trace. If it is determined at 678 that the triggering trace is a basic block trace, the process proceeds to step 680. At 680, the IU 36 signals the trace unit 12 through link 42 to rebuild the basic block trace with the uncacheable memory operation isolated in a single instruction trace. The single instruction trace is marked as a non-promotable and non-speculative trace so that the next time the traces are executed, the new attributes apply. More specifically, the new attribute is stored in the respective trace caches, within the trace unit 12. At step 680, the IU 36 starts execution of the refetched traces. In this situation, the corrective action 626 ends at step 680.

If it is instead determined that the triggering trace at 678 is not a basic block trace, a determination must be made at 682 as to whether or not the triggering trace is a single instruction trace. If it is determined at 682 that the triggering trace is a single instruction trace, the process proceeds to step 684.

At 684, the trace unit 12 refetches the single instruction trace as is and records a non-speculative attribute associated therewith. More specifically, the new attribute is stored in the corresponding cache, within the trace unit 12. The IU 36 applies the non-speculative attribute to the single instruction trace so that the next time the trace is executed, the new attributes apply. The non-speculative attribute also implies that the trace is a single instruction trace, which is necessary due to the fact that the single instruction trace is recorded in the basic block cache. Additionally, the IU 36 starts execution of the refetched trace. In this situation, the corrective action 626 ends at step 684.

If it is instead determined that the triggering trace at 682 is not a single instruction trace, the triggering trace is microcode, and the process proceeds to step 686.

At 686, the trace is microcrode trace and the IU 36 signals the trace unit 12 through link 42 to be executed, in the future, with a non-speculative attribute. In future executions, the isolated memop of this trace is performed speculatively At step 686, the IU 36 applies the non-speculative attribute to the refetched microcode trace so that the next time the triggering trace is executed, the new attributes apply. More specifically, the new attribute is stored in a trace cache corresponding to the trace type of the trace being aborted, within the trace unit 12. Additionally, the IU 36 starts execution of the refetched trace, applying the non-speculative attribute to the microcode sequence in the refetched trace. In this situation, the corrective action 626 ends at step 686.

While the steps performed in the corrective action 626 are shown in FIG. 11 and the foregoing discussion to be in sequential order, alternatively, they may be performed substantially in parallel.

Figure 12:
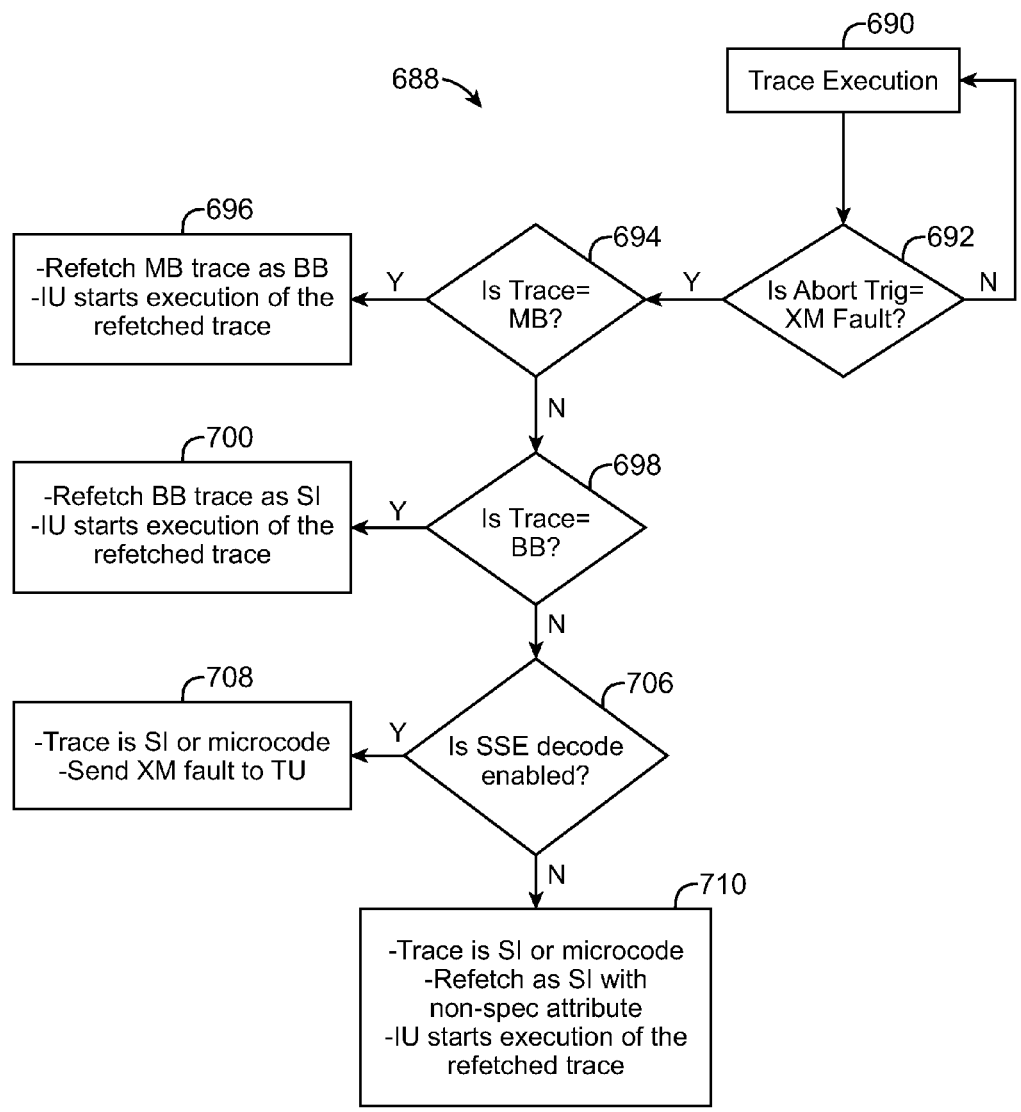

FIG. 12 shows the corrective action 688 taken when an occurrence of an XM fault is received as an abort. XM fault abort triggers occur when the XM 34 signals a fault to the IU 36. The XM fault abort is received by the abort prioritization logic 50 of the IU 36.

At step 690, while a trace is being executed, an occurrence of an XM fault abort trigger is received. Next at 692, a determination is made as to whether or not a XM fault abort trigger was sent by the XM 36 and received by the IU 36. The XM fault abort trigger is received when the XM 34 signals an operation fault to the IU 36. If it is determined at 692 that the XM fault abort trigger is received, a determination must be made at 694 as to whether or not the triggering trace is a multi-block trace. If it is determined at 694 that the triggering trace is a multi-block trace, the process proceeds to step 696. At 696, the IU 36 signals the trace unit 12 through link 42 to break the multi-block trace down into at least one basic block trace. In the case where the multi-block trace being broken down includes more than one basic block trace, it is broken down into multiple basic block traces. At 696, the IU 36 then starts execution of the refetched basic block trace(s). In this situation, the corrective action 688 ends at step 696.

If it is determined at 694 that the triggering trace is not a multi-block trace, a determination must be made at 698 as to whether or not the triggering trace is a basic block trace. If it is determined at 698 that the triggering trace is a basic block trace, the process proceeds to step 706. At 700, the IU 36 signals the trace unit 12 through link 42 to break the basic block trace down into at least one single instruction trace. In the case where the basic block trace being broken down includes more than single instruction trace, it is broken down into multiple single instruction traces. At 700, the IU 36 then starts execution of the refetched single instruction trace(s). In this situation, the corrective action 688 ends at step 700.

If it is determined at 698 that the triggering trace is not a basic block trace, a determination is made at t 706 as to whether or not SSE decode is enabled. If it is determined that SSE Decode is enabled, the process proceeds to step 708. At 708, the trace is either single instruction or a microcode trace. IU 36 sends the XM fault to trace unit 12, causing the trace unit 12 to fetch the microcode fault handler. In this situation, the corrective action 688 ends at step 708.

If it is determined at 706 that SSE decode is not enabled, the process proceeds to step 710. At step 710, the trace is either single instruction or a microcode trace. The trace unit 12 refetches the single instruction trace and records the non-speculative attribute associated therewith. The IU 36 applies the non-speculative attribute to the single instruction trace so that the next time the trace is executed, the new attributes apply. More specifically, the new attribute is temporary, and it is retained by the IU 36 for application to the refetched trace during execution. At 710, the IU 36 executes the refetched single instruction trace.

While the steps performed in the corrective action 688 are shown in FIG. 12 and the foregoing discussion to be in sequential order, alternatively, they may be performed substantially in parallel.

Figure 13:
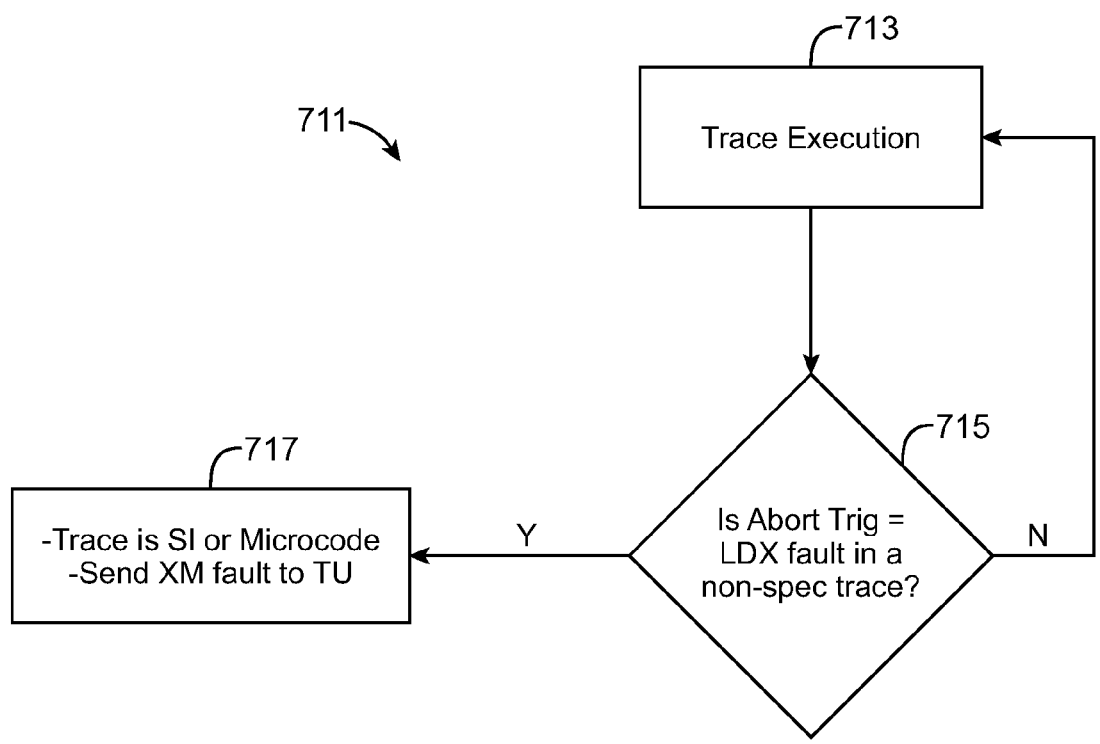

FIG. 13 shows the corrective action 711 taken when an occurrence of a LDX fault in a non-speculative trace is received as an abort. The LDX fault in a non-speculative trace abort trigger is a variant of the XM fault, and it is received by the IU 36 in the REN stage. The XM fault abort is received by the abort prioritization logic 50 of the IU 36.

At step 713, while a trace is being executed, an occurrence of a LDX fault in a non-speculative trace abort trigger is received. At 715, a determination is made as to whether or not a LDX fault abort trigger associated with a "LDX fault"-type fault signal is sent by the XM 36 and received by the IU 36.

The LDX fault abort trigger is applied to a non-speculative LDX when an x87 exception is pending. If it is determined that there is no LDX fault in a non-speculative trace abort trigger associated with a "LDX fault"-type fault signal received at 715, the process proceeds to step 713.

However, if it is determined at 715 that the LDX fault abort trigger is received, the triggering trace is a single instruction trace, and the process proceeds to step 717. At 717, the trace is either a single instruction or microcode trace. The IU 36 sends the XM fault to trace unit 12, causing the trace unit 12 to fetch the microcode fault handler. In this situation, the corrective action 711 ends at step 717.

While the steps performed in the corrective action 711 are shown in FIG. 13 and the foregoing discussion to be in sequential order, alternatively, they may be performed substantially in parallel.

Figure 14:
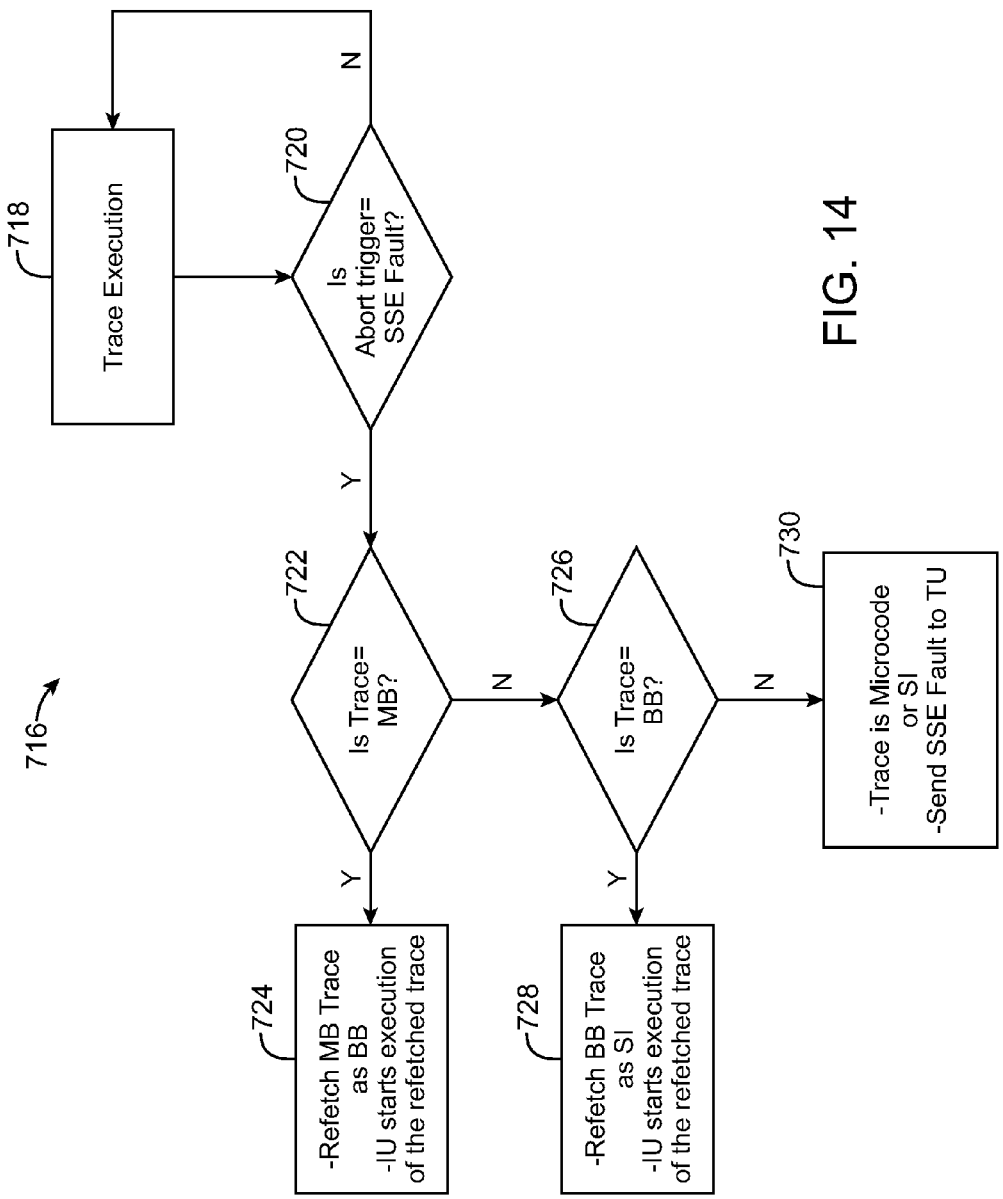

FIG. 14 shows the corrective action 716 taken when an occurrence of a SSE fault is received as an abort. SSE fault aborts occur when the SSE 38 signals a fault to the IU 36. A SSE fault is signaled when a SSE operation triggers an unmasked SSE exception. The SSE fault abort is received by the abort prioritization logic 50 of the IU 36.

At step 718, while a trace is being executed, an occurrence of a SSE fault abort trigger is received, i.e. abort trigger. Next at 720, it is determined whether or not the SSE fault abort trigger was sent by the SSE 38 and received by the IU 36. The SSE fault abort trigger 74 is sent by the SSE 38 to the IU 36. However, if it is determined at 720 that the SSE fault abort trigger is not received, the process proceeds to step 718.

However, if it is determined at 720 that the SSE fault abort trigger 74 is received, a determination must be made at 722 as to whether or not the triggering trace is a multi-block trace. If it is determined at 722 that the triggering trace is a multi-block trace, the process proceeds to step 724. At 724, the IU 36 signals the trace unit 12 through link 42 to break the multi-block trace down into at least one basic block trace. In the case where the multi-block trace being broken down includes more than one basic block trace, it is broken down into multiple basic block traces. At 724, the IU 36 then starts execution of the refetched basic block trace. In this situation, the corrective action 716 ends at step 724.

If it is determined at 722 that the triggering trace is not a multi-block trace, a determination must be made at 726 as to whether or not the triggering trace is a basic block trace. If it is determined at 726 that the triggering trace is a basic block trace, the process proceeds to step 728. At 728, the IU 36 signals the trace unit 12 through link 42 to break the basic block trace down into at least one single instruction trace. In the case where the basic block trace being broken down includes more than one single instruction trace, it is broken down into multiple single instruction traces. At 728, the IU 36 then starts execution of the refetched single instruction trace(s). In this situation, the corrective action 716 ends at step 728.

However, if it is determined at 726 that the triggering trace is not a basic block trace, the triggering trace is either a single instruction trace or a microcode trace, and the process proceeds to step 730. At 730, the IU 36 sends the SSE fault to trace unit 12, causing the trace unit 12 to fetch the microcode fault handler. In this situation, the corrective action 716 ends at step 730.

While the steps performed in the corrective action 716 are shown in FIG. 14 and the foregoing discussion to be in sequential order, alternatively, they may be performed substantially in parallel.

Figure 15:
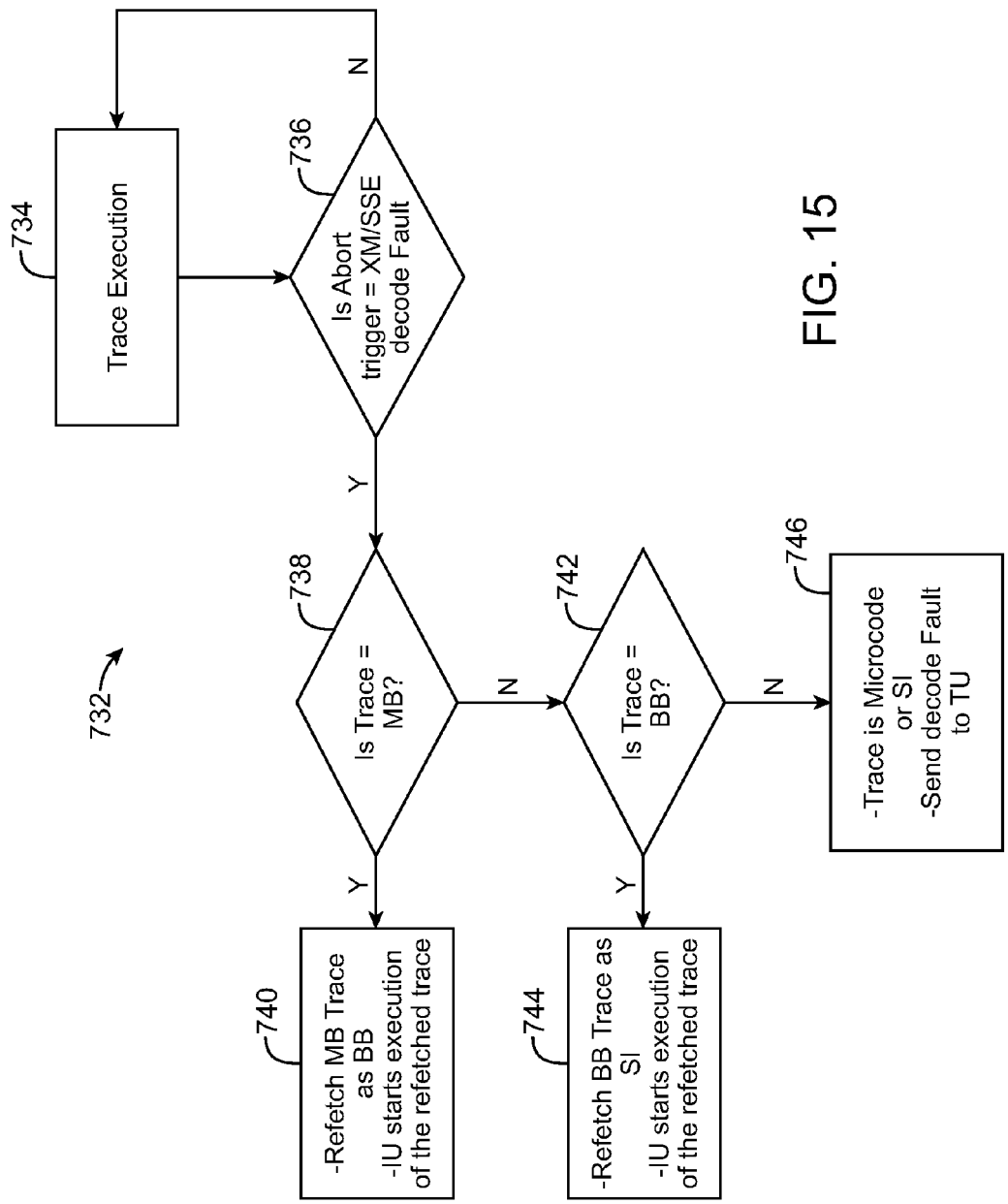

FIG. 15 shows the corrective action 732 taken when an occurrence of an XM/SSE decode fault is received as an abort. A XM/SE decode fault abort occurs when the IU 36 receives a XM operation or a SSE operation in the rename stage when the corresponding instruction type is disallowed. This is exhibited by the activation of trigger 73 (in FIG. 2). The XM/SSE decode fault abort (or the trigger 73) is received by the abort prioritization logic 50 of the IU 36.

At step 734, while a trace is being executed, an occurrence of a XM/SSE fault abort trigger is received. Next at 736, it is determined whether or not the XM/SSE fault abort trigger was triggered by the IU 36. If it is determined at 736 that the XM/SSE decode fault is not received, the process proceeds to step 738.

However, if it is determined at 736 that the SSE fault abort trigger is received, a determination must be made at 738 as to whether or not the triggering trace is a multi-block trace. If it is determined at 738 that the triggering trace is a multi-block trace, the process proceeds to step 740. At 740, the IU 36 signals the trace unit 12 through link 42 to break the multi-block trace down into at least one basic block trace. In the case where the multi-block trace being broken down includes more than one basic block trace, it is broken down into multiple basic block traces. At 740, the IU 36 then starts execution of the refetched basic block trace. In this situation, the corrective action 732 ends at step 740.

If it is determined at 738 that the triggering trace is not a multi-block trace, a determination must be made at 742 as to whether or not the triggering trace is a basic block trace. If it is determined at 742 that the triggering trace is a basic block trace, the process proceeds to step 744. At 744, the IU 36 signals the trace unit 12 through link 42 to break the basic block trace down into single instruction traces. At 744, the IU 36 then starts execution of the refetched single instruction traces. In this situation, the corrective action 732 ends at step 744.

However, if it is determined at 742 that the triggering trace is not a basic block trace, the triggering trace is either a single instruction trace or a microcode trace, and the process proceeds to step 746. At 746, the IU 36 sends the SSE fault to trace unit 12, causing the trace unit 12 to fetch the microcode fault handler. In this situation, the corrective action 732 ends at step 746.

While the steps performed in the corrective action 732 are shown in FIG. 15 and the foregoing discussion to be in sequential order, alternatively, they may be performed substantially in parallel.

Figure 16:
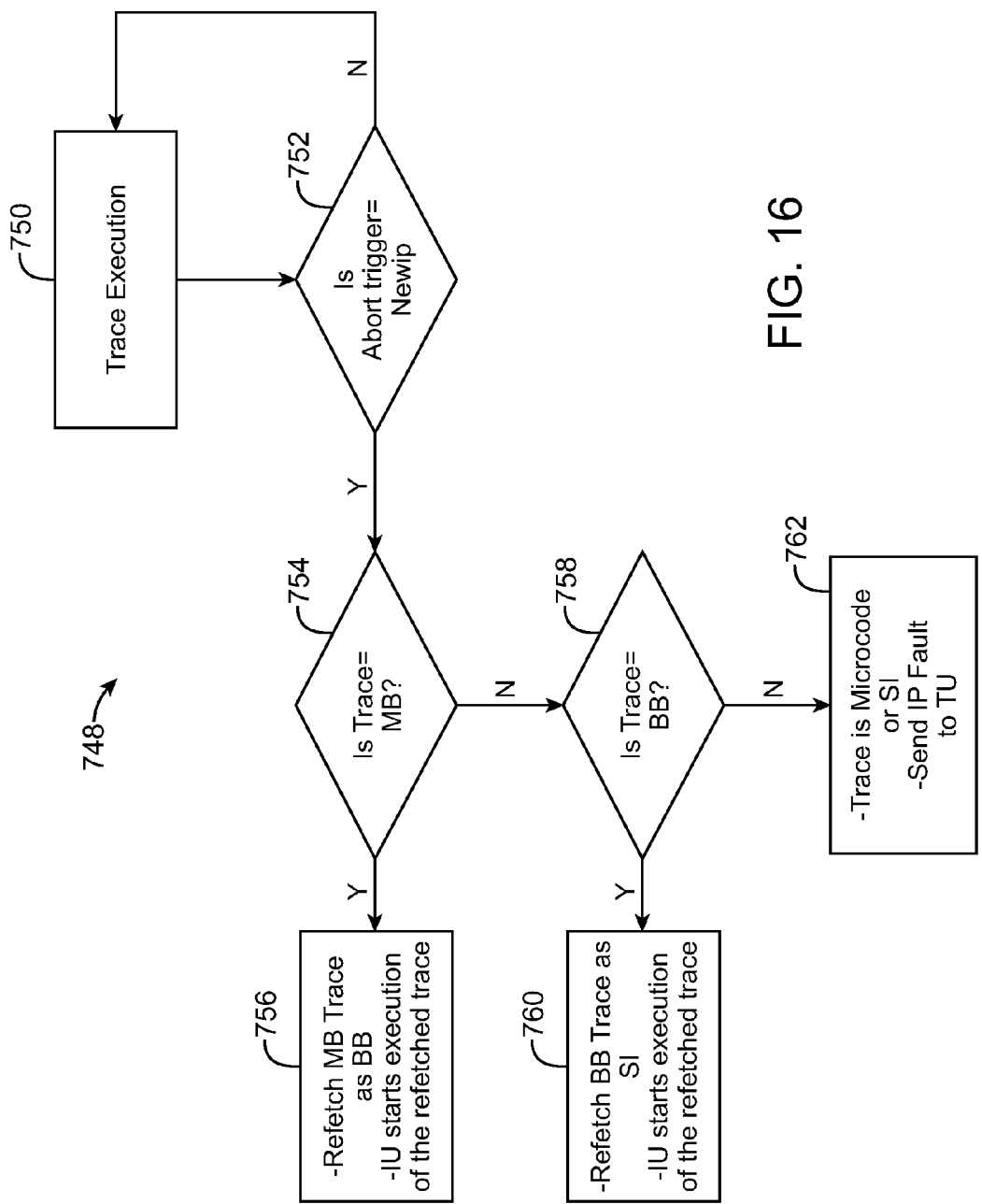

FIG. 16 shows the corrective action 748 taken when an occurrence of a newip fault is received as an abort. The newip fault abort is received by the abort prioritization logic 50 of the IU 36. The steps 752 through 762 are performed when the newip fault abort is received. Newip fault aborts occur when an operation to load a new instruction pointer (IP) detects that the new IP is outside the segment limits or linear address space ("out of bounds").

At step 750, while a trace is being executed, an occurrence of a newip fault abort is received. Next at 752, a determination is made as to whether or not the newip fault abort trigger is received. If it is determined at 752 that there is no newip fault abort trigger received, the process proceeds to step 750.

However, if it is determined at 752 that the newip fault abort trigger is received, a determination must be made at 754 as to whether or not the triggering trace is a multi-block trace. If it is determined at 754 that the triggering trace is a multi-block trace, the process proceeds to step 756. At 756, the IU 36 signals the trace unit 12 through link 42 to break the multi-block trace down into at least one basic block trace. At

756, the IU 36 then starts execution of the refetched basic block trace. In this situation, the corrective action 748 ends at step 756.

If it is determined at 754 that the triggering trace is not a multi-block trace, a determination must be made at 758 as to whether or not the triggering trace is a basic block trace. If it is determined at 758 that the triggering trace is a basic block trace, the process proceeds to step 760. At 760, the IU 36 signals the trace unit 12 through link 42 to break the basic block trace down into at least one single instruction trace. At 760, the IU 36 then starts execution of the refetched single instruction trace(s). In this situation, the corrective action 748 ends at step 760.

However, if it is determined at 758 that the triggering trace is not a basic block trace, the triggering trace is either a microcode or single instruction trace, and the process proceeds to step 762. At step 762, the IU 36 sends a IP fault to the trace unit 12, causing the trace unit 12 to fetch the microcode fault handler. In this situation, the corrective action 748 ends at step 762.

While the steps performed in the corrective action 748 are shown in FIG. 16 and the foregoing discussion to be in sequential order, alternatively, they may be performed substantially in parallel.

Figure 17:
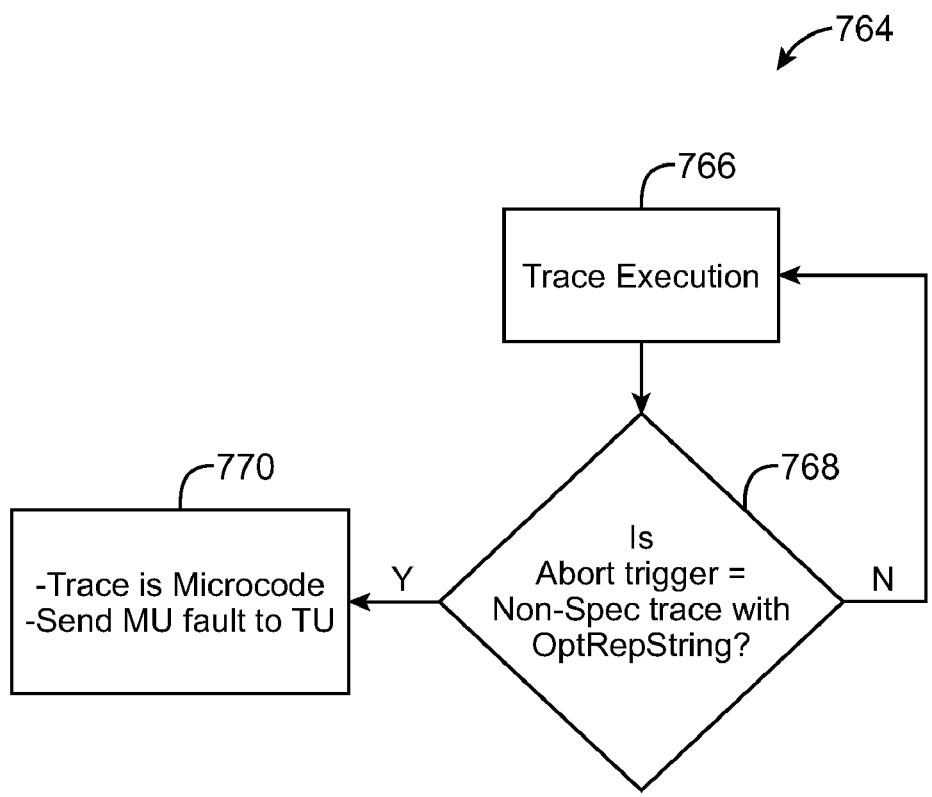

FIG. 17 shows the corrective action 764 taken when an occurrence of an OptRepString fault is received as an abort. The OptRepString fault abort is received by the abort prioritization logic 50 of the IU 36. The steps 768 through 770 are performed when the OptRepString fault abort is received.

At step 766, while a trace is being executed, an occurrence of an OptRepString fault abort is received. Next at 768, a determination is made as to whether or not the OptRepString fault abort trigger is received by the IU 36. The OptRepString fault abort trigger is received when the IU 36 receives a microcode trace with the OptRepString attribute prepared to execute non-speculatively. If it is determined at 768 that the non-speculative trace with OptRepString attribute abort trigger was not received, the process proceeds to step 766.

However, if at 768 it is determined that the OptRepString fault abort trigger was received by the IU 36, the process proceeds to step 770. At 770, the IU 36 sends the memory unit fault to the trace unit 12. A memory unit fault is sent to the trace unit 12 in order to send the trace to the MU 44 fault handler so that an alternate microcode trace that allows a non-speculative attribute to be applied can be executed. In this situation, the corrective action 764 ends at step 770.

While the steps performed in the corrective action 770 are shown in FIG. 14 and the foregoing discussion to be in sequential order, alternatively, they may be performed substantially in parallel.

Figure 18:
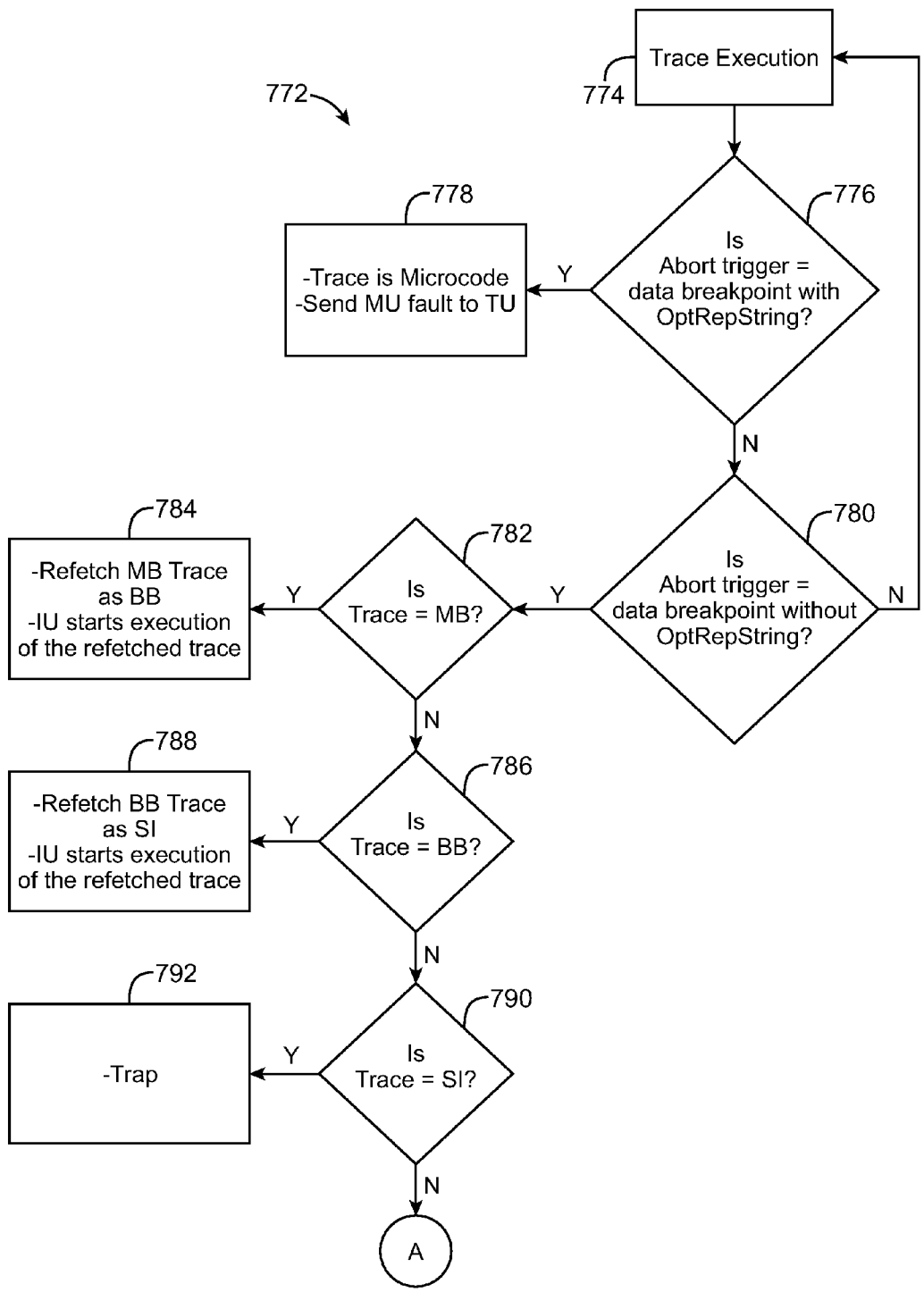
Figure 18:
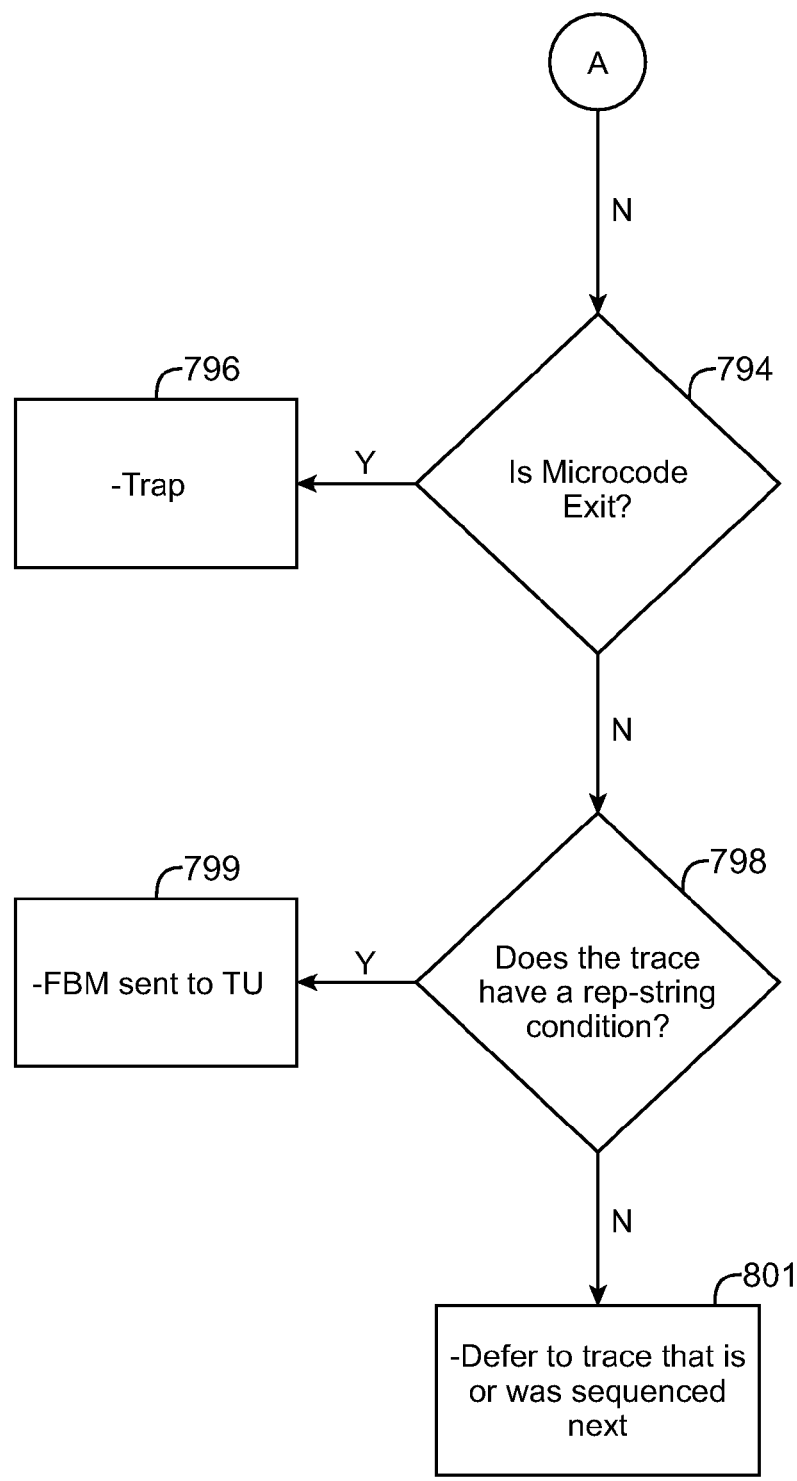

Single-Instruction Trap and Multi-Instruction Fault and Trap:

FIG. 18 shows the corrective action 772 taken when an occurrence of a data breakpoint is received as an abort. The data breakpoint abort is received by the abort prioritization logic 50 of the IU 36. The steps 776 through 798 are performed when the data breakpoint abort is received. Data breakpoint aborts occur when a trace triggers a data break point. A data break point is set to discontinue execution at the end of the instruction that triggers it.

At 776, a determination is made as to whether or not a data breakpoint abort trigger from a trace with the OptRepString attribute was received by the IU 36. If it is determined at 776 that the data breakpoint abort was received from a trace with the OptRepString attribute at 776, the process proceeds to step 778. At step 778, the IU 36 sends the memory unit fault to the trace unit 12 In this situation, the corrective action 772 ends at step 778.

If it is determined at 776 that the data breakpoint abort trigger was not from a trace with the OptRepString attribute, a determination is made at 780 as to whether or not a data breakpoint abort trigger or an XM error, from a trace without the OptRepString attribute, was received by the IU 36. In the exemplary embodiment, the abort trigger may alternatively result from a "XM error." An "XM error" halts execution after a XM reg op, and the error triggers an unmasked x87 exception. If it is determined at 780 that the data breakpoint abort was not received from a trace without the OptRepString attribute at 780, the process proceeds to step 774.

However, if it is determined at 780 that the data breakpoint abort trigger from a trace without the OptRepString attribute was received by the IU 36, a determination must be made at 782 as to whether or not the triggering trace is a multi-block trace. In the exemplary embodiment, the abort trigger may alternatively result from a "XM error." An "XM error" halts execution after a XM reg op, and the error triggers an unmasked x87 exception. If it is determined at 782 that the triggering trace is a multi-block trace, the process proceeds to step 784. At 784, the IU 36 signals the trace unit 12 through link 42 to break the multi-block trace down into at least one basic block trace. In the case where the multi-block trace being broken down includes more than one basic block trace, it is broken down into multiple basic block traces. At 784, the IU 36 starts execution of the refetched basic block trace. In this situation, the corrective action 772 ends at step 784.

If it is determined at 782 that the triggering trace is not a multi-block trace, a determination must be made at 786 as to whether or not the triggering trace is a basic block trace.

If it is determined at 786 that the triggering trace is a basic block trace, the process proceeds to step 788. At 788, the IU 36 signals the trace unit 12 through link 42 to break the basic block trace down into single instruction traces. At 788, the IU 36 then starts execution of the refetched single instruction traces. In this situation, the corrective action 760 ends at step 788. If it is determined at 786 that the triggering trace is not a basic block trace, a determination must be made at 790 as to whether or not the triggering trace is a single instruction trace. If it is determined at 790 that the triggering trace has a single instruction attribute, the process proceeds to step 792. At 792, a data breakpoint trap is taken (or processed). Traps are set generally to capture data relating to a problem with the code that is being diagnosed. Alternatively, if the abort trigger at 780 is an XM error, then at step 792, the XM error abort is taken (or processor). In this situation, the corrective action 760 ends at step 792.

XM error is an error type of abort trigger and XM fault is a fault type of trigger.

If it is determined at 790 that the triggering trace is not a single instruction trace, a determination must be made at 794 as to whether or not the triggering trace is a microcode "Exit" trace or an exit out of the microcode trace. If it is determined at 794 that the triggering trace is a microcode exit trace, the process proceeds to step 796. At 796, a trap is set. In this situation, the corrective action 760 ends at step 796.

If it is determined at 794 that the triggering trace is not a microcode exit trace, a determination must be made at 798 as to whether or not the triggering trace has a "rep-string condition." A "rep-string condition" checks for data breakpoints in a trace. If it is determined that a "rep-string condition" is in the triggering trace, the process proceeds to step 799. At 799, the final branch misprediction is sent to the IU 36. In this situation, the corrective action 760 ends at step 799.

However, if it is determined at 798 that a "rep-string condition" is not present in the triggering trace, the process proceeds to step 801. At 801, the IU 36 defers to the trace that is to be or was sequenced next. In this situation, the corrective action 760 ends at step 801.

While the steps performed in the corrective action 772 are shown in FIG. 17 and the foregoing discussion to be in sequential order, alternatively, they may be performed substantially in parallel.

Figure 19:
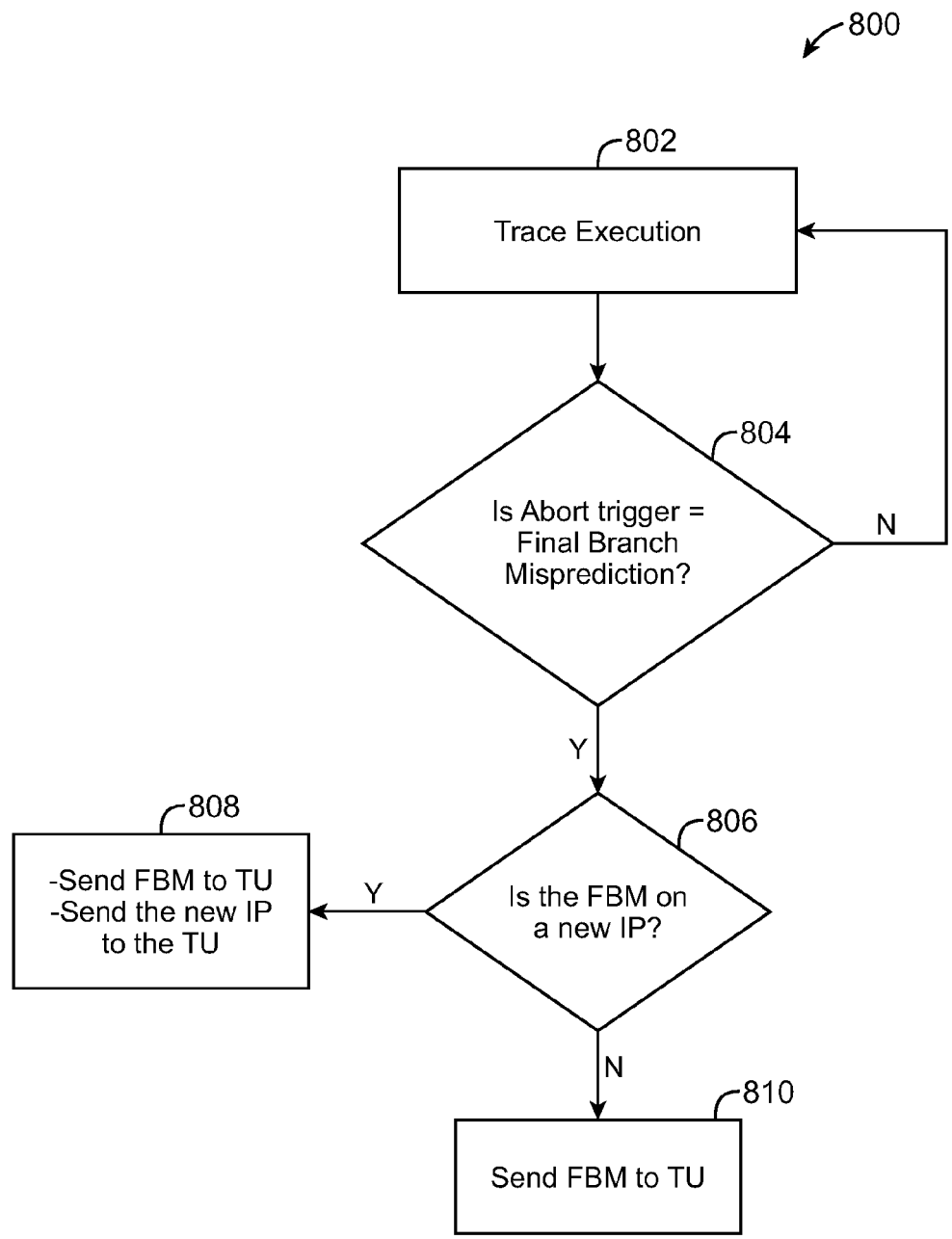

Final Branch Misprediction Abort:

FIG. 19 shows the corrective action 800 taken when an occurrence of a final branch misprediction is received as an abort. The final branch misprediction abort is received by the abort prioritization logic 50 of the IU 36. The steps 804 through 810 are performed when the final branch misprediction abort is received. Final branch misprediction aborts occur when the final prediction in a multi-block, basic block, single instruction, or microcode trace is mispredicted.

At step 802, while a trace is being executed, an occurrence of a final branch misprediction abort trigger is received. Next at 804, a determination is made as to whether or not the final branch misprediction abort trigger is received. If it is determined at 804 that there is no final branch misprediction abort trigger received, the process proceeds to step 802.

However, if it is determined at 804 that the final branch misprediction abort trigger is received, at 806 a determination is made as to whether or not the final branch misprediction is on a new IP. If it is determined at 806 that the final branch misprediction is on a new IP, the process proceeds to step 808. At 808, the IU 36 sends the final branch misprediction to the trace unit 12, and the IU 36 sends the new IP to the trace unit 12. If this is the situation, the corrective action 800 ends at step 808.

If it is determined that the final branch misprediction was not on a new IP, the process proceeds to step 810. At 810, the IU 36 sends the final branch misprediction to the trace unit 12, and the trace unit 12 updates its trace sequencing to the corrected target. In this situation, the corrective action 800 ends at step 810.

While the steps performed in the corrective action 800 are shown in FIG. 19 and the foregoing discussion to be in sequential order, alternatively, they may be performed substantially in parallel.

While the foregoing steps of FIGS. 6-19 and related discussion are directed to the steps being performed in sequential order, it is understood that at least some steps thereof may be alternatively performed substantially in parallel or some steps may be performed in sequential order and others may be performed substantially in parallel.

Abort triggers, other than those indicated in Table 3 and discussed relative to the flow charts of FIGS. 6-19, are anticipated. Examples of the some of which include:

Load Value Misprediction Abort:

Description: A load was predicted to read a certain value from memory, and execution proceeded as if the value were already read from memory. If a later check of memory shows the prediction to be incorrect, then a load value misprediction abort event is signaled.

Corrective Action: Re-fetch trace and execute with an attribute to disable value prediction. In an exemplary embodiment, an abort trigger due to a load value misprediction might be of the higher priority level, or priority 0.

Abort Prioritization

Abort prioritization, in accordance with an embodiment and method of the present invention is a method of determining a reason for a trace to be aborted in a trace-based processor architecture where a trace includes operations representing instructions and an instruction might have more than one operations representing it. To this end, the IU 36 receives at least two incoming indications of occurrences of abort triggers, which may be any of the triggers 70-76. Prioritizing among the abort trigger occurrences for the trace is based on the abort priority level of each abort trigger that occurred stemming from execution of the trace. An indication is held, as a pending abort, of the abort trigger with a highest abort priority level, such as priority 0, among the abort trigger occurrences stemming from the execution of the trace and provided, to the trace unit 12, as an outgoing indication of the pending abort. The trace represents multiple instructions. Prioritizing is performed among the abort trigger occurrences for the same trace based on each abort trigger's abort priority level.

In some embodiments, the incoming indications of abort triggers occurs over time and the held indication of the abort trigger indicates the highest abort priority level among the those of the abort trigger occurrences that have been prioritized. Those of the abort trigger occurrences that are discarded have been prioritized and that are not the highest priority abort priority level.

In some embodiments, the pending abort held further includes indications of multiple abort trigger occurrences that are prioritized subsequent to being held as the pending abort.

In some embodiments, each abort trigger has an associated abort priority level based on the trace type of the trace being aborted.

In some embodiments, the prioritizing among current abort trigger occurrences for the trace includes all abort trigger occurrences stemming from the execution of the trace.

In some embodiments, prioritizing among the abort triggers occurs at multiple points in time, holding (or storing), as a pending abort, an indication of the abort trigger with the highest abort priority level among the prioritized abort triggers, including the abort priority level of the pending abort when prioritizing among incoming abort triggers.

In some embodiments, the pending abort is kept and the current abort trigger is discarded if the abort priority level of the pending abort is the same as the abort priority level of the current abort trigger.

In some embodiments, a pending abort and the current abort trigger are kept if the abort priority level of the pending abort is the same as the abort priority level of the current abort trigger.

In some embodiments, the pending abort is discarded and the current abort trigger is kept if the abort priority level of the pending abort is the same as the abort priority level of the current abort trigger.

A particular operation can cause multiple abort triggers. Each abort trigger has a static priority. That is, each occurrence of the same abort trigger has the same priority regardless of the program order of the instructions that correspond to the operations.

In some embodiments, a combination of abort priority level and instruction order schemes are employed.

In some embodiments, prioritizing does not take into account a correspondence between the operations that caused the abort trigger occurrences and the instructions that the operations, at least in part, represent. Examples of abort triggers are shown and discussed relative to Table 3. Other abort triggers are anticipated.

FIGS. 20-23 show steps performed in prioritizing aborts, in accordance with an exemplary method of the abort prioritization process of the present invention.

Figure 20:
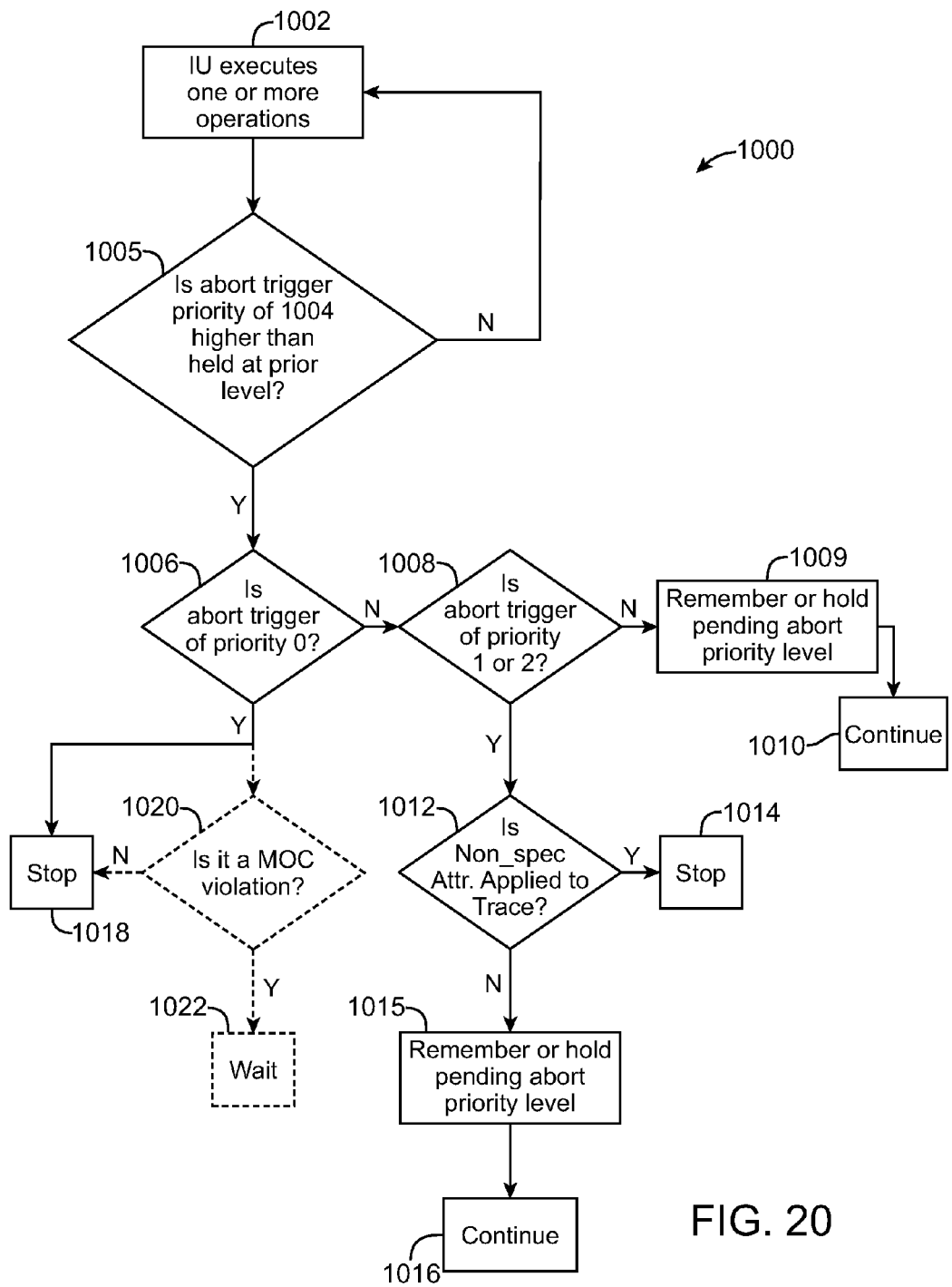
FIGS. 20-23 show steps performed in prioritizing aborts, in accordance with an exemplary method of the abort prioritization process of the present invention.

FIG. 20 shows the corrective action 1000 taken when IU 36 receives an abort trigger from various sources defined, for example in Table 4, while executing a trace. Table 4 shows an exemplary abort prioritization scheme, in accordance with an embodiment of the present invention.

The abort trigger is detected by the abort prioritization logic 50 of the IU 36. The Priority column of Table 4 lists the priority levels. In this example, priority 0 takes on the highest priority level that a trace can experience. The Abort column of Table 4 includes the aborts that a trace can experience. The Abort Description column of Table 4 lists the description of corresponding aborts. The prioritization of each row is dictated by the Priority column.

nation is made by the abort prioritization logic 50 as to whether or not the detected abort trigger is of the highest priority, such as priority 0. Thus, abort prioritization is advantageously based on priority levels rather than age-based. Although in other methods, a combination of priority level and age-based schemes is employed.

In one embodiment, if it is determined that the abort trigger is of priority 0, the process continues to step 1018 and 'stops'. 'Stop' as performed in the step 1018 is described hereinabove. The refetched trace can be the same as the aborted trace and re-executed as is, or fetched in a different manner, or as an entirely different trace.

TABLE 4

| Abort Priority Level | Abort | Abort Description |
|---|---|---|
| 0 | IntraProcessor InterProcessor | A speculative memory access executed out of order relative to another load or store in the same core. |
| 0 | InterProcessor Order Violation (MP loss) | A speculative memory access executed out of order relative to the order seen by a snoop access. |
| 0 | InterProcessor Order Violation (UP loss) | A speculative memory access caused replacement of a line used by a previously executed, uncommitted memop. Because another processor could modify the line without our knowledge, we must pessimistically abort the memop. |
| 0 | TU Abort Request | The TU requested an abort for SMC or some other reason. |
| 1 | Interior Branch Mispredict | The trace has a branch that is not the last instruction (prior to decoding and optimization), and that branch was mispredicted. Note that interior branches are marked as such by the TU, which may have no relation to the order of operations in the trace. |
| 2 | Fault | An operation triggered a hardware fault in a multiinstruction or singleinstruction trace. The trace must be degraded until the fault is positively identified, and then an abort is made to the emcode fault handler. |
| 2 | NRQ Overflow | A writecombining store overflows the NRQ. The trace must be rebuilt with fewer stores. |
| 2 | Temporary NonSpec Requirement | A memop accessed a page that was not previous accessed, or a store operation wrote to a page that was not previously unmodified. The instruction must be executed nonspeculatively so that the MU can safely set the accessed or modified bit on the page. |
| 2 | Permanent NonSpec Requirement | The trace was not built to be executed nonspeculatively, and a memory operation attempted to access uncacheable memory. Since the operation cannot be completed speculatively, the trace must be rebuilt to isolate the instruction. |
| 2 | MultiInstruction Trap | The trace was fetched with only a single instruction, and that instruction triggered a fault exception (an exception to be handled before the instruction completes). |
| 3 | SingleInstruction Trap | The trace was fetched with only a single instruction, and that instruction triggered a trap exception (an exception to be handled after the instruction completes). |
| 3 | x87 Error | The trace was fetched with only a single instruction, and that instruction triggered an x87 error. The x87 error must be logged so that we can report it properly when it triggers a later x87 fault. |
| 3 | Final Branch Mispredict | The previous trace had a branch as the last instruction (prior to decoding and optimization), and that branch was mispredicted. Note that a final branch is marked as such by the TU, which may have no relation to the order of operations in the trace. |

Referring still to FIG. 20, at step 1002, while a trace is being executed, an abort is received (or detected) or an occurrence of the abort trigger is received. When an occurrence of an abort trigger is indicated, the process proceeds to 1005, where a determination is made as to whether or not the abort trigger priority level of the indicated abort trigger, of 1004, is higher than that held as the priority level. If it is determined that the priority of the abort trigger at 1004 is not higher than that of the held priority level, the process proceeds to step 1002.

However, if it is determined at step 1005 that the abort trigger priority of 1004 is higher than that which is held as the priority level, the process continues to 1006 where a determi- In one embodiment of present invention, if the abort trigger 1004 is of priority 0, the process continues to step 1020 where a determination is made as to whether or not a MOC violation abort trigger (or MOC abort trigger) is detected. If there is no MOC abort trigger detected at 1020, the process continues to step 1018. However, if a MOC abort trigger is detected at 1020, the process continues to step 1022 where the process 'waits', i.e. IU 36 sends an abort to the trace unit 12 along with an abort reason and a trace ID corresponding to the trace with the abort while continuing execution of the same trace to find additional constraints until the trace unit 12 refetches the trace and sends it to the IU 36.

Next at step 1006, if the abort trigger is not of the highest abort priority level, or priority 0, the process continues to step 1008. At step 1008, a determination is made by the abort prioritization logic 50 as to whether or not the abort trigger is of a sequentially lower abort priority level, such as, in this example, priority 1 or 2. If the abort trigger is not of priority 1 or 2 indicating that the abort trigger must be of the lowest abort priority level (priority 3), the process proceeds to step 1009 where the IU 36 must retain or hold the pending abort priority level. Next, the process proceeds to step 1010 where it 'continues', i.e. IU 36 sends an abort to the trace unit 12 and continues executing the same trace to find higher priority aborts and additional constraints or until the trace is ready to commit. If the abort trigger is of priority 1 or 2, the process continues to step 1012 where a determination is made as to whether or not non-speculative attribute, or an attribute that is associated with a non-speculative trace, is applied to the trace. If the non-speculative attribute is applied to the trace, the process continues to step 1014 where the process 'stops.' If the non-speculative attribute is not applied to the trace, the process proceeds to step 1015. At 1015, the IU 36 must retain or hold the pending abort priority level. Next, the process proceeds to step 1016; 'continue.'

Figure 21:
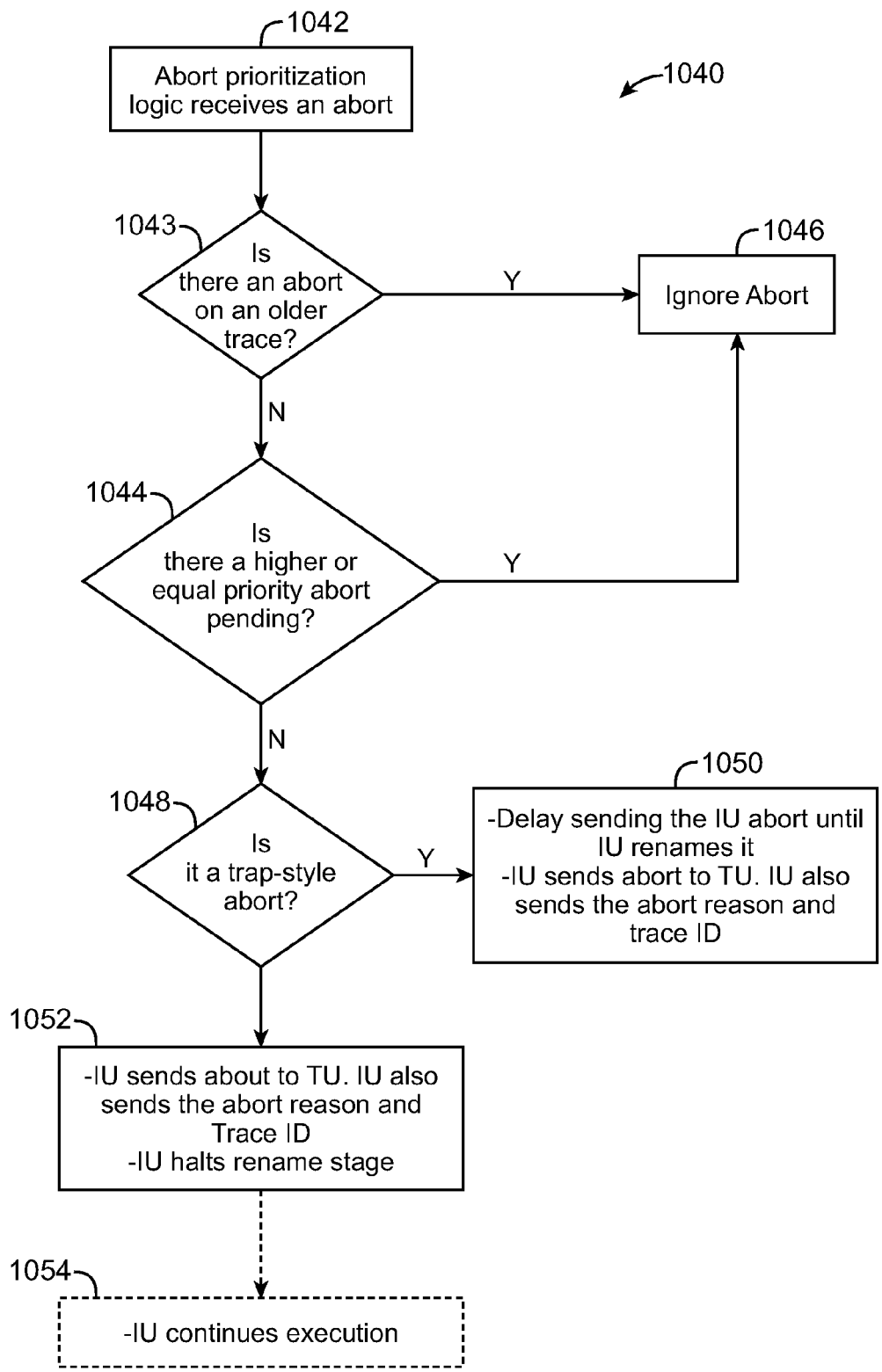

FIG. 21 shows the corrective action 1040 taken when the abort prioritization logic 50 receives an abort trigger at step 1042 from various sources defined, for example in Table 5, while executing a trace.

Table 5 is a table of abort triggers and their respective descriptions in an exemplary abort prioritization scheme. The rows of Table 5 correspond to the abort triggers 70-76 (of FIG. 2).

TABLE 5

| Abort Trigger | Description |
| --- | --- |
| 72 | Order violation in ALU 0 (MOC, MP loss, or various kinds of UP loss) |
| 72 | Order violation in ALU 1 (MOC, MP loss, or various kinds of UP loss) |
| 72 | Order violation in ALU 2 (MOC, MP loss, or various kinds of UP loss) |
| 70 | TU abort request |
| 70 | 2nd abort (delayed TU abort request) |
| 75 | Branch misprediction in ALU 0 (interior or final) |
| 75 | Branch misprediction in ALU 1 (interior or final) |
| 75 | Branch misprediction in ALU 2 (interior, final, or newipassert.fin) |
| 72 | SegFault or CannotComplete in ALU 0 (many variations are possible) |
| 72 | SegFault or CannotComplete in ALU 1 (many variations are possible) |
| 72 | SegFault or CannotComplete in ALU 2 (many variations are possible) |
| 76 | XM fault on XM op 0 |
| 76 | XM fault on XM op 1 |
| 74 | SSE fault on SSE op 0 |
| 74 | SSE fault on SSE op 1 |
| 75 | Newip fault in slot 2 |
| 75 | Pending data breakpoint (previously accumulated from triplet 0, triplet 1, and triplet 2) |
| 76 | XM error in a hardware trace (from XM op0 or op 1) |
| 75 | OptRepString in nonspec |
| 72 | XM fault on nonspec Idx in slot 2 of a hardware trace |
| 72 | XM/SSE decode fault |

The ALU0 0-2 of Table 5 correspond to the ALU 0-2 60-64 of FIG. 2, respectively.

At step 1043, a determination is made as to whether or not there is an abort applied to an older trace. If it is determined at 1043 that there was an abort applied to an older trace, the process proceeds to step 1046 where the detected abort is ignored by the abort prioritization logic 50.

However, if at 1043, it is determined that there was no abort on a older trace, at 1044, a determination is made as to whether or not the detected abort is of a higher or equal abort priority level than the earlier abort received by the abort prioritization logic 50, i.e. the pending abort. If a higher or equal priority abort is pending in the abort prioritization logic 50, the process continues to step 1046 where the detected abort is ignored by the abort prioritization logic 50. If there is not a higher or equal priority abort pending, indicating that the detected abort is either the first abort trigger received by the abort prioritization logic 50, or the abort received has a higher abort priority level than the pending abort, and the process continues to step 1048. The foregoing basis of abort prioritization, based on priority levels instead of relative age, advantageously allows prioritization of aborts in a trace-based processor architecture where the operations do not represent original program (instruction) order.

At step 1048, a determination is made as to whether or not the new higher priority abort received is a trap-style abort. If the new abort received is a trap-style abort, the process continues to step 1050 where the abort prioritization logic 50 delays sending the abort to the trace unit 12 until the IU 36 finishes renaming the trace. IU 36 will then send the new received abort to the trace unit 12 along with an abort reason and the corresponding trace ID.

If the newly-received abort is not a trap-style abort, the process continues to step 1052 where IU 36 sends the new abort received to the trace unit 12 along with an abort reason and the corresponding trace ID and halts rename stage and does other housekeeping. The IU 36 also discards all operations in the scheduler in the execution pipeline and rolls back its state, as directed by the information saved in a table. A trap-style abort results from, for example, a user-initiated trap in the code for test purposes.

In an alternative embodiment and method of the present invention, while IU 36 is processing the IU abort internally, it will also send an abort to MU 44 to rollback the state of its cache.

In one embodiment and method of the present invention, the process continues to step 1054, after step 1052, where it will continue execution of the same trace to find additional constraints until the trace unit 12 refetches the same trace or a broken down (degraded) version of the same trace and sends it to IU 36.

In some embodiments and methods, when the IU 36 sends an abort to the trace unit 12, the trace unit 12 discards its predicted path and resorts to the path dictated by the abort.

Figure 22:
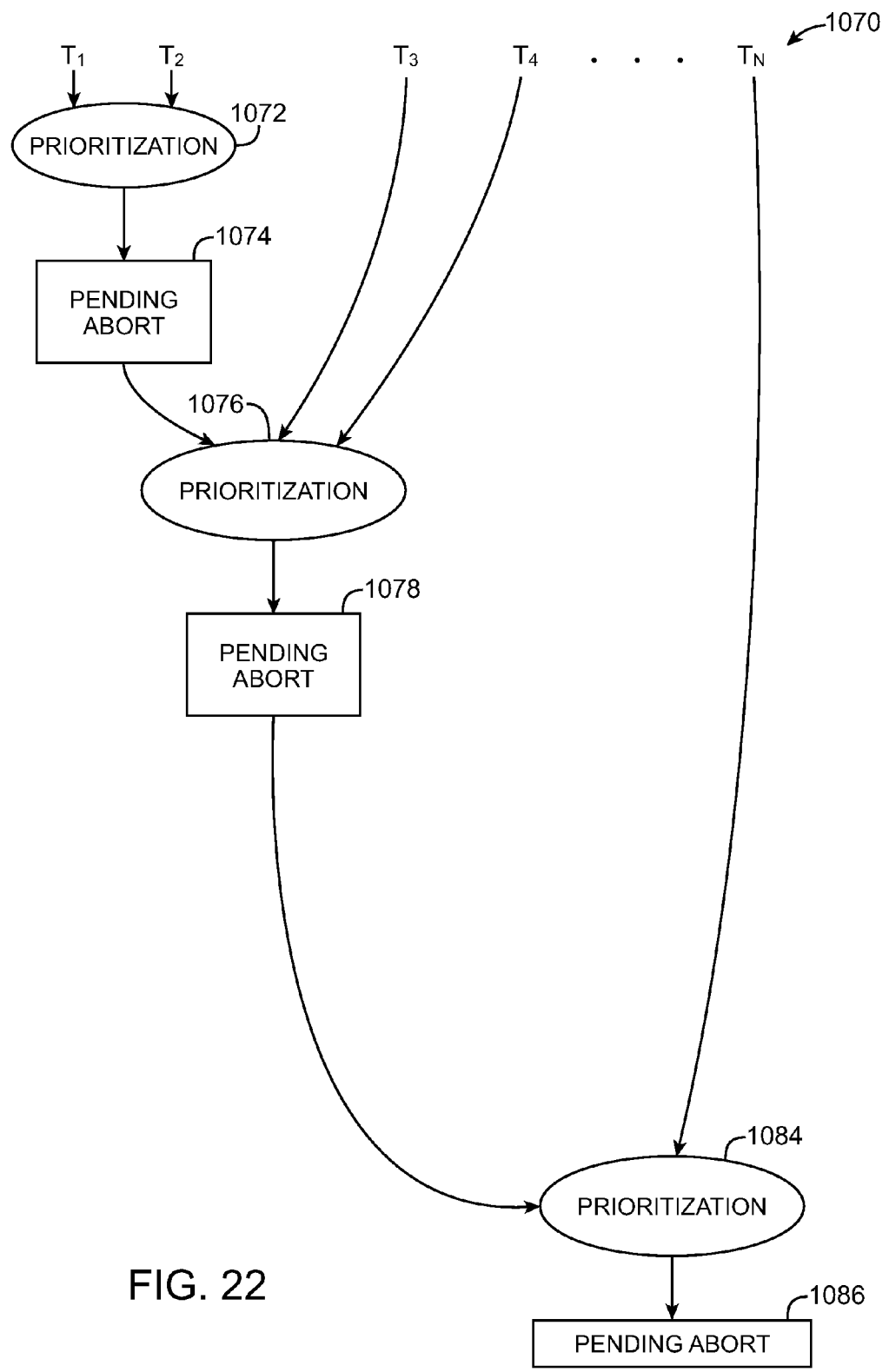

FIG. 22 shows, conceptually, a method 1070 of determining a reason for a trace to be aborted, employed in an abort prioritization scheme, in accordance with an exemplary method of the present invention.

In the method 1070, N number of aborts, or T1 through TN are experienced by a trace, N being an integer value. First, T1 and T2 aborts are applied to the trace and at 1072, these aborts are prioritized in accordance with a priority level scheme, such as discussed above, where the abort with the highest level of priority is taken and saved as the "pending abort". Pending aborts are saved in the accumulator 203 in one embodiment of the present invention.

Next, the same trace experiences abort T3 and abort T4, which are current aborts. It is noted that aborts result from the occurrence of abort triggers. Next, at 1076, the aborts T3 and T4 are prioritized relative to each other as well as the pending abort, which was held at 1076, to obtain a current abort priority level using the priority level scheme, i.e. the abort with the highest abort priority level is selected and stored as the pending abort at 1078. The pending abort of 1078 replaces that of 1076. That is, the same physical location, such as the same register, is used to store the pending abort. Thus, at any given time, there is one pending abort in the exemplary method of FIG. 22.

Next, $T_N$ is applied to the same trace and prioritized against the pending abort of 1078 using the priority level scheme and the result is stored, updating the pending abort at 1086.

The output of each of the prioritizations at 1072, 1076 and 1084 is the current pending abort reason. Thus, at each of 1072, 1076 and 1084, the current pending abort reason is updated.

The process of FIG. 22 is one method of using a prioritization level scheme to prioritize aborts applied to the same trace.

Figure 23:
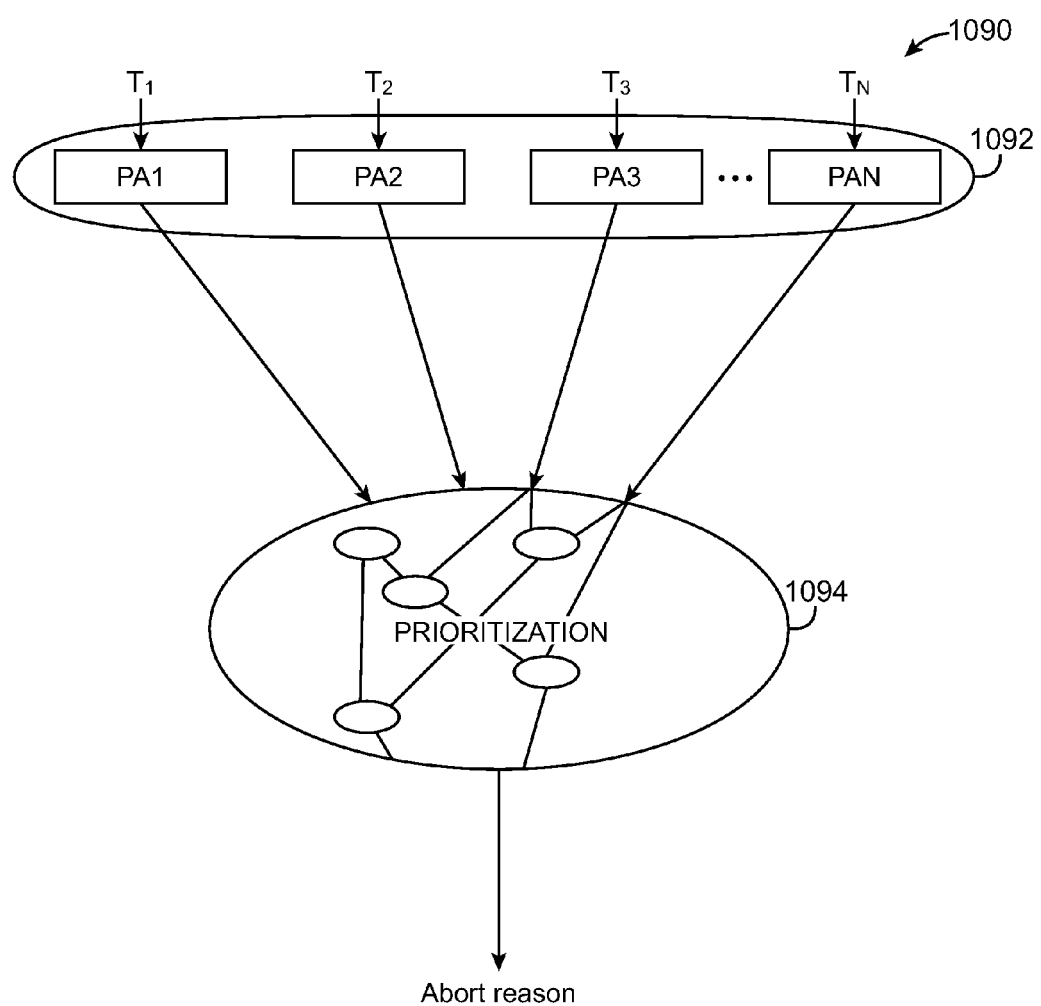

FIG. 23 shows examples of pair-wise prioritization in that two aborts are prioritized at any given time and then at a later time prioritized either pair-wise again, or not. For example, the T1 and T2 are pair-wise prioritized at 1074 as are TN and the pending abort at 1084. However, at 1076, prioritization is not performed pair-wise, rather, more than two abort priority levels are compared. In an exemplary embodiment, the prioritization of FIG. 22 is not step-wise. That is, it is performed through the progression of time, as time relates to clock cycles. Alternatively, the prioritization scheme of FIG. 22 occurs step-wise, or in one clock cycle.

FIG. 23 shows, conceptually, a method 1090 of determining a reason for a trace to be aborted, employed in an abort prioritization scheme, in accordance with another exemplary method of the present invention.

In the method of FIG. 23, N (N being an integer value) number of aborts, T1 through TN are applied to the same trace at substantially the same time. N number of pending aborts 1092 hold the aborts T1-$T_N$. That is, each of the aborts is saved in a corresponding pending abort, within the accumulator 203. Next, prioritization of the pending aborts of performed at 1094 in accordance with an abort prioritization level scheme discussed above, to generate a single abort reason. The generated abort reason essentially results from the reason for the abort with the highest abort priority level among the aborts T1-$T_N$.

At 1094, the abort priority levels of pending aborts are compared together to generate the abort reason. However, alternatively, the abort reason is generated by performing pair-wise prioritization, step-wise prioritization or non pair-wise and non step-wise prioritization or any combination thereof.

While the abort prioritization scheme of FIGS. 20-23 refers to a prioritization level scheme, alternatively, an abort prioritization scheme uses a combination of the prioritization level scheme and age-based scheme across multiple traces. The trace ID is an indicator of the relative age of a trace. For example, a trace with a higher a trace ID than another trace, is the younger trace among the two traces.

In the various embodiments of the present invention, some of which are presented herein, pending abort triggers and their respective abort reasons are store or remembered for the purpose of prioritization of the abort triggers. Because in a trace-based processor architecture multiple abort triggers could result at different instances of time, the abort reason/trigger need be stored to better prioritize the abort trigger.

In accordance with the foregoing, an abort prioritization scheme and apparatus and a graceful degradation protocol is presented for use in trace-based processor architectures. The abort prioritization and graceful degradation schemes of the various embodiments of the present invention advantageously prioritize and handle aborts (or problems) of traces having no clear operation-to-instruction correspondences or instruction boundary or instruction order correspondences.

The foregoing schemes allow for prioritization and handling of aborts even though traces lack operations therein having clear relative age or order between each other (corresponding to the original instruction program order). Furthermore, these schemes advantageously allow for multiple abort triggers to be detected for the same trace whereas traditional processors will only recognize a single abort trigger for a single instruction.

While various embodiments have been described with respect to atomic traces, the aforementioned techniques are equally applicable to non-atomic traces and other groups of instructions or operations.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements is variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of determining a reason for a trace to be aborted, where the method is adapted for use with a processor that executes operations that represent instructions, the method comprising:

receiving at least two incoming indications of occurrences of abort triggers stemming from the execution of at least two of the operations that are different from each other, where each operation has a trace associated therewith and each of the operations is associated with the same trace, where each of the abort triggers has an associated abort priority level, and where the trace represents multiple instructions; and prioritizing among the abort triggers for the trace based on the abort priority level of each abort trigger, where the prioritizing does not take into account a correspondence between the at least two operations and at least two of the instructions that the at least two operations at least in part represent, where the prioritizing selects as a pending abort reason one or more of the abort triggers that have the same abort priority level, and where that abort priority level is the highest among the abort priority levels of the abort triggers for the trace.

2. The method of claim 1, where:

for at least some of the abort triggers, the abort priority level associated with the abort trigger is based at least in part on a trace type of the trace.

3. The method of claim 2, where:

the trace type is a combination of a trace property and a set of trace attributes, where the trace property includes one or more of a multi-block trace, a basic block trace, or a microcode trace; and where the set of trace attributes includes one or more of a non-speculative attribute or a single instruction attribute.

4. The method of claim 1, where:

the incoming indications of abort triggers occur at multiple points in time during the execution of the operations of the trace.

5. The method of claim 1, further comprising:

holding a set of abort triggers stemming from the execution of the trace; and where the prioritizing among the set of the abort triggers occurs at a single point in time.

6. The method of claim 1, further comprising:

holding a current pending abort reason;

where the prioritizing among the abort triggers occurs at multiple points in time, where each occurrence of the prioritizing is based on a set of one or more current abort triggers and the current pending abort reason, and where each occurrence of the prioritizing updates the current pending abort reason;

where the prioritizing updates the current pending abort reason to be one or more of the abort triggers that have the same abort priority level, and where that abort priority level is the highest abort priority level among the abort triggers that have been prioritized thus far in the method; and selecting the current pending abort reason to be the pending abort reason when the prioritizing has included all of the abort triggers of the trace.

7. The method of claim 1, where:

the receiving includes receiving at least three incoming indications of occurrences of abort triggers stemming from the execution of at least two traces that are different from each other; and the prioritizing is based on the abort priorities of the abort triggers when the abort triggers stem from the execution of operations from the same trace, and the prioritizing is based on a relative age of the traces when the abort triggers stem from the execution of operations from different traces.

8. The method of claim 1, where the execution of the trace is atomic in that the effects of the trace are either committed in their entirety to the architectural state, or prevented in their entirety from having impacting the architectural state.

9. The method of claim 1, where the abort trigger is at least one of a memory order constraint violation, multiprocessor cache, uniprocessor (or interprocessor) (UP Loss) cache, interior branch misprediction, single-instruction fault cacheable Store combining write overflow, speculative non-cacheable access, single-instruction trap, multi-instruction fault; multi-instruction trap, or final branch misprediction.

* * * * *